(12) United States Patent
Anderson et al.

(10) Patent No.: US 9,321,389 B2
(45) Date of Patent: Apr. 26, 2016

(54) AUTO-RACK RAILROAD CAR VEHICLE RESTRAINT APPARATUS

(71) Applicant: Standard Car Truck Company, Park Ridge, IL (US)

(72) Inventors: John D. Anderson, Oswego, IL (US); Walter J. Peach, Montgomery, IL (US); Michael K. Burke, Wheaton, IL (US)

(73) Assignee: Standard Car Truck Company, Park Ridge, IL (US)

( * ) Notice: Subject to any disclaimer, the term of this patent is extended or adjusted under 35 U.S.C. 154(b) by 0 days.

(21) Appl. No.: 14/596,843

(22) Filed: Jan. 14, 2015

(65) Prior Publication Data

US 2015/0125231 A1    May 7, 2015

Related U.S. Application Data

(60) Division of application No. 14/319,147, filed on Jun. 30, 2014, now Pat. No. 8,961,084, which is a continuation-in-part of application No. 14/084,081, filed on Nov. 19, 2013, which is a continuation-in-part of application No. 29/466,654, filed on Sep. 10, 2013.

(51) Int. Cl.
*B60P 7/08* (2006.01)
*B60P 3/077* (2006.01)
*B60P 3/075* (2006.01)

(52) U.S. Cl.
CPC *B60P 3/077* (2013.01); *B60P 3/075* (2013.01)

(58) Field of Classification Search
CPC .................................. B60P 3/077; B60P 3/075
USPC .............. 410/8, 9, 10, 11, 12, 16, 20, 23, 30, 410/100, 103, 104, 49, 50; 188/32; 248/499
See application file for complete search history.

(56) References Cited

U.S. PATENT DOCUMENTS

| 1,424,957 A | 8/1922 | Tilburg |
| 1,776,935 A | 9/1930 | Snyder |

(Continued)

FOREIGN PATENT DOCUMENTS

EP    2221215    8/2010

OTHER PUBLICATIONS

ZefTek, A Wabtec Company, Lo-Pro™ Application/Use Advertisement, published prior to Sep. 10, 2013 (11 pages).

(Continued)

*Primary Examiner* — Stephen Gordon
(74) *Attorney, Agent, or Firm* — Neal, Gerber & Eisenberg LLP

(57) ABSTRACT

A vehicle restraint system for an auto-rack railroad car which includes an active chock and an anchor chock configured to co-act to secure a vehicle in the auto-rack railroad car. In various embodiments, each chock has a chock body including a substantially diamond shaped elongated tube which includes four integrally connected elongated walls. In various embodiments, for each chock, various components of that chock extend substantially along longitudinal axis that lie in the same or substantially the same vertical plane as the apex and trough of the substantially diamond shaped elongated tube of the chock body. The active and anchor chocks: (a) have a lower height than known commercially available vehicle restraints; (b) have a smaller width than known commercially available vehicle restraints; (c) position the strap and the torque tube closer to the tire of the wheel than any known commercially available vehicle restraints; (d) take up a smaller area of each safe zone adjacent to the wheel than known commercially available vehicle restraints; (e) provide a greater strength to size ratio than known commercially available vehicle restraints; and (f) are easy to operate, install, and remove.

53 Claims, 40 Drawing Sheets

(56) References Cited

U.S. PATENT DOCUMENTS

| | | | |
|---|---|---|---|
| 2,066,714 A | 1/1937 | Butterworth | |
| 2,540,400 A | 2/1951 | McHenry | |
| 2,705,081 A | 3/1955 | Jacobs | |
| 2,730,400 A | 1/1956 | Francis | |
| 2,771,162 A | 11/1956 | Marsh | |
| 2,797,774 A | 7/1957 | Eckhart | |
| 2,853,257 A | 9/1958 | Cook | |
| 2,858,905 A | 11/1958 | Fahland | |
| 2,895,569 A | 7/1959 | Nystrom | |
| 3,119,350 A | 1/1964 | Bellingher | |
| 3,581,846 A | 6/1971 | Janus | |
| 3,605,954 A | 9/1971 | Wakabayashi et al. | |
| 3,739,906 A | 6/1973 | Cwycyshyn et al. | |
| 3,895,587 A | 7/1975 | Bell | |
| 4,024,820 A | 5/1977 | Hlinsky et al. | |
| 4,031,983 A | 6/1977 | Lentini | |
| 4,032,167 A | 6/1977 | Chereda | |
| 4,060,036 A | 11/1977 | Palms | |
| 4,316,686 A | 2/1982 | Cottrell et al. | |
| 4,343,401 A | 8/1982 | Paulyson | |
| 4,399,893 A | 8/1983 | Switzer | |
| D281,063 S | 10/1985 | De Raad | |
| 4,611,961 A | 9/1986 | Van Iperen et al. | |
| 4,615,416 A | 10/1986 | Wilson | |
| 4,659,266 A | 4/1987 | Thelen et al. | |
| 4,668,140 A | 5/1987 | Blunden | |
| 4,676,344 A | 6/1987 | Locicero | |
| 4,695,087 A | 9/1987 | Hollrock | |
| 4,786,223 A | 11/1988 | Crissy et al. | |
| 4,804,070 A | 2/1989 | Bohler | |
| 4,836,726 A | 6/1989 | Robertson et al. | |
| 4,838,743 A | 6/1989 | Blunden et al. | |
| 4,875,813 A | 10/1989 | Moyer et al. | |
| 4,960,353 A | 10/1990 | Thorndyke | |
| 4,971,492 A | 11/1990 | Moyer et al. | |
| 4,979,856 A | 12/1990 | Blunden et al. | |
| 5,011,347 A | 4/1991 | Bullock | |
| 5,037,255 A | 8/1991 | Bullock et al. | |
| 5,106,245 A | 4/1992 | Fritz et al. | |
| 5,160,223 A | 11/1992 | Seitz | |
| 5,302,063 A | 4/1994 | Winsor | |
| 5,312,213 A | 5/1994 | Winsor | |
| 5,316,421 A | 5/1994 | Bullock et al. | |
| D402,616 S | 12/1998 | Henry | |
| 5,954,465 A * | 9/1999 | Ellerbush | B60P 7/12 410/47 |
| D415,463 S | 10/1999 | Henry | |
| D420,640 S | 2/2000 | Henry | |
| D422,960 S | 4/2000 | Henry | |
| 6,161,996 A | 12/2000 | Bartlett | |
| 6,164,893 A | 12/2000 | Glomot et al. | |
| D474,729 S | 5/2003 | Sargent | |
| D489,310 S | 5/2004 | Olson et al. | |
| 6,835,034 B2 | 12/2004 | Winsor | |
| 6,851,523 B1 | 2/2005 | Gaster | |
| 6,926,480 B2 | 8/2005 | Anderson et al. | |
| D511,734 S | 11/2005 | Moore et al. | |
| D516,268 S | 2/2006 | Gaster | |
| D543,926 S | 6/2007 | Kutzler | |
| D547,712 S | 7/2007 | Hartmann et al. | |
| D587,183 S | 2/2009 | Blumenthal et al. | |
| 7,513,725 B1 | 4/2009 | Bullock | |
| D613,231 S | 4/2010 | Anderson et al. | |
| 7,824,138 B2 | 11/2010 | Bullock | |
| D633,850 S | 3/2011 | Morin | |
| 7,976,255 B2 | 7/2011 | Anderson et al. | |
| 8,096,738 B2 | 1/2012 | Anderson et al. | |
| D655,667 S | 3/2012 | Angus et al. | |
| 8,430,612 B1 | 4/2013 | Randall | |
| D690,644 S | 10/2013 | Bowman et al. | |
| 8,961,084 B1 * | 2/2015 | Anderson | B60P 3/077 410/10 |
| 2006/0275096 A1 | 12/2006 | Boydstun et al. | |
| 2008/0232918 A1 | 9/2008 | Blanchet | |
| 2009/0003956 A1 | 1/2009 | Tatina | |
| 2009/0035088 A1 | 2/2009 | Powers et al. | |
| 2009/0208304 A1 | 8/2009 | Bullock et al. | |
| 2010/0296890 A1 | 11/2010 | Bullock | |
| 2011/0038681 A1 | 2/2011 | Cencer | |
| 2013/0156524 A1 | 6/2013 | Bullock | |

OTHER PUBLICATIONS

Standard Car Truck, Lo-Pro™ Chock Application Instructions (Left-Hand Anchor/Right Hand Adjustable) Document No. 3001, published Jan. 12, 2012 (1 page).

ZefTek, A Wabtec Company, Sta-Put w/Strap Application/Use Advertisement, published prior to Sep. 10, 2013 (12 pages).

ZefTek, A Wabtec Company, Sta-Put™ Chock Application Instructions, Document No. 4000 published Jan. 10, 2012 (1 page).

ZefTek, A Wabtec Company, Sta-Put Application/Use Advertisement, published prior to Sep. 10, 2013, (11 pages).

ZefTek, A Wabtec Company, Sta-Put™ Chock Application Instructions, Document No. 4001 published Jan. 10, 2012 (1 page).

Standard Car Truck, A Wabtec Company New Product Announcement, Quick-Adjust Chock Strap published prior to Sep. 10, 2013 (1 page).

Damage Prevention Newsletter, Holland's New Tri-Level Chock published prior to Sep. 10, 2013 (2 pages).

Thrall Steel Anchor and Active Chocks with Riser, commercially available before Sep. 10, 2013 (9 pictures).

Thrall Polymer Anchor and Active Chocks with Riser, commercially available before Sep. 10, 2013 (10 pictures).

PCT Notification of Transmittal of the International Search Report and Written Opinion of the International Searching Authority for International Application No. PCT/US2014/021017 dated Jun. 20, 2014.

International Search Report and the Written Opinion dated Feb. 25, 2015, for International Application No. PCT/US2014/065602 filed Nov. 14, 2014.

* cited by examiner

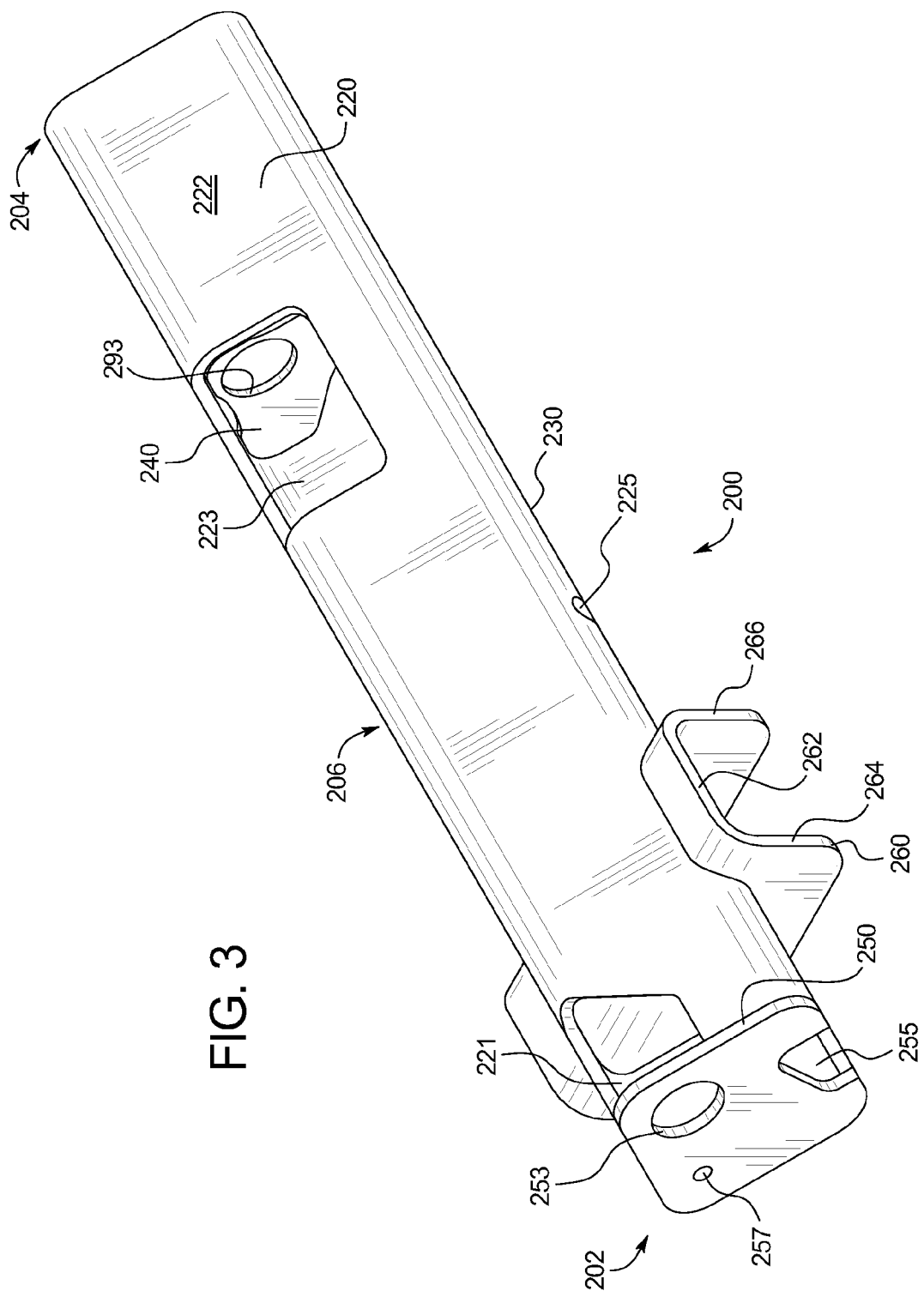

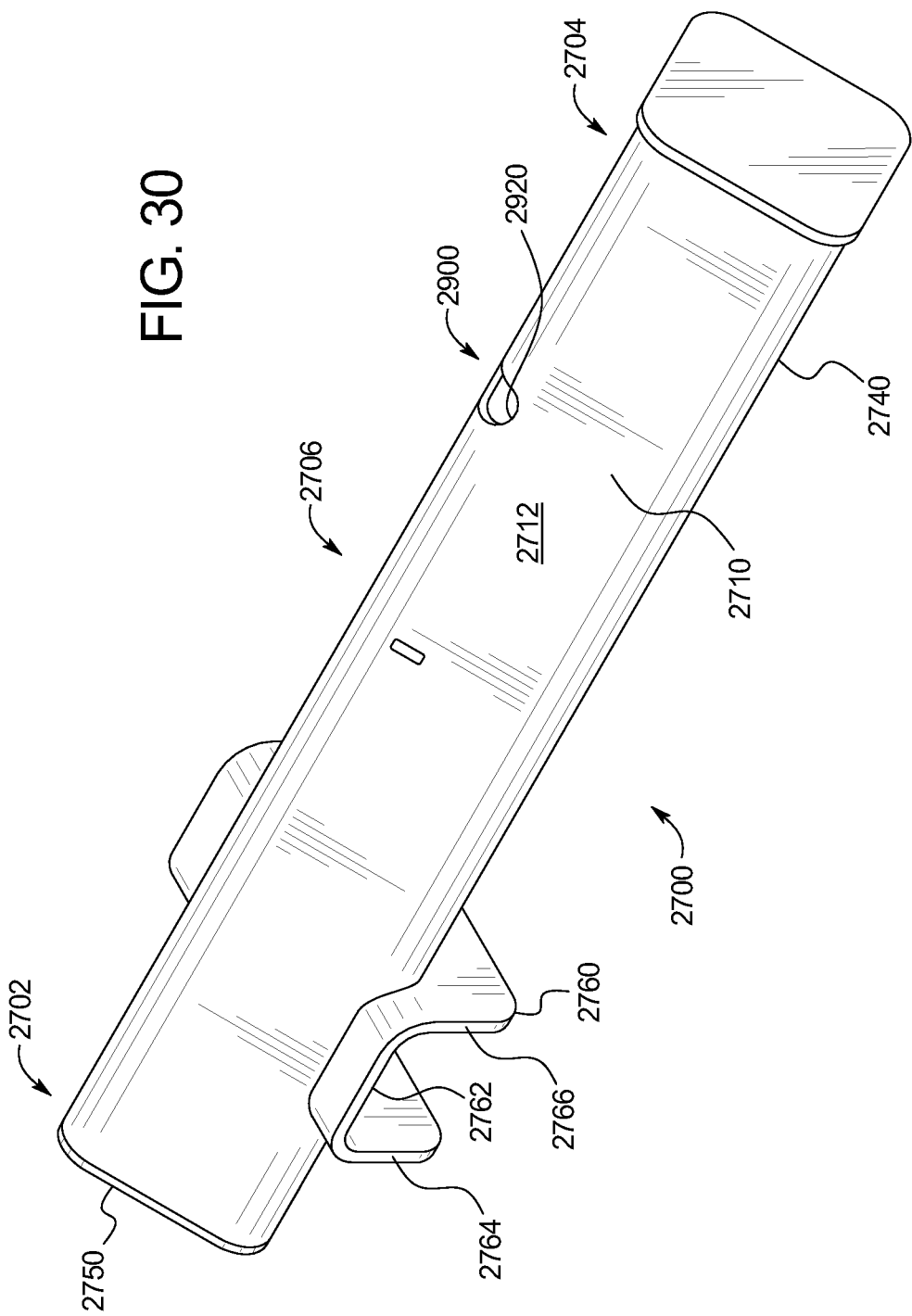

AUTO-RACK RAILROAD CAR VEHICLE RESTRAINT APPARATUS

PRIORITY

This application is a divisional patent application of and claims the benefit of and priority to U.S. patent application Ser. No. 14/319,147, filed on Jun. 30, 2014, which issued as U.S. Pat. No. 8,961,084 on Feb. 24, 2015, which is a continuation-in-part of and claims the benefit of and priority to U.S. patent application Ser. No. 14/084,081, filed Nov. 19, 2013, which is a continuation-in-part of and claims the benefit of and priority to U.S. Design patent application Ser. No. 29/466,654, filed Sep. 10, 2013, the entire contents of which are incorporated herein by reference.

BACKGROUND

The railroad industry employs a variety of auto-rack railroad cars for transporting newly-manufactured vehicles such as automobiles, vans, and trucks. Auto-rack railroad cars, known in the railroad industry as auto-rack cars, often travel thousands of miles through varying terrain. One typical type of auto-rack car is compartmented, having two or three floors or decks, two sidewalls, a pair of doors at each end, and a roof. Newly manufactured vehicles are loaded into and unloaded from an auto-rack car for transport by a person (sometimes called a "loader") who drives the vehicles into or out of the auto-rack car.

One problem with auto-rack cars is the potential for damage to the newly manufactured vehicles being transported in them which can occur in the auto-rack car due to the unwanted movement of one or more of the transported vehicles which are not adequately secured in the auto-rack car. Various vehicle restraints have been developed for securing the vehicles transported in auto-rack cars to prevent movement or shifting of those vehicles during transportation. The loader typically operates these vehicle restraints.

Various problems have developed with various known commercially available vehicle restraints in relation to new types or designs of vehicles with different body and particularly different fender, molding, or trim profiles. For example, various automobiles include relatively low fenders, moldings, or trim (compared to certain trucks, vans, and SUVs) and thus include relatively small safe zones on the front and rear sides of the wheels. The safe zone on each of the front and rear sides of the wheel of the vehicle is the area in which the vehicle restraint can extend and can operate without engaging the fender, molding, or trim of the vehicle. The closer the vehicle restraint or part of the vehicle restraint is to any of the boundaries of the safe zone, the more likely that the vehicle restraint will engage and possibly damage the fender, molding, or trim of the vehicle.

Various known commercially available restraint systems for tri-level auto-rack cars include two restraints respectively placed on the front and rear sides of the wheel. One of the restraints includes a strap or harness which is draped around the tire of the wheel and attached to the other restraint. The strap is tensioned on the tire. Upon the occurrence of certain conditions, vehicles have moved or literally "walked" out of the straps of these various known commercially available tri-level vehicle restraint systems at a variety of different times (such as during movement of the auto-rack cars and during sudden stoppages of the auto-rack car or severe deceleration of the auto-rack car). Such instances include sudden stoppages for emergencies alone or in combination with slack action. Such instances also occur during switching in a railroad yard, when the auto-rack cars are coupled and decoupled with other railroad cars in different freight trains on a regular basis. During the coupling action, severe jolts of up to eight to ten miles per hour can be incurred by the auto-rack car even though regulations (and signs in the railroad yards and on the railroad cars) limit the speed to no more than four miles per hour in these yards. These jolts can cause extreme force on the vehicles relative to the auto-rack cars and, thus, cause the vehicles to literally walk out of known vehicle restraint systems. When a vehicle walks out of a vehicle restraint system, the vehicle may engage another vehicle in the auto-rack car, one of the side walls of the auto-rack car, or one or more end doors of the auto-rack car.

Vehicle manufacturers provide extremely particular instructions which warn against any contact or engagement between anything in the auto-rack cars and the new vehicles because the vehicle manufacturers desire to deliver the newly manufactured vehicles to dealers and their customers in the best condition possible. Any damage, such as scratches or dents to the fenders, moldings, or trim, or other parts of the vehicle, could prevent or inhibit a customer from purchasing or taking delivery of the vehicle, and generally need to be fixed prior to sale of the vehicle. As indicated above, such damage to the vehicles necessitates the replacement of the damaged part or parts and potentially other parts of the vehicle. This damage is extremely expensive for vehicle manufacturers which typically charge the railroads for such damage.

Another problem with various known vehicle restraints is that for certain vehicles, the manufacturers cannot install the air dams on the vehicles at the vehicle manufacturing factory because various known vehicle restraints can damage the air dams. Thus, for such vehicles, the manufacturer must ship the air dams to the dealerships for installation.

These problems are compounded for vehicle manufacturers when the vehicle damaged is a specially ordered vehicle (instead of a stock vehicle) for a specific customer. The customer can wait one, two, three or more months for a specially ordered vehicle. If the specially ordered vehicle is damaged in transit, the customer may need to wait for another specially ordered vehicle to be manufactured. This can harm the dealer's and manufacturer's businesses.

It should thus be recognized that while many of the known vehicle restraints have been commercially implemented to secure vehicles being transported in auto-rack cars, in many instances the known vehicle restraints do not adequately protect the vehicles or prevent the movement of the vehicles and thus prevent damage to the vehicles or the vehicle restraints themselves.

Accordingly, there is a continuing need for improved vehicle restraints which are easy to install and remove, which hold the vehicles more securely, which are less likely to be damaged, and which take up smaller spaces in the safe zones thereby minimizing the potential damage to the vehicles being transported.

SUMMARY

The present disclosure solves the above problems by providing a vehicle restraint apparatus which includes co-acting wheel chocks which are configured to engage both sides of a vehicle wheel in an auto-rack car to better secure a vehicle being transported in the auto-rack car and to reduce or eliminate the movement of the vehicle being transported in the auto-rack car. In various embodiments, the vehicle restraint apparatus includes an active chock and an anchor chock. In other embodiments, the vehicle restraint apparatus includes two active chocks.

The present disclosure contemplates that for most vehicles, two co-acting wheel chocks including an active chock and an anchor chock of the present disclosure will be positioned adjacent to each wheel on one side of the vehicle being transported (i.e., four wheel chocks in total to secure the vehicle). After a vehicle is loaded in an auto-rack car, each wheel chock is positioned directly adjacent to each respective wheel on one side of the vehicle and is attached to the rail adjacent to that wheel. The strap from the active chock is placed over the tire and attached to the anchor chock. The strap is then tensioned on the tire. It should be appreciated that the vehicle restraint apparatus of the present disclosure can be employed in other transportation equipment such as tractor trailers and shipping containers.

In various embodiments, the active wheel chock of the present disclosure includes: (a) a chock body including a substantially diamond shaped elongated tube which includes four integrally connected elongated walls, and a rail saddle connected to the elongated tube; (b) a rail engager supported by and mounted to the chock body; (c) a wheel harness strap tensioner mounted to the chock body; and (d) a wheel harness strap configured to engage a wheel of a vehicle and connected to the wheel harness strap tensioner. In various embodiments, the rail engager of the active chock includes a locking pin extending substantially along a first longitudinal axis extending through the rail saddle and in an area adjacent to a trough of the substantially diamond shaped elongated tube of the chock body, and the wheel harness strap tensioner of the active chock includes a torque tube extending substantially along a second longitudinal axis extending through an area adjacent to an apex of the substantially diamond shaped elongated tube. In various embodiments, the first longitudinal axis, the second longitudinal axis, an apex of the chock body, and a trough of the chock body extend in a vertical or substantially vertical plane.

In various embodiments, the anchor wheel chock includes: (a) a chock body including a substantially diamond shaped elongated tube which includes four integrally connected elongated walls, and a rail saddle connected to the elongated tube; (b) a rail engager mounted to the chock body; and (c) a wheel harness strap anchor extending from the chock body. In various embodiments, the rail engager of the anchor chock includes a locking pin extending substantially along a first longitudinal axis extending through the rail saddle and in an area adjacent to a trough of the substantially diamond shaped elongated tube of the chock body. In various embodiments, this first longitudinal axis, an apex of the chock body, and a trough of the chock body extend in a vertical or substantially vertical plane.

In other various embodiments, the anchor wheel chock includes: (a) a chock body including a substantially diamond shaped elongated tube which includes four integrally connected elongated walls, and a rail saddle connected to the elongated tube; (b) a rail engager mounted to the chock body; and (c) a wheel harness strap anchor formed by the chock body. In certain such various embodiments, the rail engager of the anchor chock includes a locking pin extending substantially along a first longitudinal axis extending through the rail saddle and in an area adjacent to a trough of the substantially diamond shaped elongated tube of the chock body. In various embodiments, this first longitudinal axis, an apex of the chock body, and a trough of the chock body extend in a vertical or substantially vertical plane.

The active and anchor chocks of the present disclosure provide numerous advantages over various known commercially available vehicle restraint systems. More specifically, the active and anchor chocks of the present disclosure: (a) have a lower height than known commercially available vehicle restraints; (b) have a smaller width than known commercially available vehicle restraints; (c) position the strap and the torque tube closer to the tire of the wheel than any known commercially available vehicle restraints; (d) take up a smaller area of the safe zone adjacent to the wheel than any known commercially available vehicle restraints; (e) provide a greater strength to size ratio than known commercially available vehicle restraints; and (f) are easy to operate, install, and remove.

Other objects, features and advantages of the present invention will be apparent from the following detailed disclosure, taken in conjunction with the accompanying sheets of drawings, wherein like reference numerals refer to like parts.

BRIEF DESCRIPTION OF THE FIGURES

FIG. 3 is a front perspective view of the chock body of the active wheel chock of FIG. 2, shown without the rail engager, wheel harness strap, and wheel harness strap tensioner components of the active chock.

FIG. 30 is a rear perspective view of the chock body of the anchor wheel chock of FIG. 28, shown without the rail engager components of the anchor chock.

DETAILED DESCRIPTION

Figure 1:
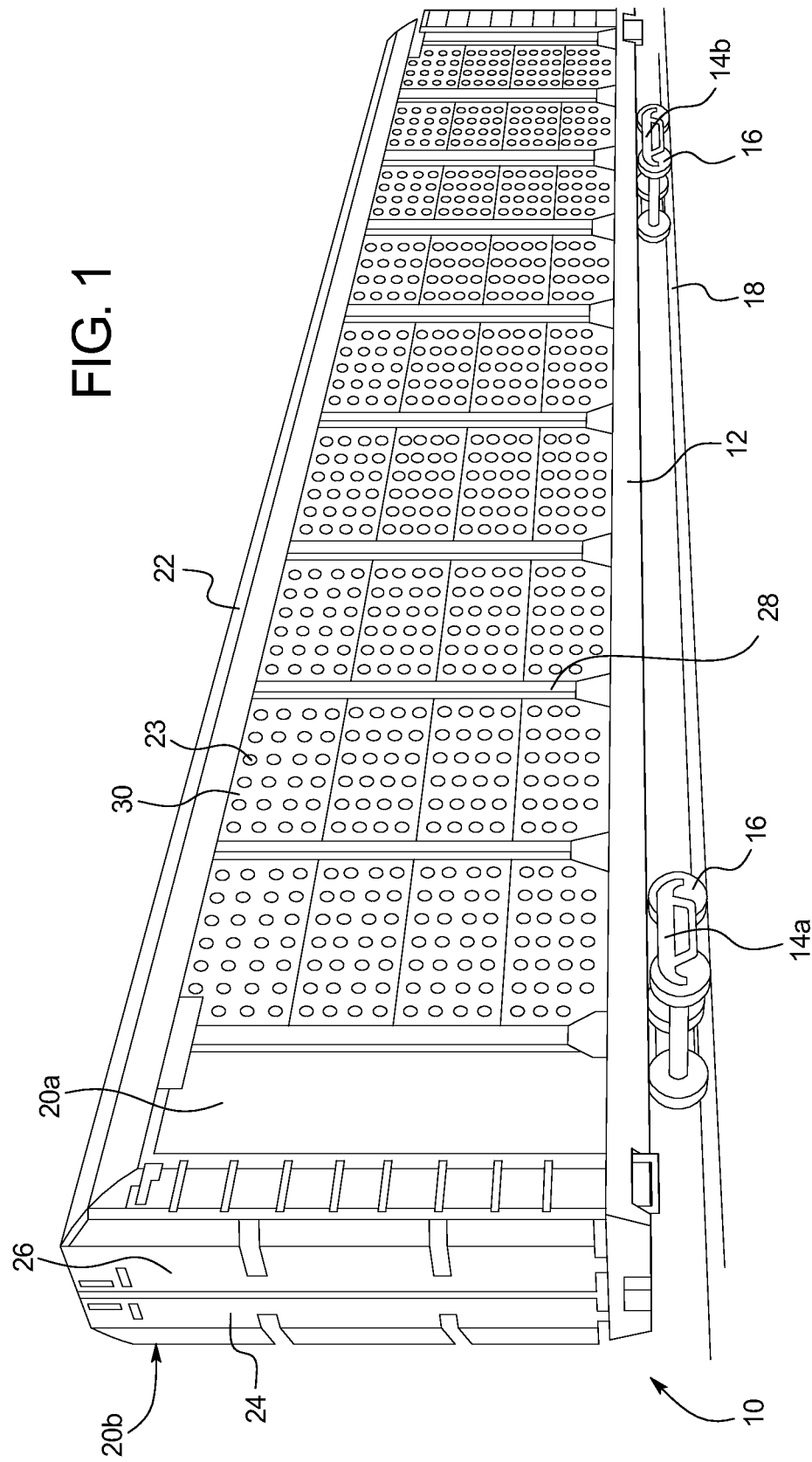
FIG. 1 is a perspective view of an auto-rack railroad car configured to transport a plurality of vehicles.

Referring now to the drawings and particularly to FIG. 1, a typical auto-rack car 10 includes a frame 12 supported by trucks 14a and 14b, each of which have several wheels 16 configured to roll along conventional railroad tracks 18. The frame 12 supports two opposing sidewalls 20a and 20b and a roof 22. The auto-rack car 10 includes a pair of co-acting clamshell doors 24 and 26 mounted on each end of the auto-rack car 10. The doors 24 and 26 are opened to facilitate the loading and unloading of vehicles into and out of the auto-rack car 10 and are closed during transport or storage of the vehicles.

The sidewalls 20 include a series of steel vertical posts 28 which are mounted on, and extend upwardly from, the frame 12. The roof 22 is mounted on, and supported by, these vertical posts. The vertical posts are evenly spaced along the entire length of both sidewalls 20 of the auto-rack car 10. A plurality of rectangular galvanized steel side wall panels 30 which extend horizontally and are vertically spaced apart are mounted between each pair of vertical posts 28. These side wall panels are supported at their corners by brackets (not shown) that are suitably secured to the vertical posts. The average side wall panel has a multiplicity of round sidewall panel holes 23. These side wall panel holes 23 provide the auto-rack car with natural light as well as proper ventilation. Proper ventilation prevents harm from the toxic vehicle fumes to the person or persons (i.e., loaders) loading or unloading the vehicles into or out of the auto-rack car.

The vehicle restraint apparatus of the present disclosure is particularly configured for tri-level auto-rack cars having first, second, and third levels. Normally, eighteen passenger vehicles can be transported in a tri-level auto-rack car, six on each level. The vehicle restraint apparatus of the present disclosure can also be used on a bi-level auto-rack car that has first and second levels or on a single-level auto-rack car.

Each level of the typical tri-level auto-rack car has an elongated rail 50 (which is partly shown in FIGS. 23, 24, 25, 26, and 27) fastened to the floor 80 of that level of the auto-rack car. The rails 50 extend substantially the entire length of the auto-rack car 10. The vehicles are loaded on each level with the wheels on one side of the vehicle (such as wheel 1002) of each vehicle adjacent to the rail 50 as also partially shown in FIGS. 23, 24, 25, 26, and 27. The rail is thus disposed on the outside of each of the wheels on one side of each of the vehicles when the vehicles are loaded in the auto-rack car.

Referring now to FIGS. 2 to 26, one example embodiment of vehicle restraint apparatus of the present disclosure is illustrated, and includes an active wheel chock generally indicated by numeral 100 (fully or partially shown in FIGS. 2, 2A, 3, 4, 5, 6, 7, 8, 9, 10, 11, 11A, 11B, 12, 23, 24, 25, 26, and 27), and an anchor wheel chock generally indicated by numeral 600 (fully or partially shown in FIGS. 13, 14, 15, 16, 17, 18, 19, 20, 21, 22, 23, 24, 25, 26, and 27). Generally, the active wheel chock 100 and the anchor wheel chock 600 each have a heel and a toe. The heel is configured to be selectively mounted on and locked to the rail 50. When mounted, the wheel chocks 100 and 600 each extend substantially perpendicular to the rail 50 with the toe of that chock projecting beneath the vehicle 1000 so that the wheel chocks 100 and 600 are disposed in front of and behind the vehicle wheel 1002 as shown in FIGS. 23, 24, 25, and 26. More specifically, as shown in FIGS. 23, 24, 25, 26, and 27, the active wheel chock 100 is configured to be positioned along one side of the wheel 1002 of the vehicle 1000, and the anchor wheel chock 600 is configured to be positioned on the opposite side of the wheel 1002 of the vehicle 1000. The active wheel chock 100 is configured to be releasably securely locked to the rail 50 which is adjacent to the wheel 1002 and which is attached to floor 80 of the respective level of the auto-rack car 10. The anchor wheel chock 600 is also configured to be releasably securely locked to the rail 50 which is adjacent to the wheel 1002. The active wheel chock 100 includes a wheel harness strap 400 which is configured to be placed over and engage the tread 1006 of the tire 1004 of the wheel 1002 and to be releasably attached to the anchor wheel chock 600 as further described below. For brevity, the active wheel chock is sometimes referred to herein as the active chock, and the anchor wheel chock is sometimes referred to herein as the anchor chock.

Active Wheel Chock

More specifically, in this illustrated embodiment as best seen in FIGS. 2, 2A, 3, 4, 5, 6, 7, 8, 9, 10, 11, 11A, 11B, 12, 23, 24, 25, 26, and 27, the active chock 100 includes a chock body 200, a rail engager 300 supported by and mounted to the chock body 200, a wheel harness strap 400 for engaging the wheel 1002, and a wheel harness strap tensioner 500 supported by and mounted to the chock body 200 and connected to the wheel harness strap 400.

Turning now first to the non-moving parts of the active wheel chock 100, the chock body 200 includes a heel 202, a toe 204, and an intermediate section 206 extending between the heel 202 and the toe 204. The chock body 200 of this illustrated embodiment includes: (a) a substantially diamond shaped elongated tube which includes four integrally connected elongated walls 210, 220, 230, and 240; (b) a heel side transversely extending end wall 250 integrally connected (such as by welding) to the end edges of the heel portions of the elongated walls 210, 220, 230, and 240; (c) an upside down U-shaped rail saddle 260 integrally connected (such as by welding) to the elongated walls 210, 220, 230, and 240; (d) a first transversely extending intermediate wall 270 (best seen in FIG. 11A) positioned in the substantially diamond shaped elongated tube and integrally connected (such as by welding) to the inner surfaces of the elongated walls 210, 220, 230, and 240; (e) a second transversely extending intermediate wall 280 (best seen in FIG. 11A) positioned in the substantially diamond shaped elongated tube and integrally connected (such as by welding) to the inner surfaces of the elongated walls 210, 220, 230, and 240; and (f) a third transversely extending intermediate wall 290 (best seen in FIG. 11A) positioned in the substantially diamond shaped elongated tube and integrally connected (such as by welding) to the inner surfaces of the elongated walls 210, 220, 230, and 240. It should be appreciated that these walls can be connected in other ways and that each of the transversely extending walls does not need to be connected each of the elongated walls.

The elongated walls 210, 220, 230, and 240 of the substantially diamond shaped elongated tube each have inner and outer surfaces, a heel edge and a toe edge. More specifically, (a) elongated wall 210 has a tire tread engaging outer surface 212, an inner surface, a heel edge, and a toe edge; (b) the elongated wall 220 has an outer surface 222, an inner surface, a heel edge, and a toe edge; (c) the elongated wall 230 has an outer surface 232, an inner surface, a heel edge, and a toe edge; and (d) the elongated wall 240 has an outer surface 242, an inner surface, a heel edge, and a toe edge. It should be appreciated that in this illustrated embodiment, the walls 210, 220, 230, and 240 have or are interconnected by curved or radius corners in this illustrated embodiment, but that the present disclosure is not limited to having such curved or radius corners.

The elongated walls 210, 220, 230, and 240 of the substantially diamond shaped elongated tube define a plurality of cut-outs or openings which: (a) provide access to the internal areas of the tube of the chock body 200; (b) provide access to the internal components of the active chock 100 for assembly; (c) enable parts connected to the internal components of the active chock 100 to extend outwardly from the elongated tube as further discussed below; and (d) provide drainage of any water in the chock body 200. More specifically: (a) walls 210 and 220 partially define a first heel opening 221; (b) walls 210 and 220 define an intermediate section strap opening 223; (c) walls 220 and 230 define a rail engager activation lever opening or slot 225; and (d) walls 210, 220, 230, and 240 define a rail saddle receiving opening 227.

The heel end transversely extending end wall 250 is integrally connected (such as by welding) to the heel edges of the elongated walls 210, 220, 230, and 240. The end wall 250 defines a plurality of cut-outs or openings which: (a) provide access to the internal areas of the tube of the chock body 200; (b) provide access to the internal components of the active chock 100 for assembly; and (c) enable parts connected (such as by welding) to the internal components of the active chock 100 to extend outwardly from the tube of the chock body 200 as further discussed below. More specifically, the end wall 250 defines: (a) a torque tube assembly receiving opening 253; (b) a strap tension release lever opening 255; and (c) a strap tension release lever attachment fastener opening 257. The end wall 250 also supports certain components of the active chock 200 as further discussed below.

The upside down U-shaped rail saddle 260 is positioned in the rail saddle receiving opening 227 and is integrally connected (such as by welding) to the edges of the elongated walls 210, 220, 230, and 240 that define the rail saddle receiving opening 227. The upside down U-shaped rail saddle 260 includes an upper wall 262, a first side wall 264, and a second side wall 266, which each extend transversely to the tube of the chock body 200, and specifically transversely to elongated walls 210, 220, 230, and 240. The upside down U-shaped rail saddle 260 is configured to fit over and rest on the rail 50. Specifically, the upper wall 262 is configured to engage the top of the rail 50, the first side wall 264 is configured to extend adjacent to one side of the rail 50, and the second side wall 266 is configured to extend adjacent to the other side of the rail 50 as generally shown in FIGS. 23, 24, 25, 26, and 27. It should be appreciated that having the upper wall 262 rest on the rail 50 enables the chock body 200 to be at the lowest point in the safe zone.

The first side wall 264 defines a locking pin receiving opening 265 (best seen in FIGS. 11 and 12) and the second side wall 266 defines a locking pin receiving opening 267 (best seen in FIGS. 11 and 12) aligned with the locking pin receiving opening 265. It should be appreciated that in this example embodiment, the locking pin 310 (described below) does not extend into the locking pin receiving opening 265, but that in other embodiments, the locking pin can extend into the locking pin receiving opening 265. It should further be appreciated that the locking pin receiving opening 265 is formed in the first side wall 264 of the rail saddle 260 for ease of manufacturing, and specifically to enable the rail saddle 260 to be mounted in the elongated tube in either direction.

The first intermediate wall 270 is positioned approximately midway in the substantially diamond shaped tube of the chock body 100. The first intermediate wall 270 defines a first torque tube receiving opening 273 (best seen in FIG. 11A) aligned with the torque tube assembly receiving opening 253 defined by the end wall 250. The first side wall 270 also defines a locking pin receiving opening 275 (best seen in FIGS. 11A and 12) which is aligned with the locking pin receiving opening 267 and which is also aligned with the locking pin receiving opening 265.

The second intermediate wall 280 is positioned further toward the toe 204 in the substantially diamond shaped tube of the chock body 200 adjacent to the heel side of the strap opening 223. The first intermediate wall 280 defines a torque tube receiving opening 283 (best seen in FIGS. 4 and 11A) aligned with the torque tube receiving opening 273 defined by the first intermediate wall 270 and with the torque tube assembly receiving opening 253 defined by the end wall 250.

The third intermediate wall 290 is positioned further toward the toe in the substantially diamond shaped tube of the chock body 200 adjacent to the toe side of the strap opening 223. The third intermediate wall 290 defines a torque tube receiving opening 293 (best seen in FIGS. 3 and 11A) aligned with the torque tube receiving opening 283 defined by the second intermediate wall 280, with the torque tube receiving opening 273 defined by the first intermediate wall 270, and with the torque tube assembly receiving opening 253 defined by the end wall 250.

In this illustrated embodiment, (a) the aligned openings 253, 273, 283, and 293 are positioned in and adjacent to the peak or the apex of the substantially diamond shaped tube of the chock body 200; and (b) the aligned openings 265, 267, and 275 are positioned in and adjacent to the trough or bottom of the substantially diamond shaped tube of the chock body 200. The aligned openings 253, 273, 283, and 293 have a central axis which extends in the same vertical plane or substantially the same vertical plane as the central axis of the aligned openings 265, 267, and 275.

It should be appreciated that the body of the active chock of this illustrated embodiment of the present disclosure: (a) takes up a smaller area of the safe zone adjacent to the wheel than any known commercially available vehicle restraint; and (b) provides a greater strength to size ratio than the body of any known commercially available vehicle restraint. It should also be appreciated that the tubular configuration of the body of the active chock provides substantial rigidity utilizing relatively thin walls. It should further be appreciated that this configuration of the substantially diamond shaped tube of the chock body of the active chock has the greatest height at the point in which it is closest to the tire and then slopes away from the tire.

Turning now to the movable components of the active chock 100 as best illustrated in FIGS. 2, 11, 11A, and 12, the rail engager 300 is supported by the chock body 200 and configured to releasably lock the active chock 100 to the rail 50. The rail engager 300 generally includes a locking pin 310 (best shown in FIGS. 2, 11, and 12), an activation lever 320 (best shown in FIGS. 2, 2A, 11, and 12) connected to and extending transversely from the locking pin 310, and a biasing member such as coil spring 330 (best shown in FIGS. 2, 11, and 12) positioned about the locking pin 310.

More specifically, the locking pin 310 is positioned in the substantially diamond shaped tube of the chock body 200 in an area adjacent to the trough and in the same or substantially the same vertical plane as the apex and trough of the substantially diamond shaped tube of the chock body 200. The locking pin 310 extends through: (a) the locking pin receiving opening 267 of the side wall 266 of the rail saddle 260; and (b) the locking pin receiving opening 275 of the first intermediate wall 270. The locking pin 310 is supported by the side wall 266 of the rail saddle 260 and by the first intermediate wall 270.

The activation lever 320 which is connected to and which extends transversely from the locking pin 310 includes a stem 322 and a head 324. One end of the stem 322 extends through the locking pin 310 and the other end of the stem is connected to the head 324. In this illustrated embodiment, the end of the stem 322 extending though the locking pin 310 has or defines a spring engagement notch and the locking pin 310 includes a through hole 312 (best shown in FIG. 2) configured to receive the end of the stem 322 to facilitate assembly of the rail engager 300. The activation lever 320 and specifically the stem 322 extend through the rail engager activation lever opening or slot 225.

Figure 11:
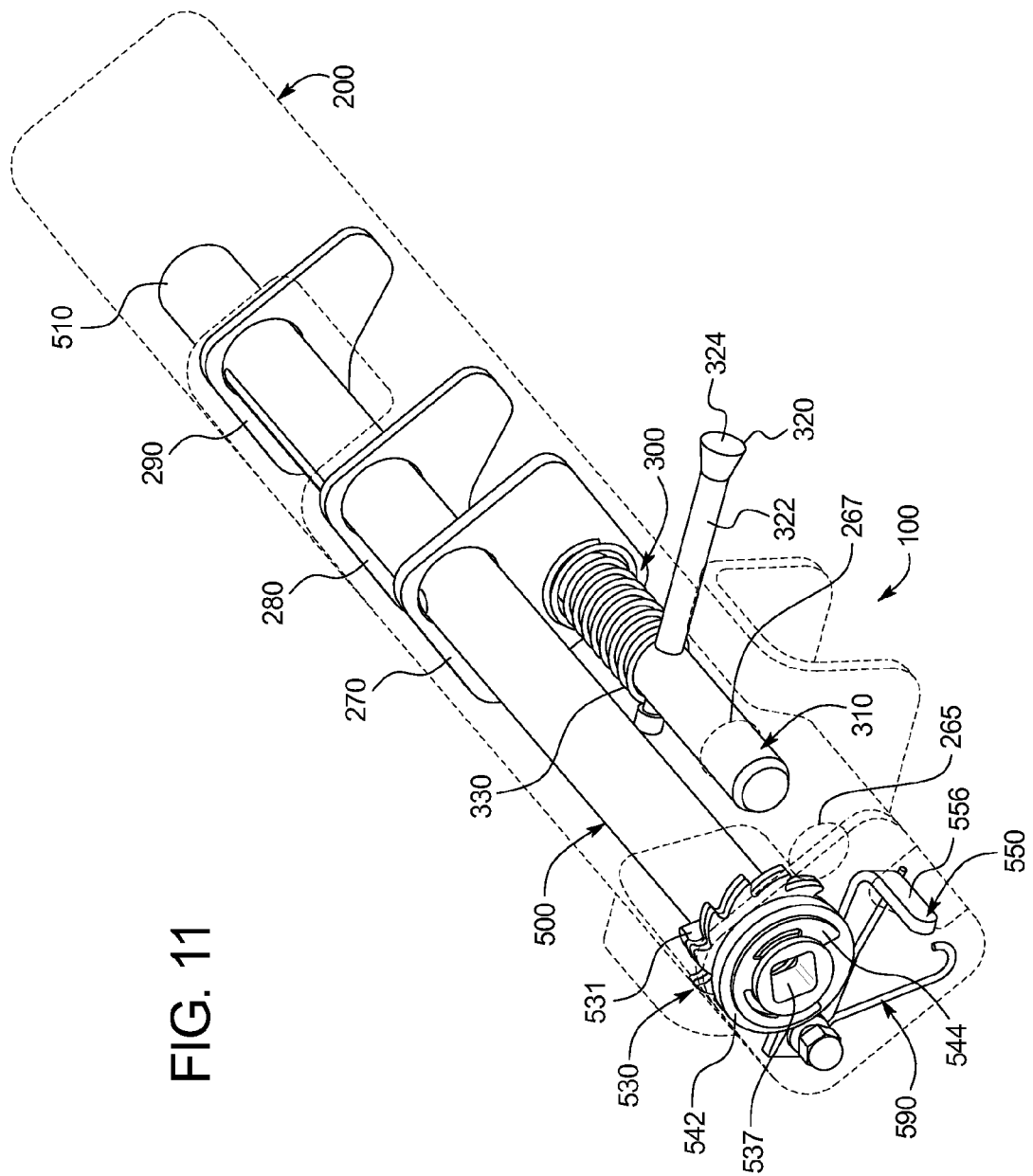
FIG. 11 is a front perspective view of the active wheel chock of FIG. 2, shown with most of the chock body shown in phantom to better illustrate the rail engager, wheel harness strap, and wheel harness strap tensioner components of the active chock.
Figure 11A:
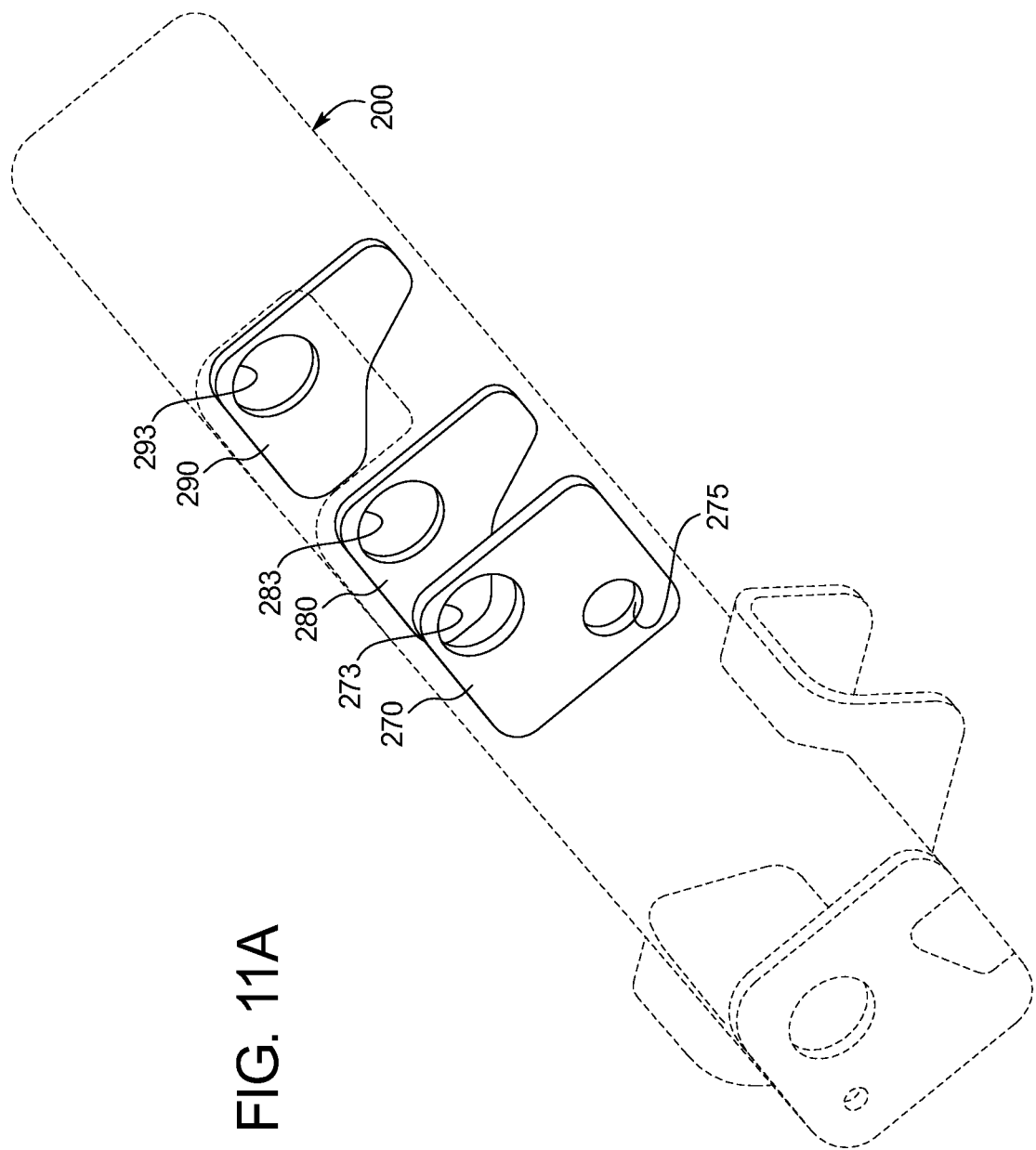
FIG. 11A is a front perspective view of the active wheel chock of FIG. 2, shown with most of the chock body in phantom, and with the rail engager, wheel harness strap, and wheel harness strap tensioner components of the active chock removed.
Figure 11B:
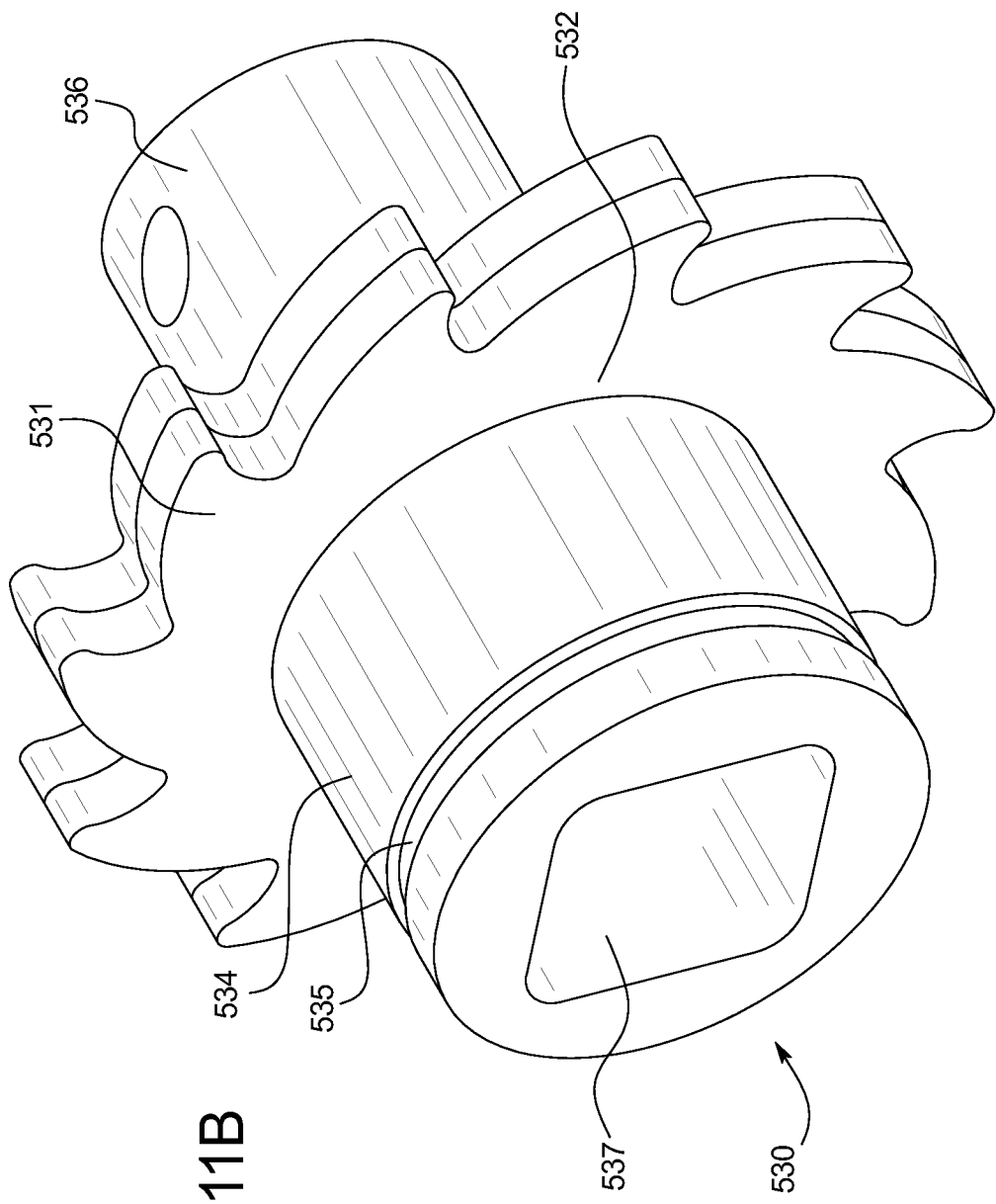
FIG. 11B is a front perspective view of the ratchet mechanism of the active wheel chock of FIG. 2, shown removed from the body of the active chock.
Figure 12:
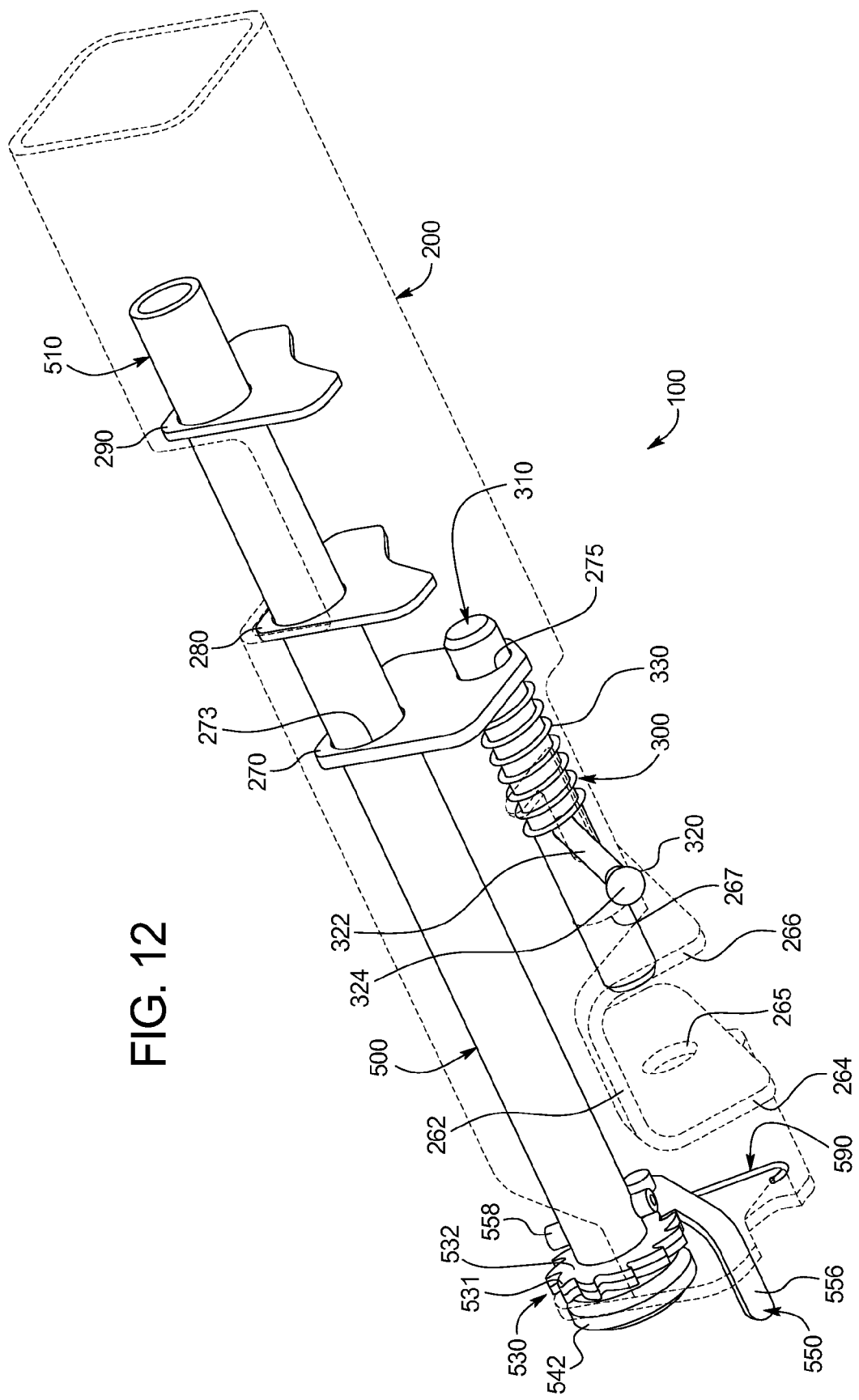
FIG. 12 is a rear perspective view of the active wheel chock of FIG. 2, shown with most of the chock body in phantom to better illustrate the rail engager, wheel harness strap, and wheel harness strap tensioner components of the active chock.
Figure 23:
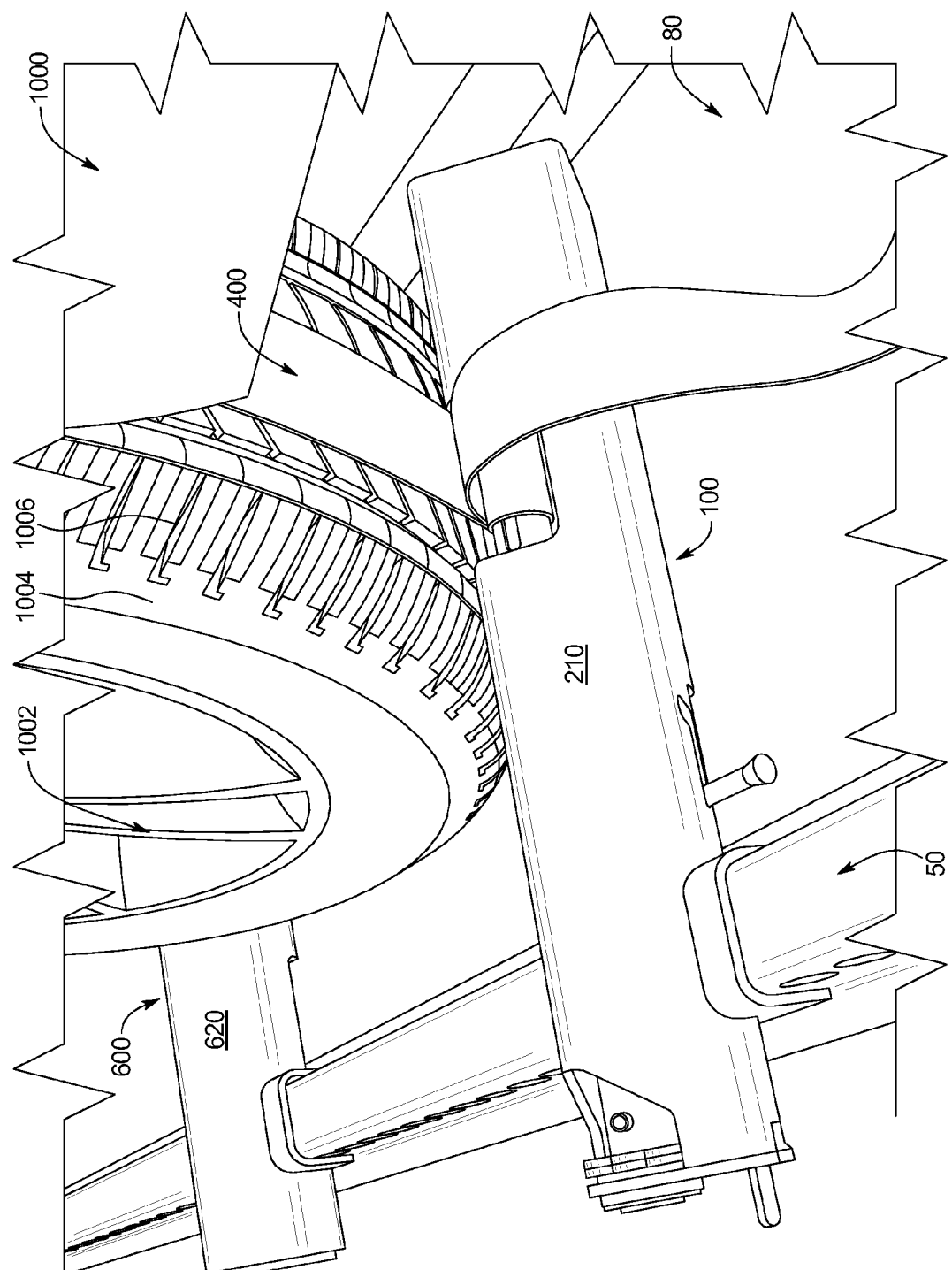
FIG. 23 is a perspective view of the active wheel chock of FIG. 2 and the anchor chock of FIG. 13 each shown locked onto a rail on a floor of one of the levels in a tri-level auto-rack car and in engagement with a wheel of a vehicle in an auto-rack car, wherein said view is taken from the rear side of the vehicle.
Figure 24:
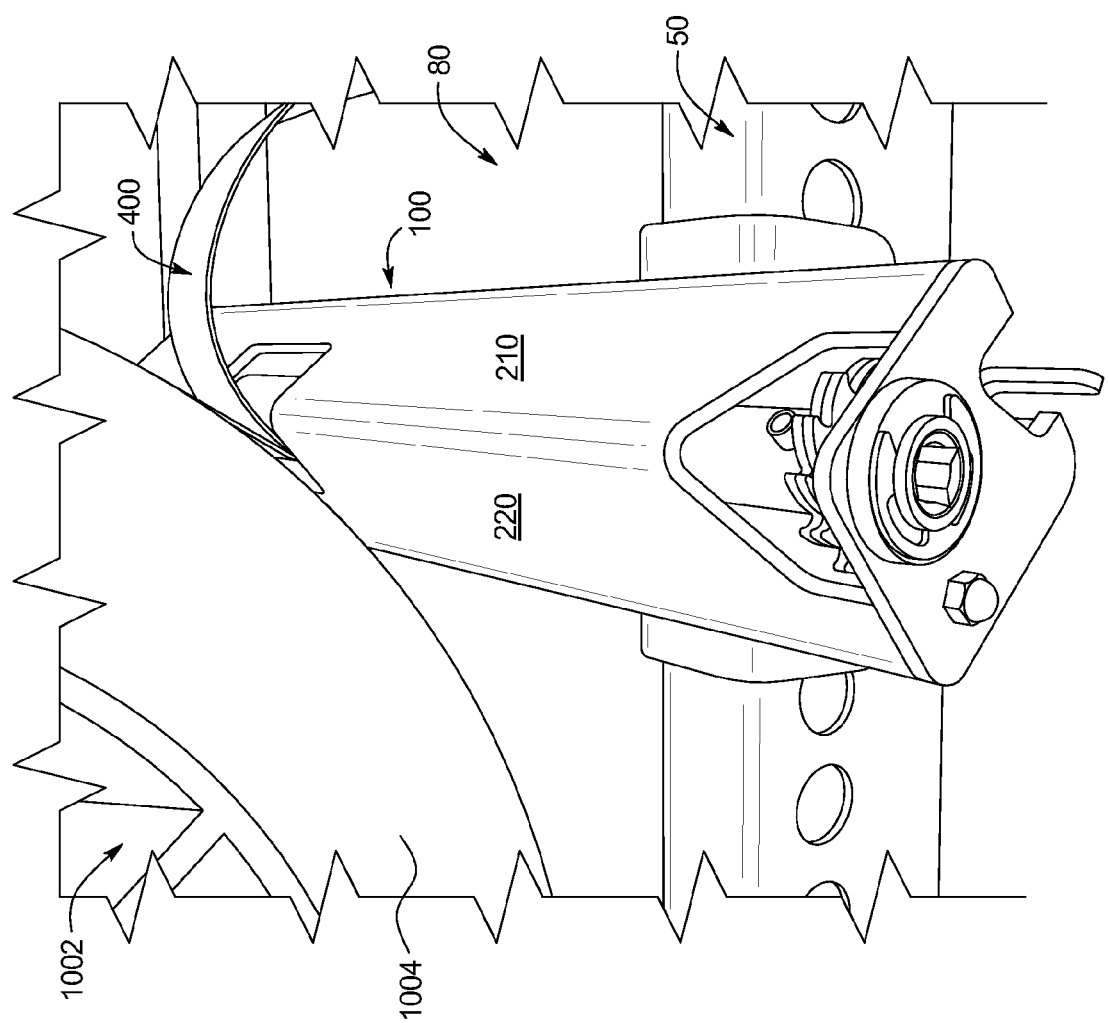
FIG. 24 is a perspective view of the active wheel chock of FIG. 2 shown locked onto a rail on a floor of one of the levels in a tri-level auto-rack car and in engagement with a rear side of a wheel of a vehicle in an auto-rack car.

The coil spring 330 is positioned or journaled about the locking pin 310 between the stem 322 and the first intermediate wall 270. The ends of the coil spring 330 respectively engage the stem 322 and the wall 270 as shown in FIGS. 11 and 12. It should be appreciated that in this configuration, the coil spring 330 biases the locking pin 310 away from one of two retracted positions (discussed below) and toward an extended position (as shown in FIG. 11). In this illustrated embodiment, as mentioned above, the locking pin 310 does not extend through locking pin receiving opening 265 when in the locked position. It should be appreciated that in other embodiments, the locking pin 310 can extend through the locking pin receiving opening 265 in the locked position. In either of the retracted positions, the rail engaging end of the locking pin 310 is configured to not engage the rail 50 to enable the chock body 200 and the entire active chock 100 to be placed on the rail 50 or removed from the rail 50. The two retracted positions include a locked retracted position and an unlocked retracted position. The rail engager activation lever opening or slot 225 has a generally sideways L shape and includes an upper slot section configured to receive the activation lever 320 and specifically the stem 322 of the activation lever 320 to prevent the activation lever 320 from moving toward the heel of the chock body 200. This upper slot section of the rail engager activation lever opening or slot 225 thus provides for the locked retracted position. When the activation lever 320 is moved downwardly out of this upper slot section of the rail engager activation lever opening or slot 225, the activation lever 320 is in the unlocked retracted position and will be biased by the coil spring 330 toward the extended position and thus toward the heel 202 and the rail locking position. In the extended or rail locking position, the heel side rail engaging end of the locking pin 310 is configured to extend through one of the holes in the rail 50 and lock the chock body 200 and the entire active chock 100 to the rail 50 as generally shown in FIGS. 23 and 24. This configuration provides a simple and effective mechanism for locking the active chock 100 onto the rail 50.

Figure 25:
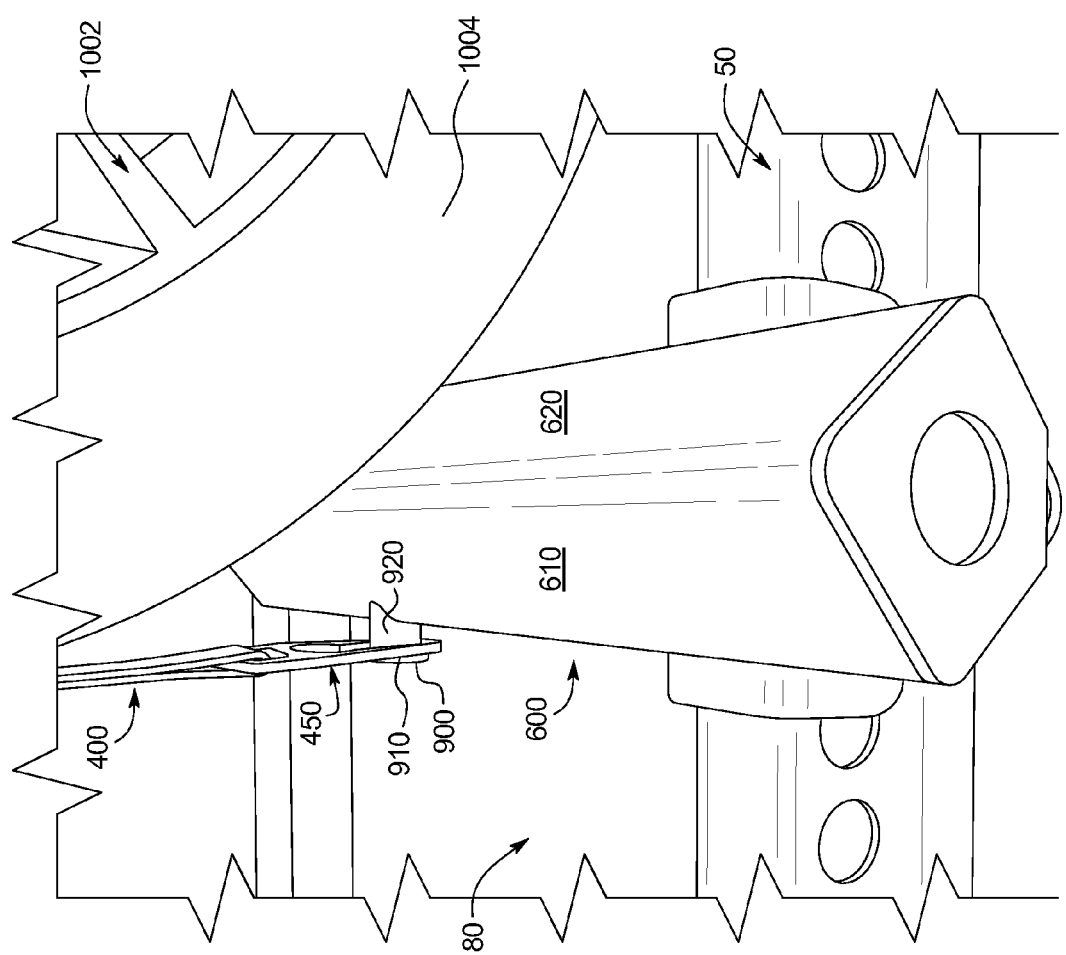
FIG. 25 is a perspective view of the anchor wheel chock of FIG. 13 shown locked onto a rail on a floor of one of the levels in a tri-level auto-rack car and in engagement with a front side of a wheel of a vehicle in an auto-rack car.
Figure 26:
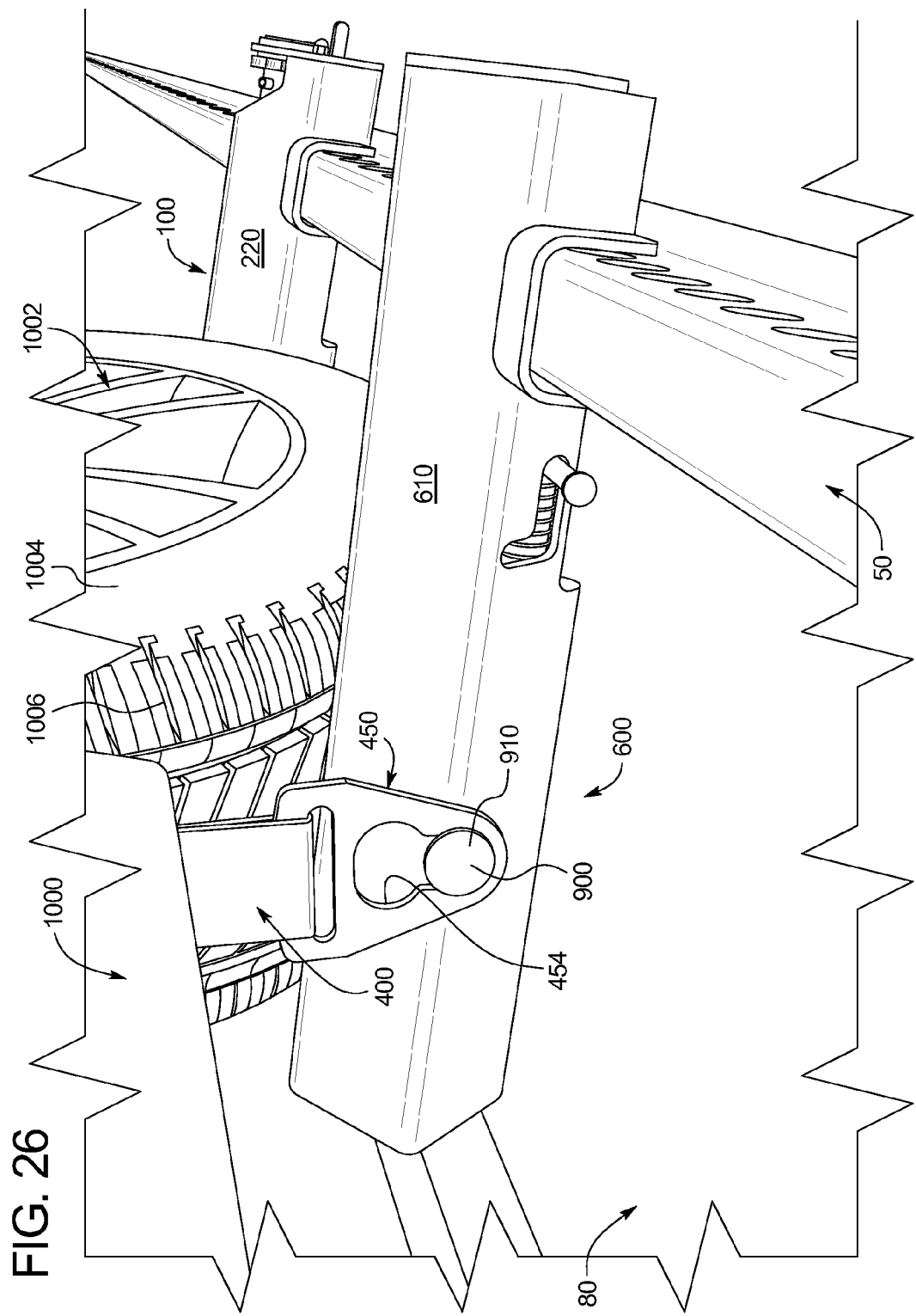
FIG. 26 is a perspective view of the active wheel chock of FIG. 2 and the anchor chock of FIG. 13 each shown locked onto a rail on a floor of one of the levels in a tri-level auto-rack car and in engagement with a wheel of a vehicle in an auto-rack car, wherein said view is taken from the front side of the vehicle.
Figure 27:
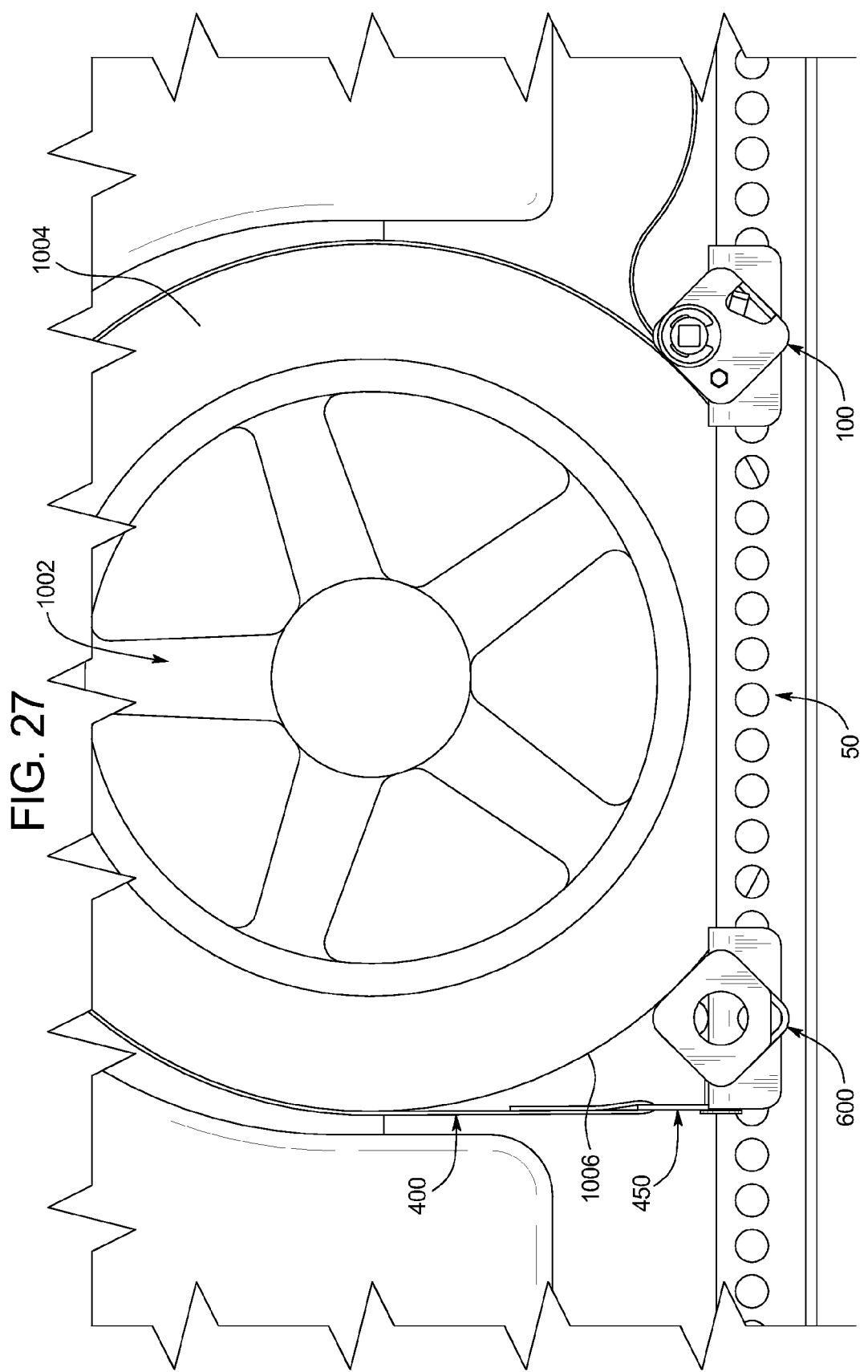
FIG. 27 is a side view of the active wheel chock of FIG. 2 and the anchor chock of FIG. 13 each shown locked onto a rail on a floor of one of the levels in a tri-level auto-rack car and in engagement with a wheel of a vehicle in an auto-rack car.

The strap 400 (as best shown in FIGS. 2A, 23, 24, 25, 26, and 27) includes a strap having a body 410 having: (a) central section 420; (b) a first end section 430 configured to be connected to the torque tube 510 of the wheel harness strap tensioner 500 as described below; and (c) a second end section 440 connected to an attachment plate 450 which is configured to be releasably and securely connected to the anchor chock 600, and specifically to the wheel harness strap anchor 900 of the anchor chock 600 as shown in FIGS. 25, 26, and 27 and as described below. The attachment plate 450 includes a substantially flat body 452 defining a somewhat T shaped slot 454 configured to receive and lock onto the wheel harness strap anchor 900 extending from the anchor chock 600 as shown in FIGS. 25, 26, and 27 and as described below.

Figure 2:
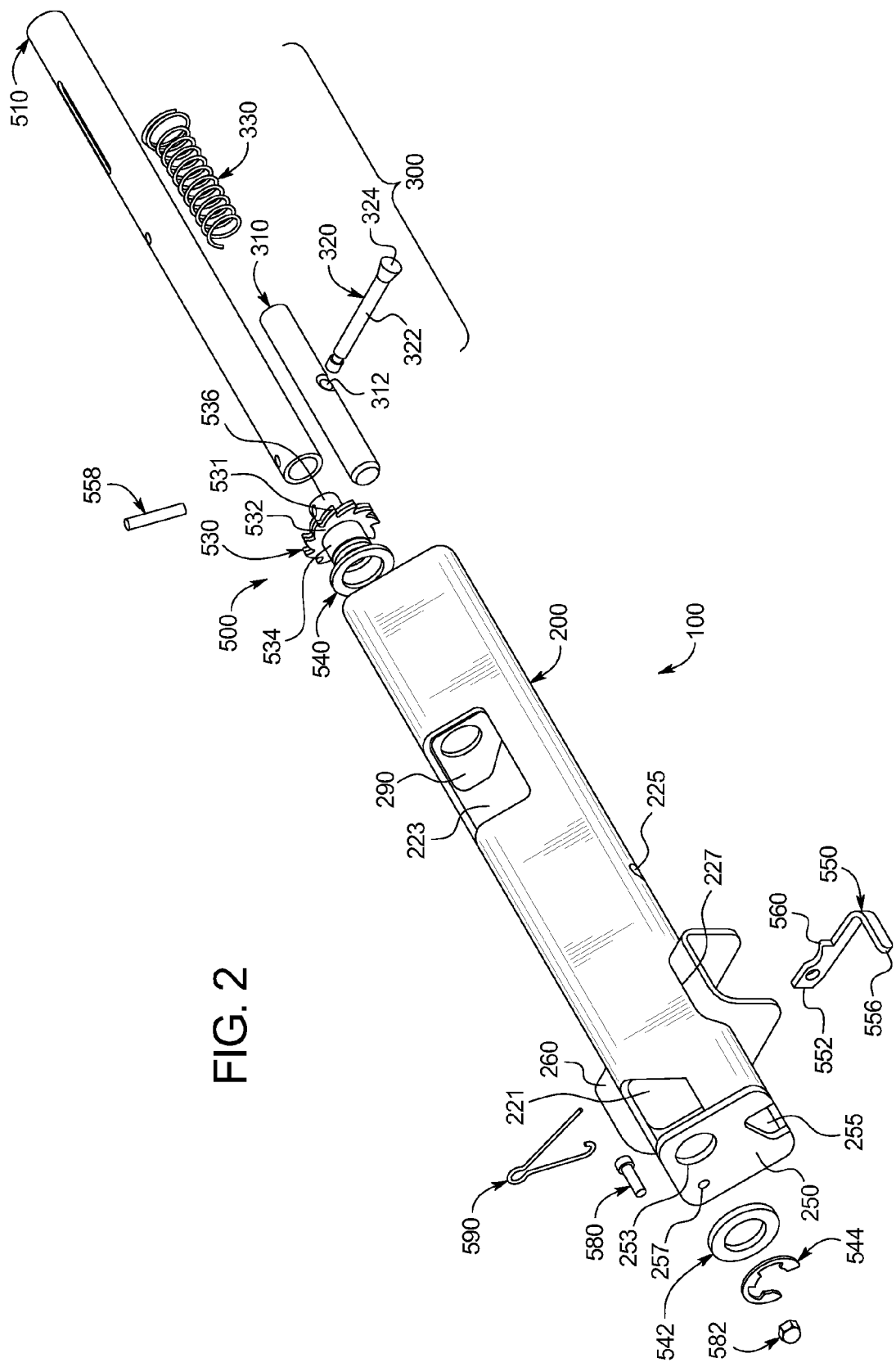
FIG. 2 is an exploded front perspective view of the active wheel chock of one embodiment of the present disclosure.
Figure 2A:
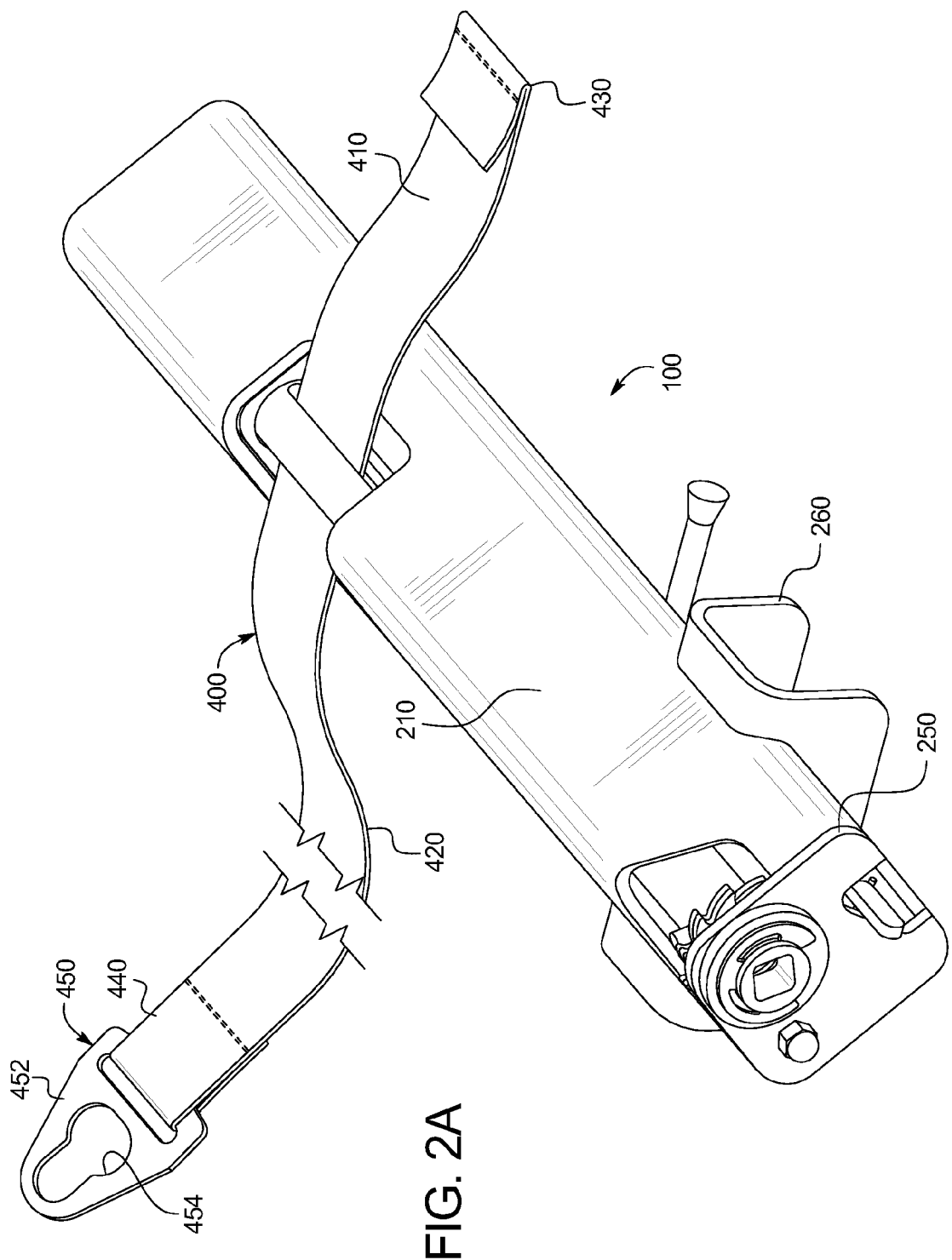
FIG. 2A is front perspective view of the active wheel chock of FIG. 2, shown with all of its components assembled and including the wheel harness strap.
Figure 4:
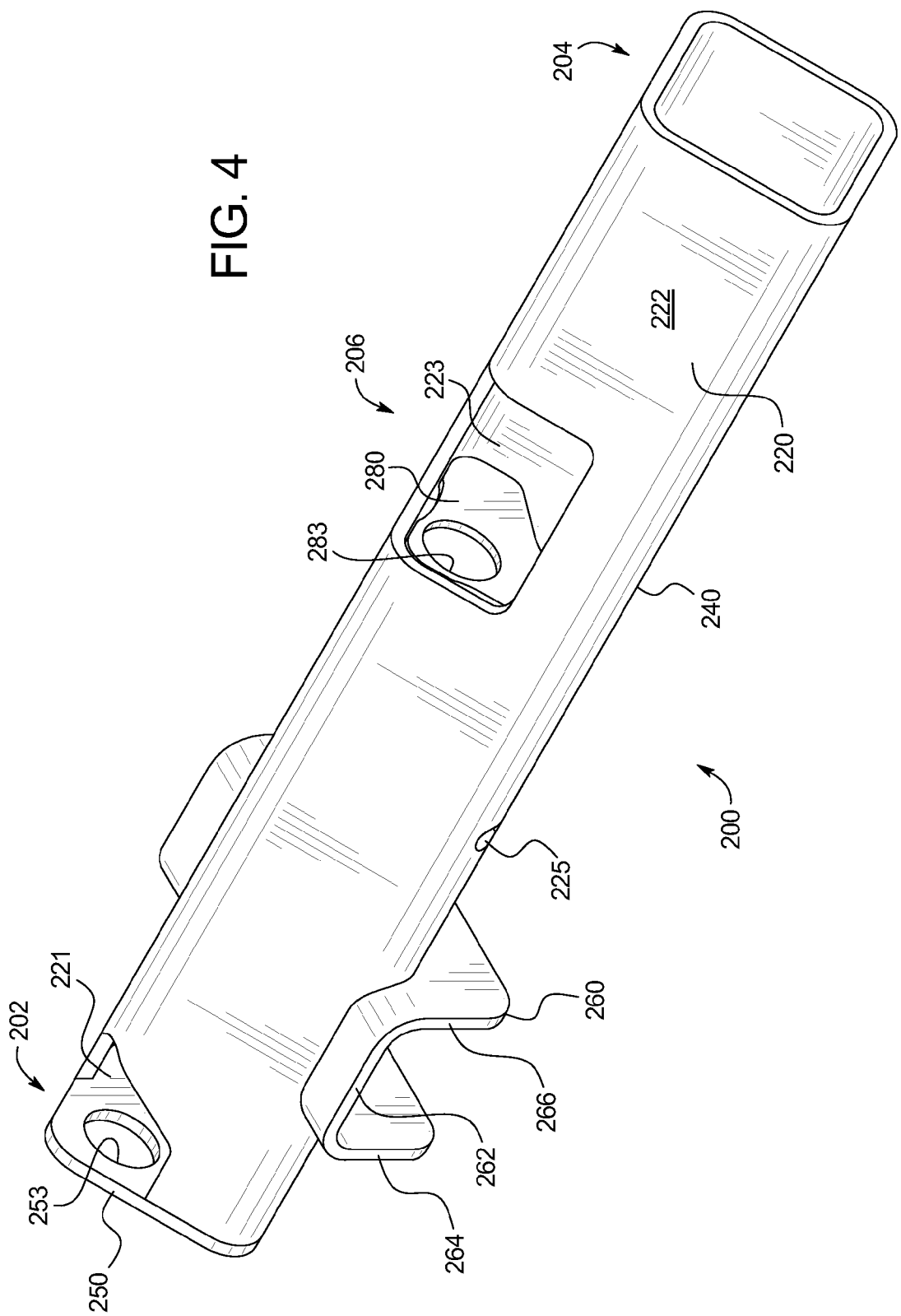
FIG. 4 is a rear perspective view of the chock body of the active wheel chock of FIG. 2, shown without the rail engager, wheel harness strap, and wheel harness strap tensioner components of the active chock.
Figure 6:
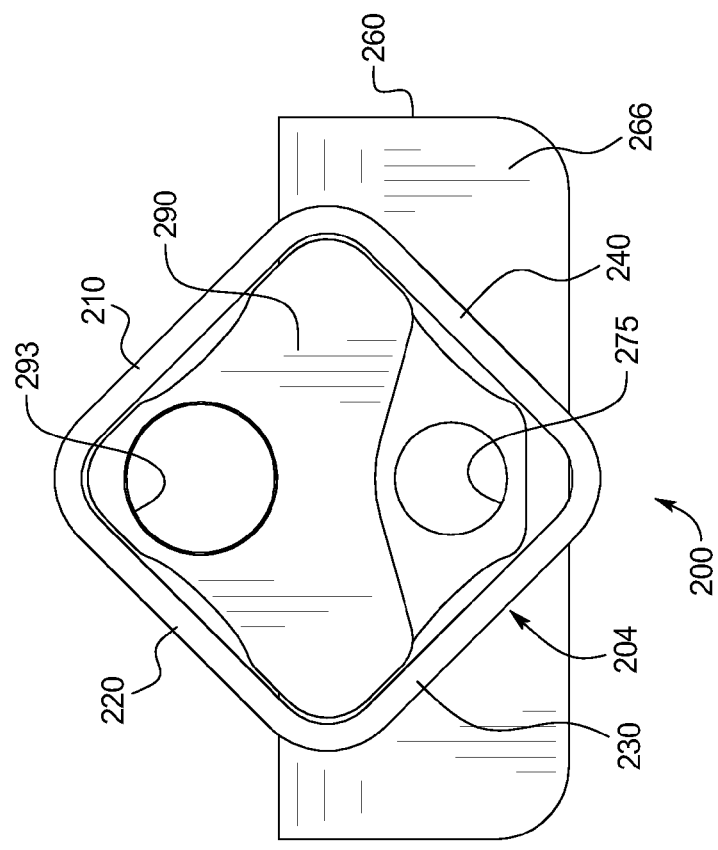
FIG. 6 is a rear (or toe) end view of the chock body of the active wheel chock of FIG. 2, shown without the rail engager, wheel harness strap, and wheel harness strap tensioner components of the active chock.
Figure 5:
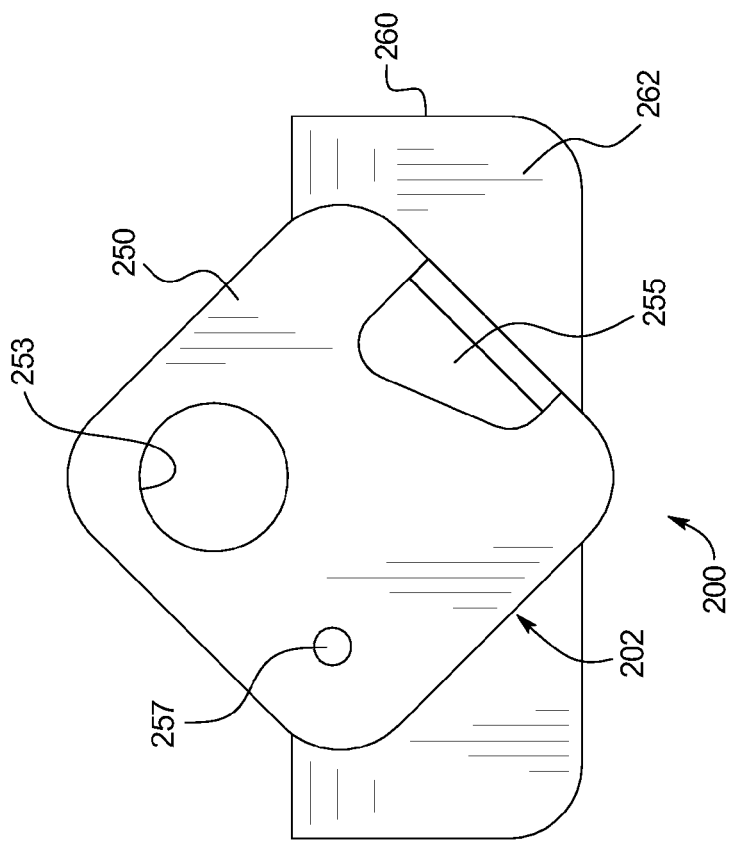
FIG. 5 is a front (or heel) end view of the chock body of the active wheel chock of FIG. 2, shown without the rail engager, wheel harness strap, and wheel harness strap tensioner components of the active chock.
Figure 7:
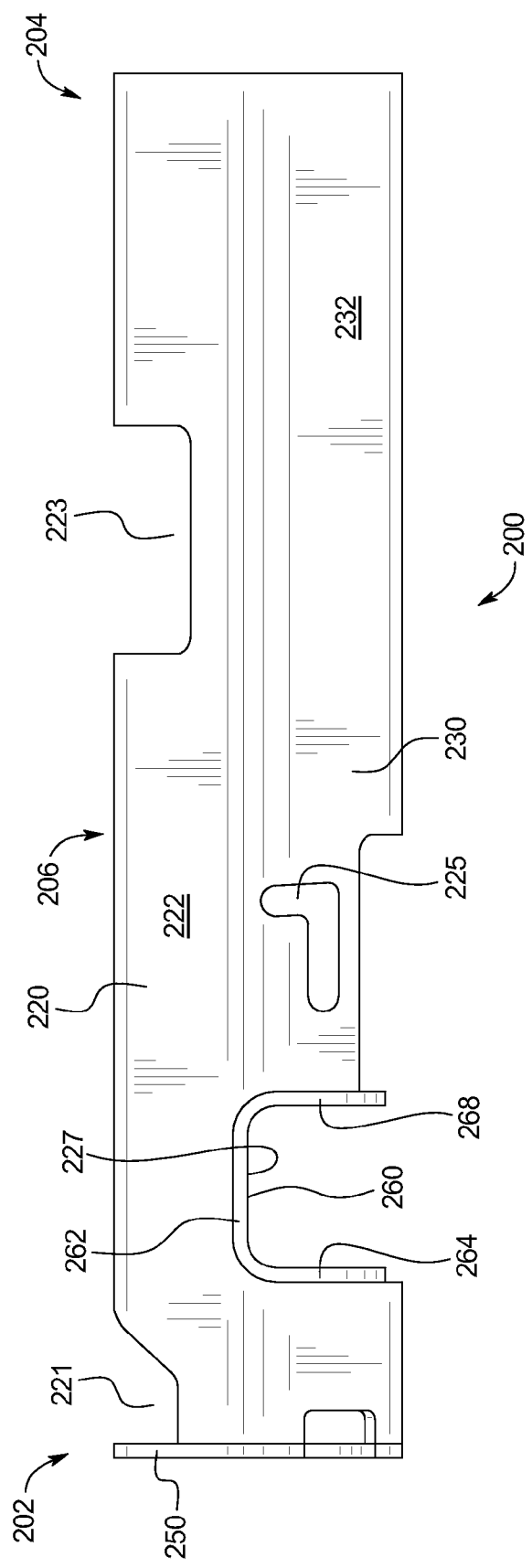
FIG. 7 is a right side view of the chock body of the active wheel chock of FIG. 2, shown without the rail engager, wheel harness strap, and wheel harness strap tensioner components of the active chock.
Figure 8:
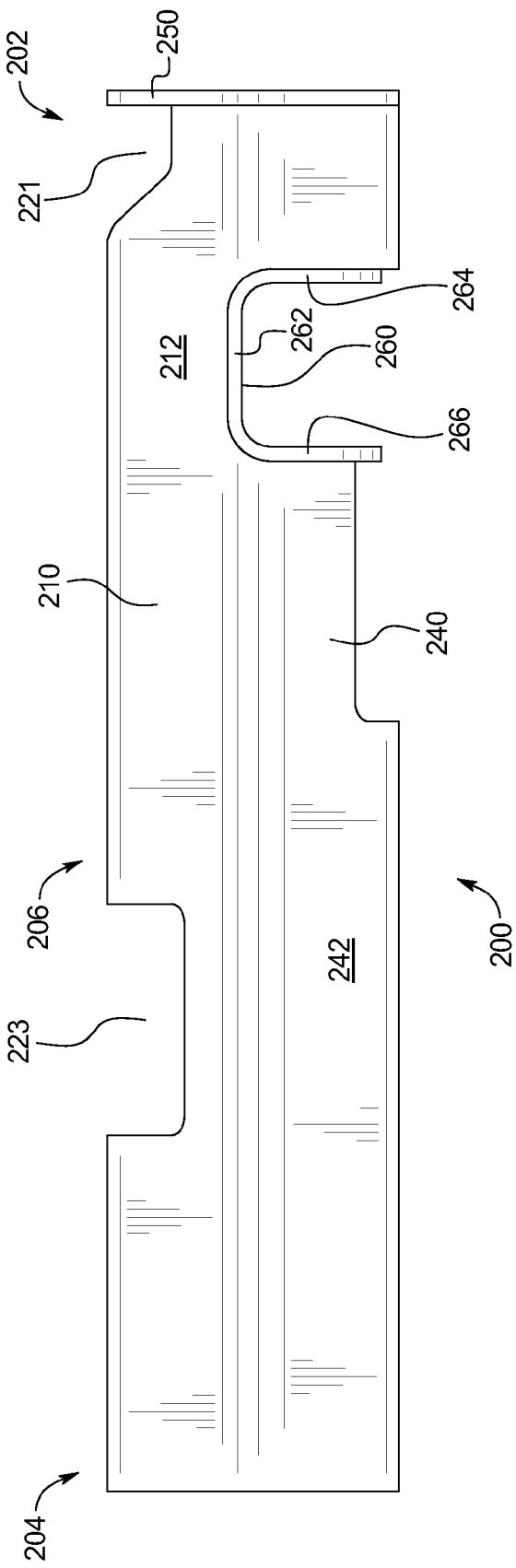
FIG. 8 is a left side view of the chock body of the active wheel chock of FIG. 2, shown without the rail engager, wheel harness strap, and wheel harness strap tensioner components of the active chock.
Figure 9:
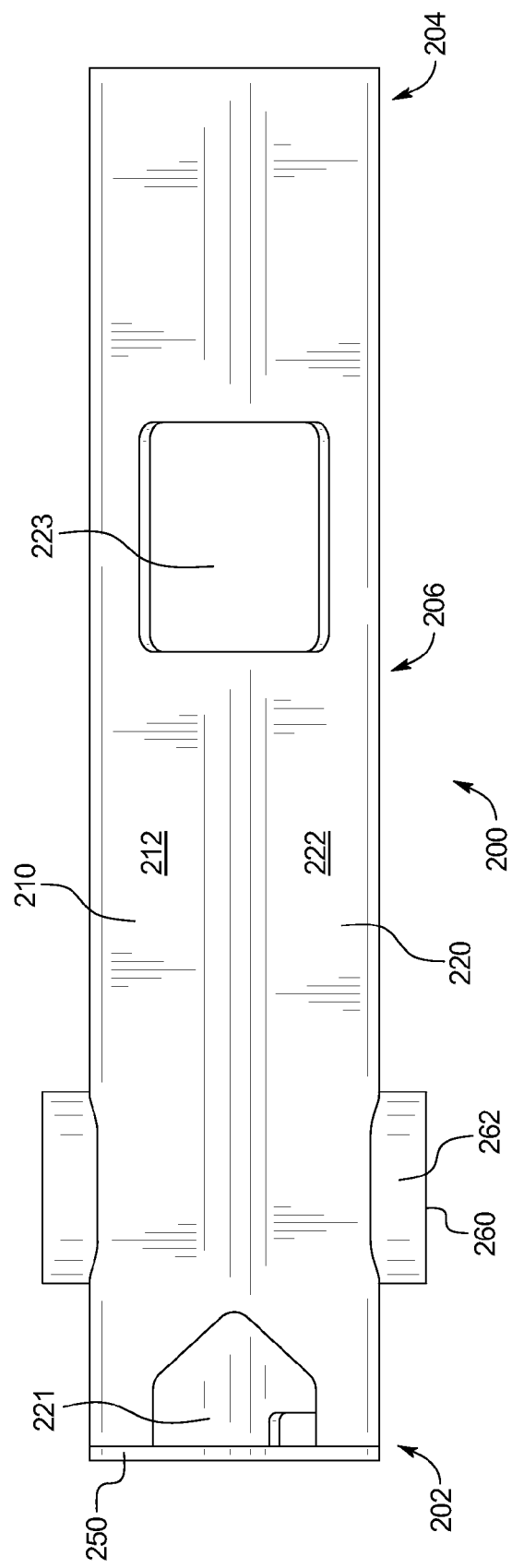
FIG. 9 is a top plan view of the chock body of the active wheel chock of FIG. 2, shown without the rail engager, wheel harness strap, and wheel harness strap tensioner components of the active chock.
Figure 10:
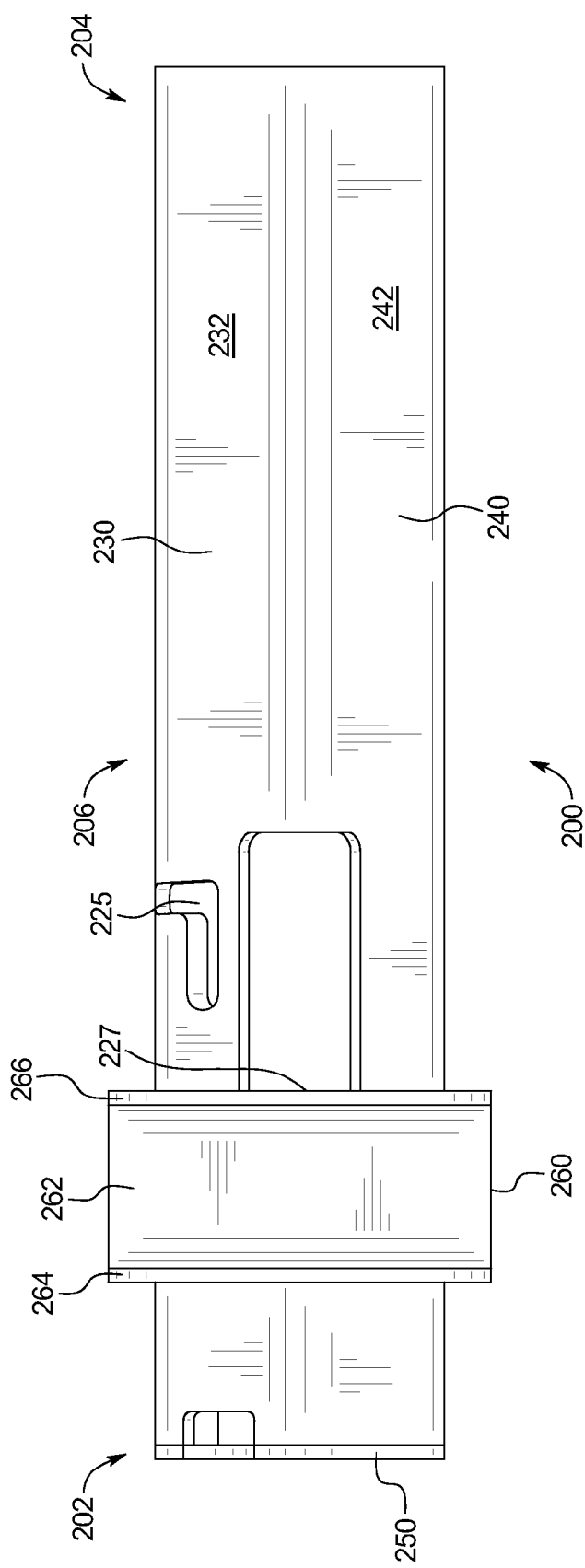
FIG. 10 is a bottom view of the chock body of the active wheel chock of FIG. 2, shown without the rail engager, wheel harness strap, and wheel harness strap tensioner components of the active chock.

As best seen in FIGS. 2, 2A, 11, 11B, and 12, the wheel harness strap tensioner 500 generally includes a hollow torque tube 510, a ratchet mechanism 530 connected to the torque tube 510, and a release lever 550. The strap 400 is connected to the torque tube 510 (as best shown in FIGS. 2A and 23) and the torque tube 510 is configured to rotate counter-clockwise to wind the strap 400 about the torque tube 510. The ratchet mechanism 530 is configured to facilitate the rotation of the torque tube 510 to wind the strap about the torque tube 510 which in turn tightens the strap 400 about the tire 1004 of the wheel 1002. The release lever 550 is configured to: (a) releasably engage the ratchet mechanism 530 to prevent undesired clockwise rotation of the ratchet wheel 532 (and thus undesired rotation of the torque tube 510 and undesired unwinding of the strap 400) by engaging (one or more) of the teeth 531 of the ratchet wheel 532; and (b) disengage and release the ratchet mechanism 530 when a user desires to release the tension on the strap 400 and unwind the strap 400 to reset the strap 400 or to remove the strap 400 and to remove the active and anchor chocks 100 and 600 from the rail 50 after use and before the vehicle is unloaded from the auto-rack car.

The torque tube 510 longitudinally extends, is supported by, and is rotatably mounted within the chock body 200, and specifically extends though aligned openings 253, 273, 283, and 293, is supported by walls 250, 270, 280, and 290, and is configured to rotate with respect to walls 250, 270, 280, and 290. In this illustrated embodiment, the torque tube 510 and the openings 253, 273, 283, and 293 extend along an upper central axis of the chock body 200 as mentioned above. In this embodiment, the torque tube 510 extends in an area adjacent to the apex of the substantially diamond shaped tube of the chock body 200 and in the same or substantially the same vertical plane as the apex and trough of the substantially diamond shaped tube of the chock body 200. The torque tube 510 includes: (a) a first end extending toward the toe 204 of the chock body 200 of the active chock 100; and (b) a second end extending toward the heel 202 of the chock body 200 of the active chock 100 and connected to the ratchet mechanism 530 as further discussed below. The torque tube 510 is also suitably slotted (as best shown in FIGS. 2, 2A, and 11) to enable end 430 of the strap 400 to be threaded through and thus attached to the torque tube 510 such that the strap 400 will be: (a) attached to the torque tube 510; and (b) wound about the torque tube 510 upon counter-clockwise rotation of the torque tube 510. It should be appreciated that the strap may be attached to the torque tube in other suitable manners in accordance with the present disclosure.

The ratchet mechanism 530 of this illustrated embodiment which is best shown in FIGS. 2, 11, 11B, and 12 includes: (a) a first or outer cylindrical shaft 534; (b) a ratchet wheel 532 attached to the shaft 534; and (c) a second or inner cylindrical shaft 536 extending from the first cylindrical or outer shaft 534. The ratchet wheel 532 is suitably connected to the first or outer shaft 534 such that when the first or outer shaft 534 rotates, the ratchet wheel 532 rotates. The second or inner shaft 536 is also suitably connected to the first or outer shaft 534 such that when the first or outer shaft 534 rotates, the second or inner shaft 536 rotates.

The first or outer shaft 534 includes a heel side first end which is configured to extend through the opening 253 in the end wall 250 and to be rotatably supported by the end wall 250. More specifically, the wheel harness strap tensioner 500 includes: (a) an inner washer 540 (best shown in FIG. 2) positioned on the first or outer shaft 534 between the toe side surface of the end wall 250 and the ratchet wheel 532; (b) outer washer 542 (best shown in FIGS. 2, 11, and 12) positioned on the first or outer shaft 534 adjacent to the heel side surface of the end wall 250; and (c) a locking or retaining ring 544 (best shown in FIGS. 2 and 12) which engages a suitable annular groove 535 (best shown in FIG. 11B) toward the end of the first or outer shaft 534 for locking the first or outer shaft 534 in place while still enabling the first or outer shaft 534 to rotate. The first or outer shaft 534 also includes a suitable tool engager. More specifically, in this illustrated embodiment, the first or outer shaft 534 includes a tool receiving socket 537 (best shown in FIGS. 2A, 11, and 11B) configured to receive a tool (not shown) such as a ratchet (not shown) for enabling a user to rotate the ratchet mechanism 530 and thus rotate the torque tube 510. In this illustrated embodiment, the socket 537 is a generally square tool receiving slot configured to receive the head of a standard ½ inch ratchet (not shown).

The second or inner shaft 536 has a toe side end of a second size configured to be received in the open heel side end of the torque tube 510 and to be secured to the torque tube 510 by a suitable fastener such as locking pin 558 (as best shown in FIGS. 2 and 12). This configuration prevents lateral movement of the torque tube 510 in the direction toward the toe 204 of the chock body 200 of the active chock 100. It should be appreciated that in this illustrated embodiment, the second or inner shaft 536 has a smaller outer diameter than the first or outer shaft 534, and that the present disclosure contemplates that the outer diameters of these shafts may be the same, or that the second or inner shaft 536 may have a lager outer diameter than the first or outer shaft 534.

The release lever 550 (best shown in FIGS. 2, 11, and 12) of the wheel harness strap tensioner 500 includes a pawl 560 configured to engage the teeth 531 of the ratchet wheel 532 to prevent undesired rotation of the torque tube 510 and undesired unwinding of the strap 400. More specifically, the release lever 550 includes a body having: (a) an attachment end 552 which is configured to be attached to the end wall 250 by a suitable fastener such as locking bolt 580 and nut 582 (best shown in FIG. 2); (b) an extending pawl 560 configured to engage the teeth 531 of the ratchet wheel 532; and (c) an activation arm 556 extending outwardly through opening 255 and configured to be moved by a loader using the active chock 100. The wheel harness strap tensioner 510 further includes a suitable spring 590 (best shown in FIGS. 2, 11, and 12) configured to maintain the release lever 550 and specifically the pawl 560 in the engaged position with one of the teeth 531 of the ratchet wheel 532 except when the activation arm 556 is moved downwardly by a loader from the normal or resting up position to a lower release position, which causes disengagement of the pawl 560 to disengage from any of the teeth 531 of the ratchet wheel 532. It should be appreciated that the release lever 550 (and specifically the activation arm 556) is configured such that a loader can move the activation arm 556 downwardly with the loader's foot while pulling the strap with either one of the loader's free hands.

It should thus be appreciated from the above that the release lever 550, the shafts 534 and 536, and the ratchet wheel 532 provide a pawl and ratchet type mechanism that functions to lock the torque tube 510 against undesired movement in one direction and particularly against unwinding of the strap 400 as it is being tensioned and after it is fully tensioned. In this example embodiment, the ratchet wheel 532 and the torque tube 510 are: (a) turned counterclockwise to tension the strap 400; and (b) released in a clockwise fashion to reduce the tension on the strap 400. It should be appreciated that in other embodiments, this configuration can be reversed.

It should be appreciated from the above that: (a) the locking pin of the rail engager extends substantially along a first longitudinal axis extending through an area adjacent to a trough of the substantially diamond shaped elongated tube of the chock body of the active chock; (b) the torque tube of the wheel harness strap tensioner extends substantially along a second longitudinal axis extending through an area adjacent to an apex of the substantially diamond shaped elongated tube of the chock body of the active chock; and (c) the first longitudinal axis and the second longitudinal axis extend in a vertical or substantially vertical plane and with the apex and bottom of the trough of the substantially diamond shaped tube. This configuration provides for a substantially compact and efficient arrangement of these components in the chock body. This configuration also positions the torque tube and the strap closer to the tire than any known commercially available vehicle restraint apparatus.

In this illustrated embodiment, the elongated walls of the substantially diamond shaped tubular chock body of the active chock are each made from steel, and particularly are integrally formed from a length of tubular steel turned forty-five degrees on its side to form the substantially diamond shape active chock body. More specifically, in this illustrated embodiment, the elongated tube of the active chock body is initially formed from a substantially square section of tubular steel wherein the width of each wall is approximately 3.00 inches, wherein the height from apex to trough is approximately 3.775 inches, wherein the width is approximately 3.775 inches, wherein the thickness of each wall is 0.125 inches, and wherein length is approximately 17.00 inches.

In this illustrated embodiment, the upside down U-shaped rail saddle of the chock body of the active chock is made from a section of steel plate. In one embodiment, the locking pin receiving openings are formed and then the plate is bent to form the side walls. The formed rail saddle is then welded to the walls of the elongated tube. The heel side transversely extending end wall and the transversely extending intermediate walls are made from steel plates and welded to the walls which define the elongated tube of the chock body. This configuration and method of manufacture provides the chock body with additional substantial strength. It should be appreciated that the transversely extending walls add structural rigidity to the chock body (for both active and anchor chocks). It should also be appreciated that additional transversely extending walls or other structural supports can be added to the chock bodies.

It should be appreciated that the chock body of the active chock can be made from other suitable materials and in other suitable manners in accordance with the present disclosure. For example, the chock body can be made from a molded plastic material having sufficiently strong impact strength over a wide range of temperatures normally encountered by auto-rack cars. It should also be appreciated that in certain alternative embodiments the chock body of the active chock can be formed in other suitable shapes that provide the same or substantially the same advantages of the substantially diamond shaped chock body. For example, in alternative embodiments, the chock body has a round, oval or triangular configuration.

In this illustrated embodiment, the locking pin is made from steel, the activation lever is made from steel, and the coil spring is also made from steel. However, it should be appreciated one or more of these components can be made from other suitable materials.

In this illustrated embodiment, the torque tube, the ratchet mechanism, and the release lever are also made from steel. However, it should be appreciated one or more of these components can be made from other suitable materials.

In this illustrated embodiment, the anchor plate of the strap is made from steel. However, it should be appreciated that this component can be made from other suitable materials.

In this illustrated embodiment, the strap body is made from a suitable woven fabric such as nylon having an acceptable strength. For example, in certain embodiment, the strap is made of material similar to that used in seatbelts for automobiles and airplanes. It should be appreciated that the strap body can be made from alternative materials in accordance with the present disclosure. It should also be appreciated that other suitable type tire engaging straps may be employed in the vehicle restraint apparatus of the present disclosure. For example, in certain alternative embodiments, the strap includes a harness with multiple sections (not shown) which are configured to engage the tire of the wheel. In other example alternative embodiments, the strap includes a plurality of spaced apart tire-engaging blocks (not shown) which include one or more longitudinally extending ribs (not shown) projecting from the underside for engagement to or in the treads 1006 of the tire 1004 to inhibit lateral movement of the strap along the treads 1006 of the tire 1004. The blocks may be made of a suitable resilient material such as natural or synthetic rubber or any other type of plastic that would enhance the frictional engagement desired when in contact with a tire of the wheel.

It should further be appreciated that the rail engager and the wheel harness strap tensioner of the active chock can be alternatively configured or can include different components or different arrangements of components than described above in accordance with the present disclosure.

Anchor Wheel Chock

More specifically, in this illustrated embodiment as best seen in FIGS. 13, 14, 15, 16, 17, 18, 19, 20, 21, 22, 23, 24, 25, 26, and 27, the anchor chock 600 includes a chock body 700, a rail engager 800 mounted to the chock body 600, a wheel harness strap anchor 900 extending from the chock body 700, Turning now first to the non-movable parts of the anchor wheel chock 600, the chock body 700 includes a heel 702, a toe 704, and an intermediate section 706 extending between the heel 702 and the toe 704. The chock body 700 includes: (a) a substantially diamond shaped elongated tube which includes four integrally connected elongated walls 710, 720, 730, and 740; (b) a heel side transversely extending end wall 750 integrally connected (such as by welding) to the heel side ends of the elongated walls 710, 720, 730, and 740; (c) an upside down U-shaped rail saddle 760 integrally connected (such as by welding) to the elongated walls 710, 720, 730, and 740; and (d) a first transversely extending intermediate wall 770 (best seen in FIG. 22) positioned in the substantially diamond shaped elongated tube and integrally connected (such as by welding) to the inner surfaces of the elongated walls 710, 720, 730, and 740. It should be appreciated that wall 770 can be connected in other ways and that this transversely extending wall does not need to be connected to each of the elongated walls 710, 720, 730, and 740.

The elongated walls 710, 720, 730, and 740 of the substantially diamond shaped elongated tube each have inner and outer surfaces, a heel edge and a toe edge. More specifically, (a) elongated wall 710 has a tire tread engaging outer surface 712, an inner surface, a heel edge, and a toe edge; (b) the elongated wall 720 has an outer surface 722, an inner surface, a heel edge, and a toe edge; (c) the elongated wall 730 has an outer surface 732, an inner surface, a heel edge, and a toe edge; and (d) the elongated wall 740 has an outer surface 742, an inner surface, a heel edge, and a toe edge. It should be appreciated that in this illustrated embodiment the walls 710, 720, 730, and 740 have or are interconnected by curved or radius corners in this illustrated embodiment, but that the present disclosure is not limited to having such curved or radius corners.

The elongated walls 710, 720, 730, and 740 of the substantially diamond shaped elongated tube define a plurality of cut-outs or openings which: (a) provide access to the internal areas of the tube of the chock body 700; (b) provide access to the internal components of the anchor chock 600 for assembly; (c) enable parts connected to the internal components of the anchor chock 600 to extend outwardly from the tube as further discussed below; and (d) provide drainage for any water in the chock body 700. More specifically: (a) walls 720 and 730 define a rail engager activation lever opening or slot 725; and (b) walls 710, 720, 730, and 740 define a rail saddle receiving opening 727.

Figure 14:
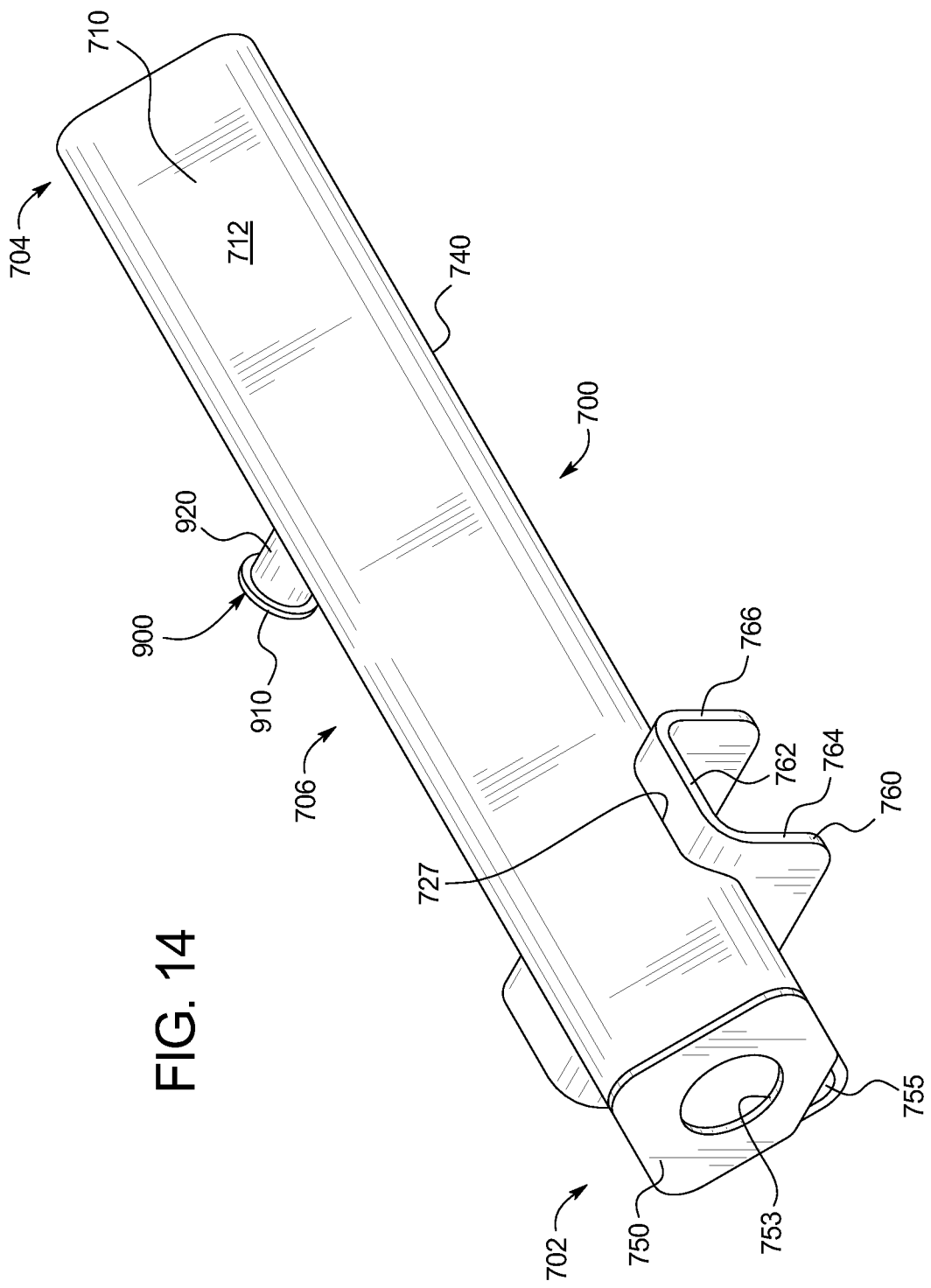
FIG. 14 is a front perspective view of the chock body of the anchor wheel chock of FIG. 13, shown without the rail engager components of the anchor chock.
Figure 15:
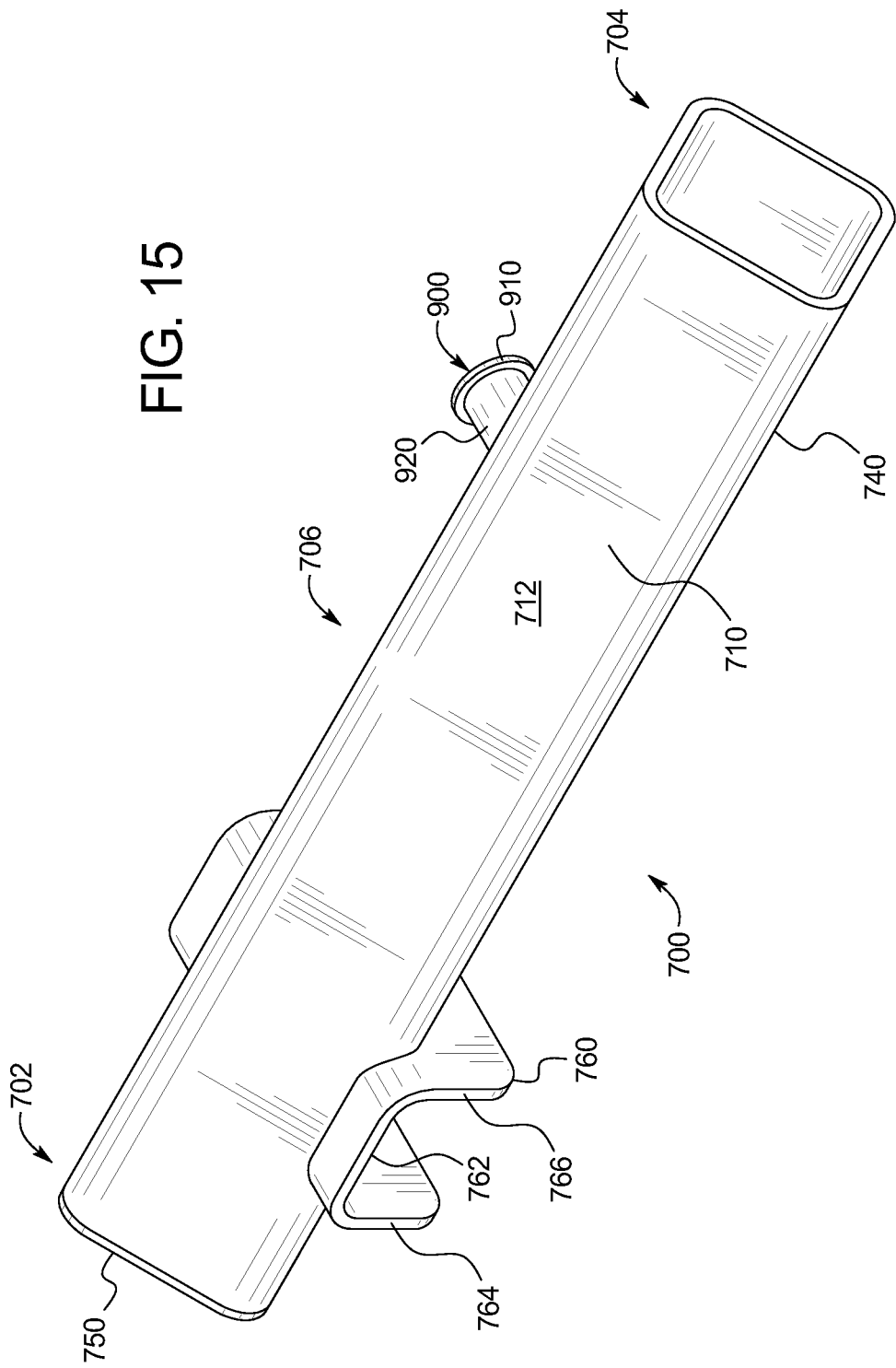
FIG. 15 is a rear perspective view of the chock body of the anchor wheel chock of FIG. 13, shown without the rail engager components of the anchor chock.
Figure 16:
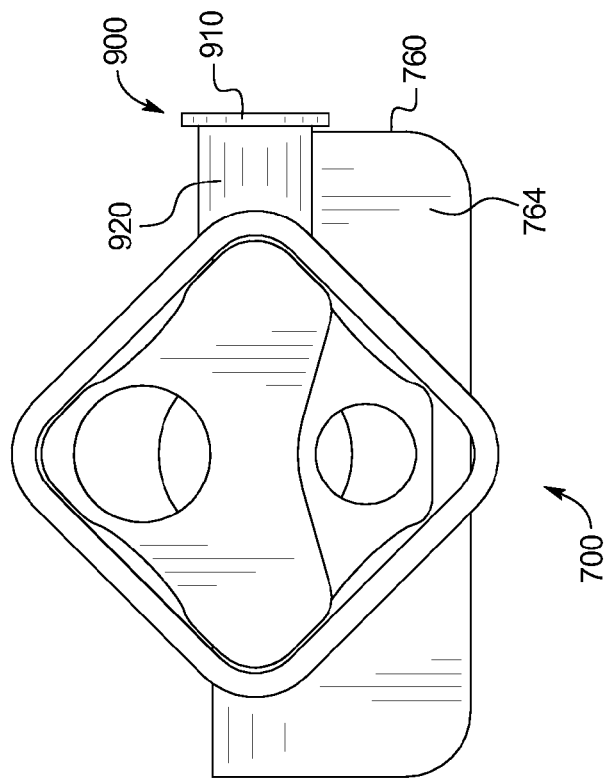
FIG. 16 is a front (or heel) end view of the chock body of the anchor wheel chock of FIG. 13, shown without the rail engager components of the anchor chock.
Figure 17:
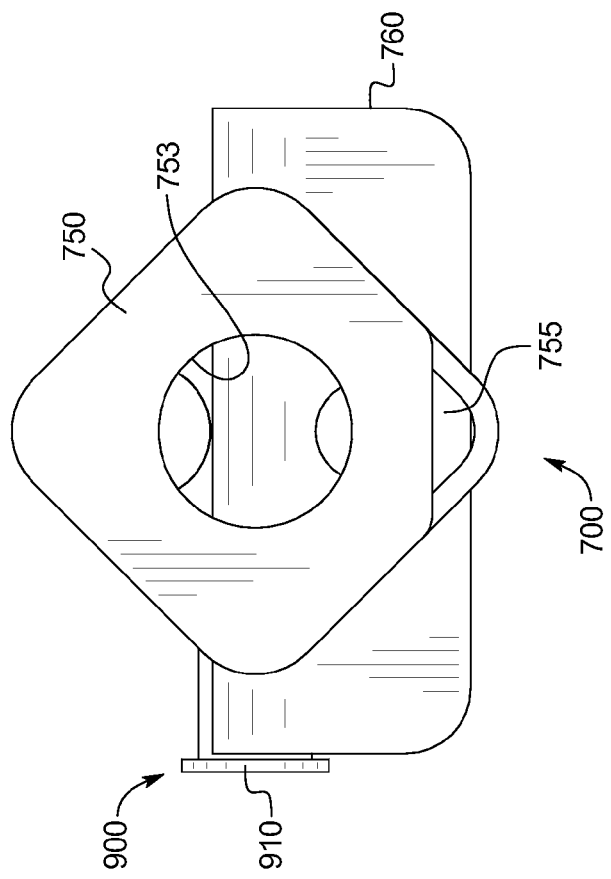
FIG. 17 is a rear (or toe) end view of the chock body of the anchor wheel chock of FIG. 13, shown without the rail engager components of the anchor chock.
Figure 18:
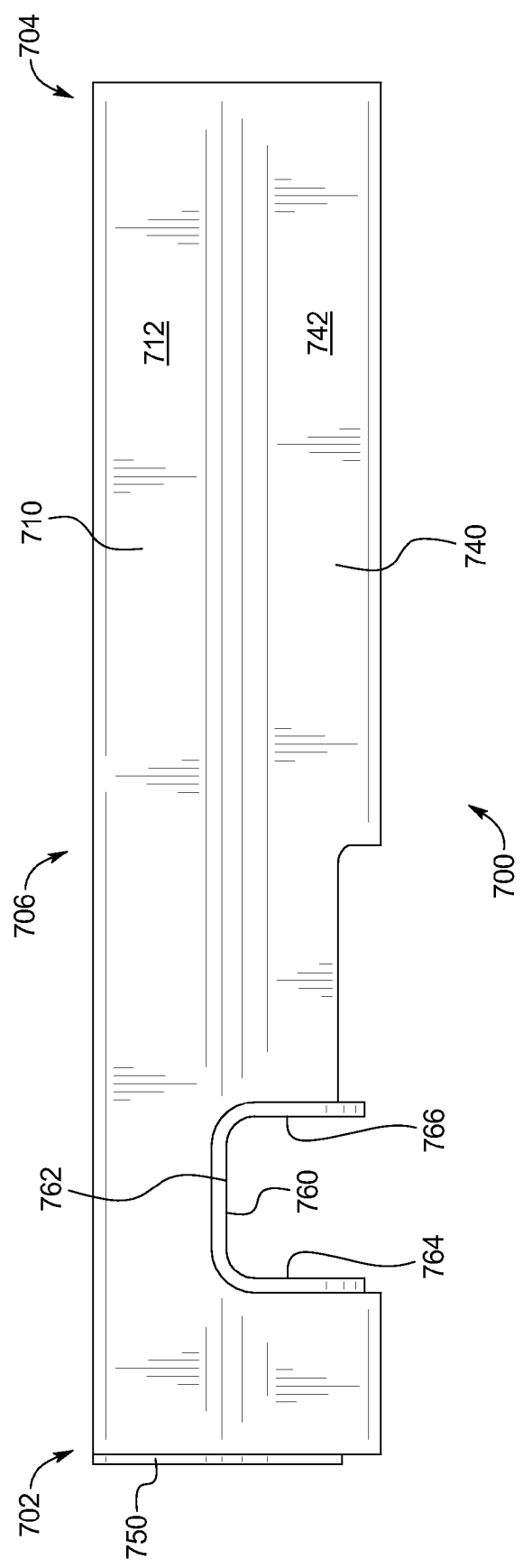
FIG. 18 is a right side view of the chock body of the anchor wheel chock of FIG. 13, shown without the rail engager components of the anchor chock.
Figure 19:
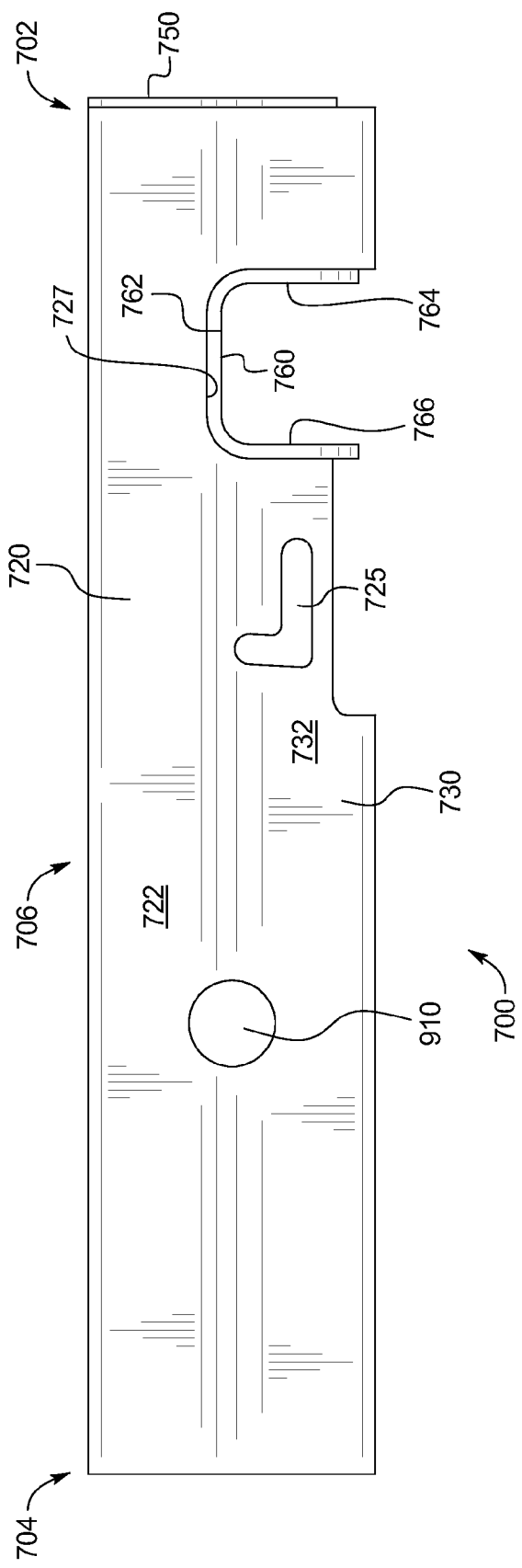
FIG. 19 is a left side view of the chock body of the anchor wheel chock of FIG. 13, shown without the rail engager components of the anchor chock.
Figure 20:
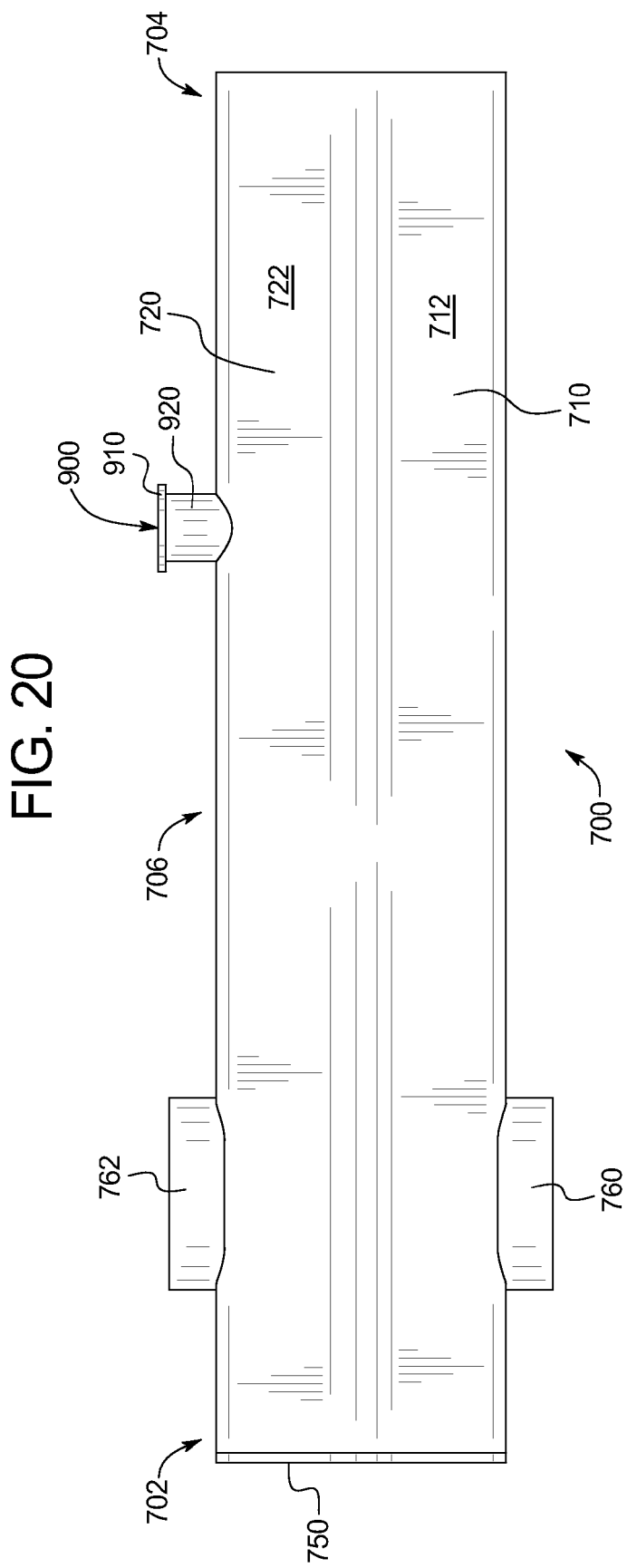
FIG. 20 is a top plan view of the chock body of the anchor wheel chock of FIG. 13, shown without the rail engager components of the anchor chock.
Figure 21:
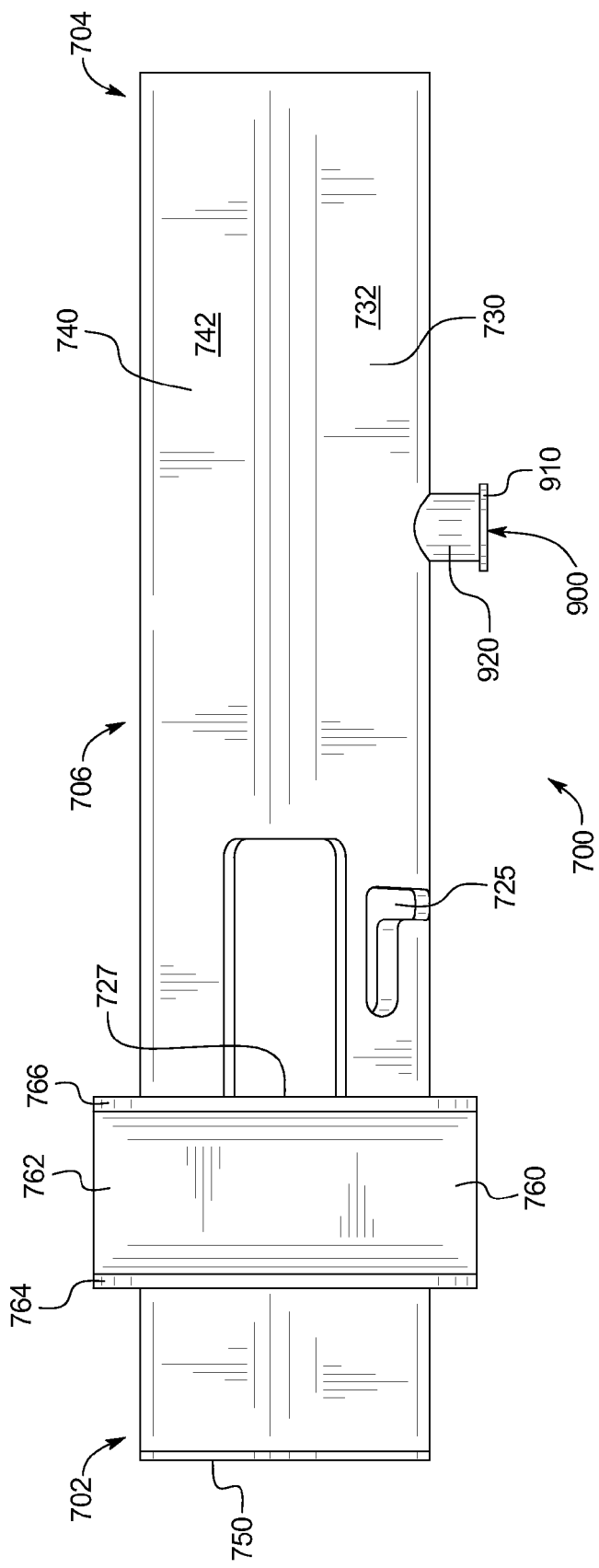
FIG. 21 is a bottom view of the chock body of the anchor wheel chock of FIG. 13, shown without the rail engager components of the anchor chock.

The heel side transversely extending end wall 750 is integrally connected (such as by welding) to the heel edges of the elongated walls 710, 720, 730, and 740. The end wall 750 defines a plurality of cut-outs or openings which: (a) provide access to the internal areas of the tube; and (b) provide access to the internal components of the anchor chock 600 for assembly. More specifically, in this illustrated embodiment, the end wall 750 defines: (a) an access opening 753 (as best shown in FIGS. 14 and 16) for providing access to the interior section of the chock body 700; and (b) a drainage opening 755 (as also best shown in FIGS. 14 and 16) for facilitating drainage of any water which enters the chock body 700. It should be appreciated that while the end wall 750 adds extra strength to the chock body 700, the present disclosure contemplates that the end wall 750 can be removed from the chock body 700.

The upside down U-shaped rail saddle 760 is positioned in the rail saddle receiving opening 727 and is integrally connected (such as by welding) to the edges of the elongated walls 710, 720, 730, and 740 that define the rail saddle receiving opening 727. The upside down U-shaped rail saddle 760 includes an upper wall 762, a first side wall 764, and a second side wall 766, which each extend transversely to the tubular body and specifically transversely to the elongated walls 710, 720, 730, and 740 of the tubular body. The upside down U-shaped rail saddle 760 is configured to fit over and rest on the rail 50. Specifically, the upper wall 762 is configured to engage the top of the rail 50, the first side wall 764 is configured to extend adjacent to one side of the rail 50, and the second side wall 766 is configured to extend on the other side of the rail 50 as illustrated in FIGS. 25 and 26. It should be appreciated that having the upper wall 762 rest on the rail 50 enables the chock body 700 to be at the lowest point in the safe zone adjacent to the wheel.

Figure 22:
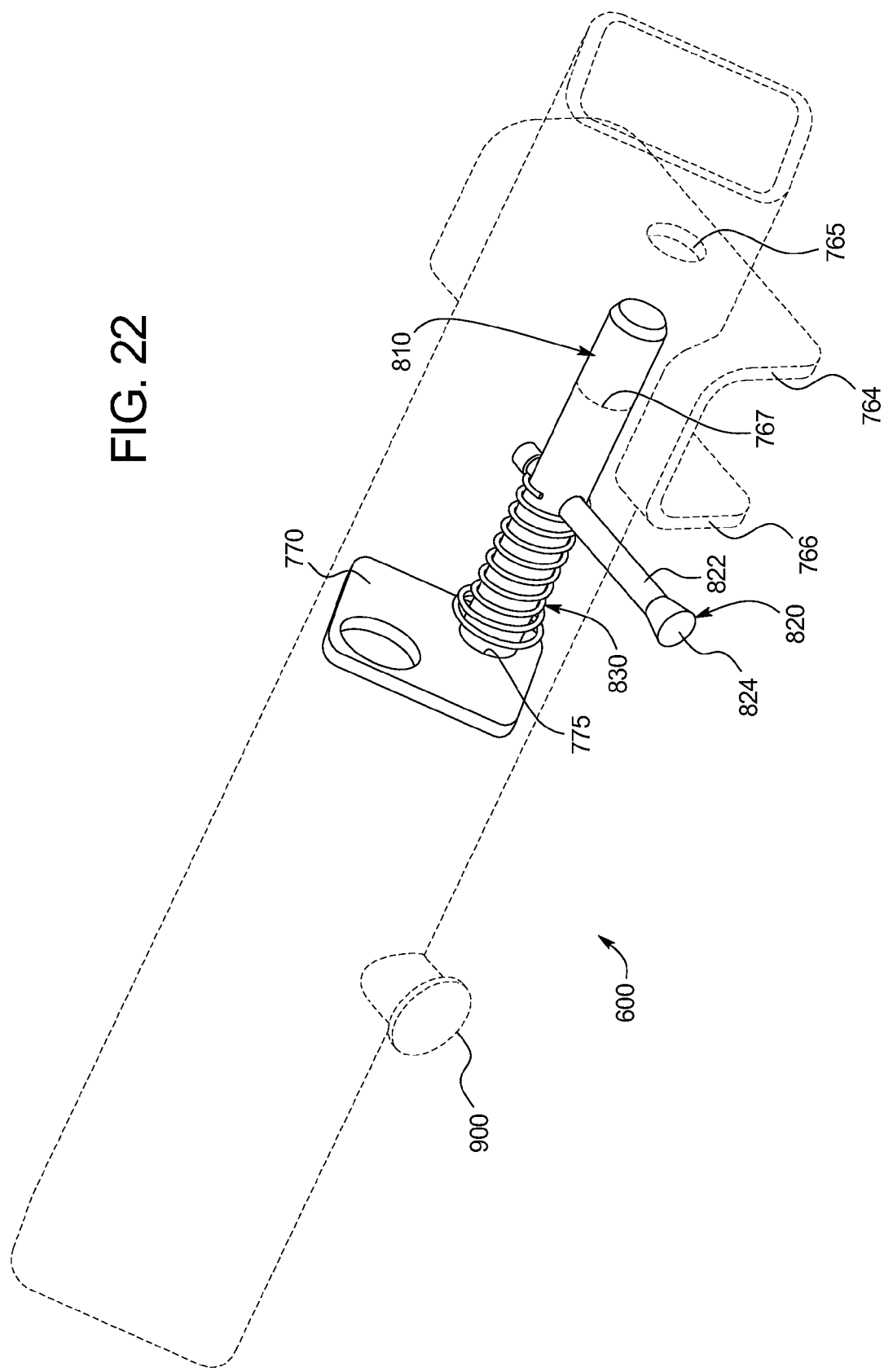
FIG. 22 is a front perspective view of the anchor wheel chock of FIG. 13, shown with most of the chock body in phantom to better illustrate the rail engager components of the anchor chock.

The first side wall 764 defines a locking pin receiving opening 765, and the second side wall 766 defines a locking pin receiving opening 767 aligned with the locking pin receiving opening 765 (as best shown by FIG. 22). It should be appreciated that in this example embodiment, the locking pin 810 (described below) does not extend into the locking pin receiving opening 765, but that in other embodiments, the locking pin can extend into the locking pin receiving opening 765. It should further be appreciated that the locking pin receiving opening 765 is formed in the first side wall 764 of the rail saddle 760 for ease of manufacturing, and specifically to enable the rail saddle 760 to be mounted in the elongated tube in either direction.

The first intermediate wall 770 is positioned approximately midway in the substantially diamond shaped tube (as best shown in FIG. 22). The first intermediate wall 770 defines a locking pin receiving opening 775 which is aligned with the locking pin receiving opening 767 and aligned with the locking pin receiving opening 765.

In this illustrated embodiment, the aligned openings 765, 767, and 775 are positioned in and adjacent to the trough or bottom of the substantially diamond shaped tube of the chock body 700.

The wheel harness strap anchor 900 extends transversely from the chock body 700. The wheel harness strap anchor 900 includes a head 910 and a neck 920 having a first end attached to the head 910 and a second end attached to the body and specifically to walls 720 and 730. It should be appreciated that the anchor can be integrally connected (such as by welding) to one or more of these walls or connected in other suitable manners.

It should be appreciated that the body of the anchor chock of this illustrated embodiment of the present disclosure: (a) takes up a smaller area of the safe zone adjacent to the wheel than any known commercially available vehicle restraint; and (b) provides a greater strength to size ratio than the body of any known commercially available vehicle restraint. It should also be appreciated that the tubular configuration of the body of the anchor chock provides substantial rigidity utilizing relatively thin walls. It should further be appreciated that this configuration of the substantially diamond shaped tube of the chock body of the anchor chock has the greatest height at the point in which it is closest to the tire and then slopes away from the tire.

Figure 13:
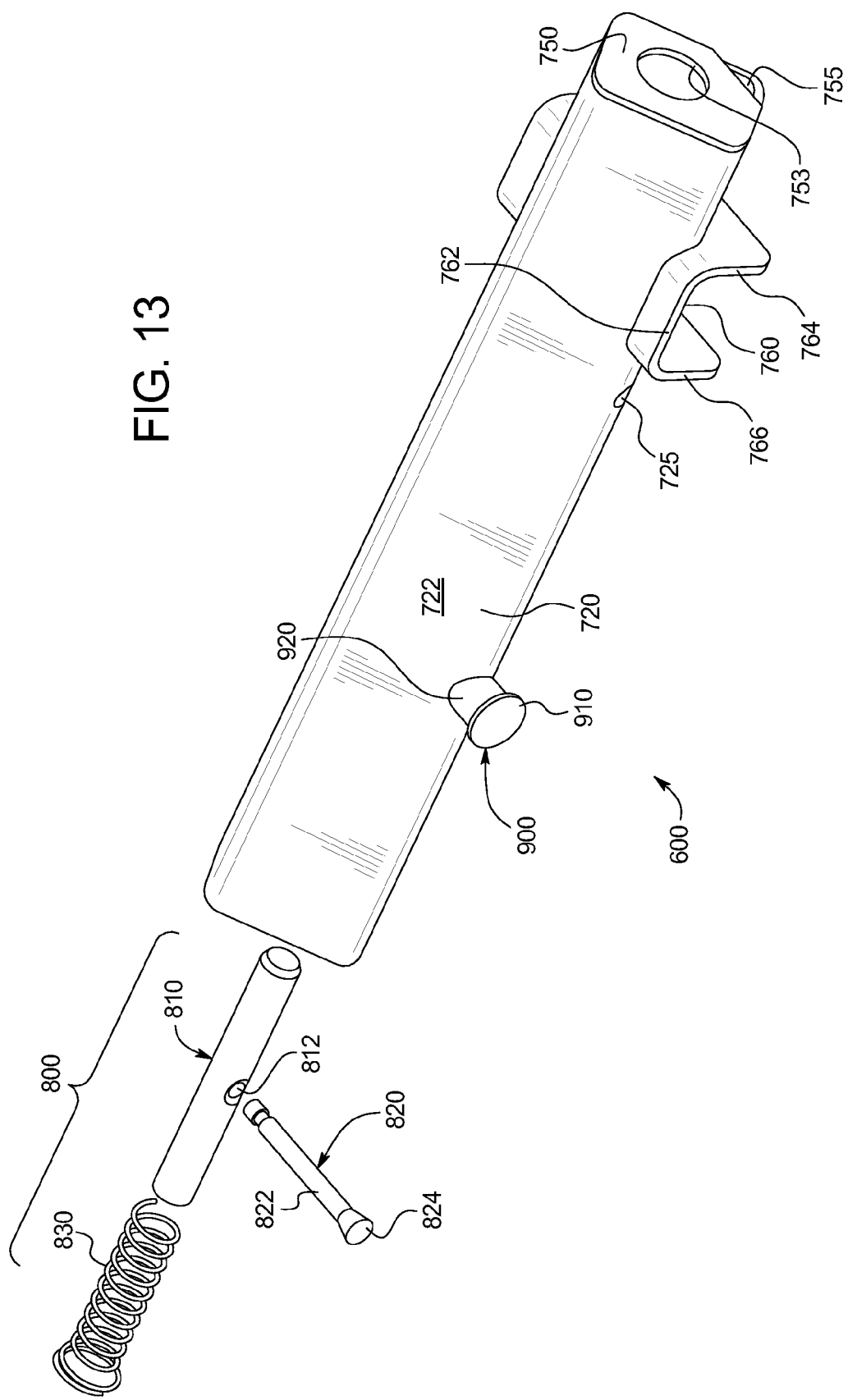
FIG. 13 is an exploded front perspective view of the anchor wheel chock of one embodiment of the present disclosure.

Turning now to the movable components of the anchor chock 600, as illustrated in FIGS. 13 and 22, the rail engager 800 is supported by the chock body 700 and configured to releasably lock the anchor chock 600 to the rail 50. The rail engager 800 generally includes a locking pin 810, an activation lever 820 connected to and extending transversely from the locking pin 810, and a biasing member such as coil spring 830 positioned about the locking pin 810.

More specifically, the locking pin 810 is positioned in the substantially diamond shaped tube of the chock body 700 in an area adjacent to the trough and in the same or substantially the same vertical plane as the apex and trough of the substantially diamond shaped tube of the chock body 700. The locking pin 810 extends through: (a) the locking pin receiving opening 767 of the side wall 766 of the rail saddle 760; and (b) the locking pin receiving opening 775 of the first intermediate wall 770. The locking pin 810 is supported by the side wall 766 of the rail saddle 760 and the first intermediate wall 770.

The activation lever 820 which is connected to and which extends transversely from the locking pin 810 includes a stem 822 and a head 824. One end of the stem 822 extends through the locking pin 810 and the other end of the stem 822 is connected to the head 824. In one embodiment, the end of the stem 822 extending through the locking pin 810 has or defines a spring engagement notch and the locking pin 810 includes a through hole 812 configured to receive the end of the stem 822 to facilitate assembly of the rail engager 800. The activation lever 820 and specifically the stem 822 extend through the rail engager activation lever opening 725.

The coil spring 830 is positioned or journaled about the locking pin 810 between the stem 822 and the first intermediate wall 770. The ends of the coil spring 830 respectively engage the stem 822 and the wall 870 as shown in FIG. 22. It should be appreciated that in this configuration, the coil spring 830 biases the locking pin 810 away from one of two retracted positions (discussed below) and toward an extended position (as shown in FIG. 22). In this illustrated embodiment, as mentioned above, the locking pin 810 does not extend through locking pin receiving opening 765 when in the locked position. It should be appreciated that in other embodiments, the locking pin 810 can extend through the locking pin receiving opening 765 in the locked position. In either of the retracted positions, the rail engaging end of the locking pin 810 is configured to engage the rail 50 to enable the chock body 700 and the entire active chock 600 to be placed on the rail 50 or removed from the rail 50. The two retracted positions include a locked retracted position and an unlocked retracted position. The rail engager 800 activation lever opening 725 has a generally sideways L shape and includes an upper slot section configured to receive the activation lever 820, and specifically the stem 822 of the activation lever 820, to prevent the activation lever 820 from moving toward the heel of the chock body 700. This upper slot section of the opening 725 thus provides for the locked retracted position. When the activation lever 820 is moved downwardly out of this upper slot section, the activation lever 820 is in the unlocked retracted position and will be biased by the coil spring 830 toward the extended position and thus toward the heel 702 and the rail locking position. In the extended or rail locking position, the heel side rail engaging end of the locking pin 810 is configured to extend through one of the holes in the rail 50 and lock the chock body 700 and the entire anchor chock 600 to the rail 50 as generally shown in FIGS. 25 and 26. This configuration provides a simple and effective mechanism for locking the anchor chock 600 onto the rail 50.

It should be appreciated from the above that: (a) the locking pin of the rail engager extends in the elongated tube substantially along a first longitudinal axis extending through an area adjacent to a trough of the substantially diamond shaped elongated tube of the chock body of the anchor chock; and (b) the first longitudinal axis extends in a vertical or substantially vertical plane and with the apex of and bottom of the trough of the substantially diamond shaped tube. This configuration provides for a substantially compact and efficient arrangement of these components in the chock body.

In this illustrated embodiment, the elongated walls of the substantially diamond shaped tubular chock body of the anchor chock are each made from steel, and particularly are integrally formed from a length of tubular steel turned forty-five degrees on its side to form the substantially diamond shape. More specifically, in this embodiment, the elongated tube of the anchor chock body is initially formed from a substantially square section of tubular steel wherein the width of each wall is approximately 3.00 inches, wherein the height from apex to trough is approximately 3.775 inches, wherein the width is approximately 3.775 inches, wherein the thickness of each wall is 0.125 inches, and wherein length is approximately 17.00 inches.

In this illustrated embodiment, the upside down U-shaped rail saddle of the chock body of the anchor chock is made from a section of steel plate. In one embodiment, the locking pin receiving openings are formed and then the plate is bent to form the side walls. The formed rail saddle is then welded to the walls of the elongated tube. The heel side transversely extending end wall and the transversely extending intermediate wall are made from steel plates and welded to the walls which define the elongated tube of the chock body. This configuration and method of manufacture provides the anchor chock body with additional substantial strength. It should be appreciated that the transversely extending walls add structural rigidity to the chock body (for both active and anchor chocks). It should also be appreciated that additional transversely extending walls or other structural supports can be added to the chock body.

It should be appreciated that the chock body of the anchor chock can be made from other suitable materials and in other suitable manners in accordance with the present disclosure. For example, the chock body can be made from a molded plastic material having sufficiently strong impact strength over a wide range of temperatures normally encountered by auto-rack cars. It should also be appreciated that in certain alternative embodiments the chock body of the anchor chock can be formed in other suitable shapes that provide the same or substantially the same advantages of the substantially diamond shaped chock body. For example, in alternative embodiments, the chock body has a round, oval, or triangular configuration.

In this illustrated embodiment, the wheel harness strap anchor is made from steel. However, it should be appreciated that this component can be made from other suitable materials.

In this illustrated embodiment, the locking pin is made from steel, the activation lever is made from steel, and the coil spring is also made from steel. However, it should be appreciated one or more of these components can be made from other suitable materials.

It should further be appreciated that the rail engager of the anchor chock can be alternatively configured or can include different components or different arrangements of components than described above in accordance with the present disclosure.

Operation of Vehicle Restraint Apparatus

To employ the active and anchor chocks of the present disclosure, after the vehicle 1000 is positioned in the auto-rack car 10, the loader places: (a) the anchor chock 600 on one side of the wheel 1002 and locks the anchor chock on the rail 50; and (b) the active chock 100 on the other side of the wheel 1002 and locks the active chock on the rail 50, as generally illustrated by FIGS. 23, 24, 25, 26, and 27. The loader then drapes the strap 400 over the tire 1004 of the wheel 1002 and connects the anchor plate 450 to the anchor 900 of the anchor chock 700. The loader then rotates the strap tensioner 500, and specifically the ratchet mechanism counterclockwise to tighten the strap 400 on the tire 1004 of the wheel 1002. It should be appreciated that: (a) in FIGS. 23, 24, 25, 26, and 27, the anchor chock 600 is positioned adjacent to the front side of the wheel 1002 and the active chock 100 is positioned adjacent to the rear side of the wheel 1002, and (b) the vehicle can be driven into the auto-rack car in the opposite direction and that in such case, the anchor chock 600 is positioned adjacent to the rear side of the wheel and the active chock 100 is positioned adjacent to the front side of the wheel.

To remove the active and anchor chocks, the loader activates the release arm 556 of the lever 550 to release the pawl 560 from the teeth of the ratchet wheel 532 which enables the torque tuber 510 to rotate clockwise and remove the tension on the strap 400. The anchor plate 450 is then removed from the anchor 900. The active and anchor chocks are then each unlocked from the rail 50 and removed from their respective positions in front of and behind the wheel 1002.

Reverse Configuration of the Active and Anchor Chocks

The above example embodiment of the present disclosure includes an active chock and anchor chock where: (a) the active chock is configured to be positioned on the right side of the anchor chock; and (b) the anchor chock is configured to be positioned on the left side of the active chock, as shown in FIGS. 23, 24, 25, 26, and 27. It should be appreciated that in alternative embodiments of the present disclosure, (a) the active chock is configured to be positioned on the left side of the anchor chock, and (b) the anchor chock is configured to be positioned on the right side of the active chock. In such embodiments, each of the active chock and the anchor chock would be in a reverse configuration. For example, in such a reverse configuration, (a) when looking from the heel end of the anchor chock, the anchor 900 and the locking pin activation lever 820 of the anchor chock would extend from the right side of the chock body 700 (instead of the left side); and (b) when looking from the heel end of the active chock, the locking pin activation lever 320 of the active chock would extend from the left side of the chock body 200 (instead of the right side). In this reverse configuration, the torque tube would rotate clockwise to tighten the strap and counterclockwise to loosen the strap.

Vehicle Restraint Apparatus Having Multiple Active Chocks

The above example embodiment of the present disclosure include an active chock and anchor chock where the active chock has a strap tensioner and the anchor chock does not have a strap tensioner. It should be appreciated that in alternative embodiments of the present disclosure, both of the chocks employed are active chocks with strap tensioners. In certain such embodiments, one or more connectors (not shown) may be employed for connecting the straps or strap ends.

Safe Zone

It should also be appreciated that each of the active and anchor chocks of the present disclosure operate in smaller areas of the safe zones in front of and behind each wheel than any known commercially available chock or vehicle restraint system.

Alternative Anchor Wheel Chock

A further alternative embodiment of the anchor chock of the present application is illustrated in FIGS. 28, 29, 30, 31, 32, 33, 34, 35, 36, 37, 38, 39, and 40, and generally indicated by numeral 2600. The anchor chock 2600 includes a chock body 2700, a rail engager 2800 mounted to the chock body 2600, a wheel harness strap anchor 2900 formed by the chock body 2700. This alternative embodiment of the anchor chock is configured to coact with an alternative attachment plate 2450 (shown in FIGS. 28, 38, 39, and 40) which is attached to a strap 400 of an active chock (which can be the same as active chock 100 except for this alternative attachment plate).

More specifically, in this illustrated embodiment, the alternative attachment plate 2450 includes a substantially flat substantially I-shaped body 2452 including a head 2454, a neck 2456 extending downwardly and transversely to the head 2454, and engagement arms 2458 and 2460 each extending outwardly and transversely to the neck 2456. The head 2454 defines a slot 2455 for facilitating attachment to the strap 400. The engagement arms 2458 and 2460 are each configured to engage an inside surface of a section of one of the elongated walls of the anchor chock body 2700 such as the inside surface of the elongated wall 2720 as generally shown in FIGS. 28, 38, 39, and 40, and as further discussed below. It should be appreciated that shape and size of the head, neck, and arms of the attachment plate may vary in accordance with the present disclosure. It should also be appreciated that the quantity of attachment arms may vary in accordance with the present disclosure.

Turning now first to the non-movable parts of the anchor wheel chock 2600, the chock body 2700 includes a heel 2702, a toe 2704, and an intermediate section 2706 extending between the heel 2702 and the toe 2704. The chock body 2700 includes: (a) a substantially diamond shaped elongated tube which includes four integrally connected elongated walls 2710, 2720, 2730, and 2740; (b) a heel side transversely extending end wall 2750 integrally connected (such as by welding) to the heel side ends of the elongated walls 2710, 2720, 2730, and 2740; (c) an upside down U-shaped rail saddle 2760 integrally connected (such as by welding) to the elongated walls 2710, 2720, 2730, and 7240; and (d) a first transversely extending intermediate wall 2770 (best seen in FIG. 37) positioned in the substantially diamond shaped elongated tube and integrally connected (such as by welding) to the inner surfaces of the elongated walls 2710, 2720, 2730, and 2740. It should be appreciated that wall 2770 can be connected in other ways and that this transversely extending wall does not need to be connected to each of the elongated walls 2710, 2720, 2730, and 2740. It should also be appreciate that in this alternative embodiment, suitable slots are formed in one or more of the elongated walls 2710, 2720, 2730, and 2740 to facilitate attachment of the wall 2770.

The elongated walls 2710, 2720, 2730, and 2740 of the substantially diamond shaped elongated tube each have inner and outer surfaces, a heel edge and a toe edge. More specifically, (a) elongated wall 2710 has a tire tread engaging outer surface 2712, an inner surface, a heel edge, and a toe edge; (b) the elongated wall 2720 has an outer surface 2722, an inner surface, a heel edge, and a toe edge; (c) the elongated wall 2730 has an outer surface 2732, an inner surface, a heel edge, and a toe edge; and (d) the elongated wall 2740 has an outer surface 2742, an inner surface, a heel edge, and a toe edge. It should be appreciated that in this illustrated embodiment the walls 2710, 2720, 2730, and 2740 have or are interconnected by curved or radius corners in this illustrated embodiment, but that the present disclosure is not limited to having such curved or radius corners.

The elongated walls 2710, 2720, 2730, and 2740 of the substantially diamond shaped elongated tube define a plurality of cut-outs or openings which: (a) provide access to the internal areas of the tube of the chock body 2700; (b) provide access to the internal components of the anchor chock 2600 for assembly; (c) enable parts connected to the internal components of the anchor chock 2600 to extend outwardly from the tube as further discussed below; (d) provide drainage for any water in the chock body 2700; (e) facilitate attachment of the internal components; and (f) define part of the anchor 2900. For example: (a) walls 2720 and 2730 define a rail engager activation lever opening or slot 2725; (b) walls 2710, 2720, 2730, and 2740 define a rail saddle receiving opening 2727; and (c) walls 2710 and 2720 provide an anchor 2900 which defines slots or openings 2910 and 2920.

The heel side transversely extending end wall 2750 is integrally connected (such as by welding) to the heel edges of the elongated walls 2710, 2720, 2730, and 2740. The end wall 2750 defines a plurality of cut-outs or openings which: (a) provide access to the internal areas of the tube; and (b) provide access to the internal components of the anchor chock 2600 for assembly. More specifically, in this illustrated embodiment, the end wall 2750 defines: (a) an access opening 2753 (as best shown in FIGS. 28, 29, 31, and 40) for providing access to the interior section of the chock body 2700; and (b) a drainage opening 2755 (as also best shown in FIGS. 28, 29, 31, and 40) for facilitating drainage of any water which enters the chock body 2700. It should be appreciated that while the end wall 2750 adds extra strength to the chock body 2700, the present disclosure contemplates that the end wall 2750 can be removed from the chock body 2700.

Figure 38:
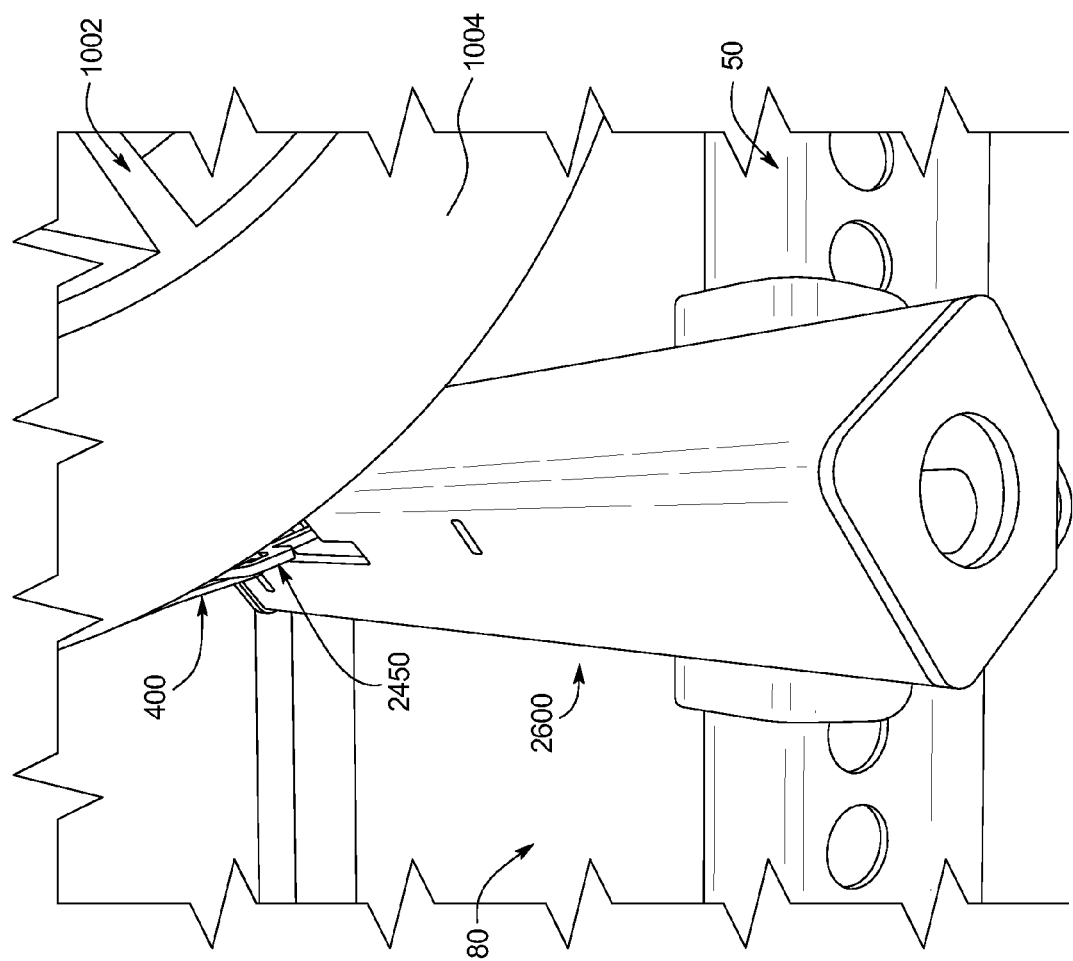
FIG. 38 is a perspective view of the anchor wheel chock of FIG. 28 shown locked onto a rail on a floor of one of the levels in a tri-level auto-rack car and in engagement with a front side of a wheel of a vehicle in an auto-rack car.
Figure 39:
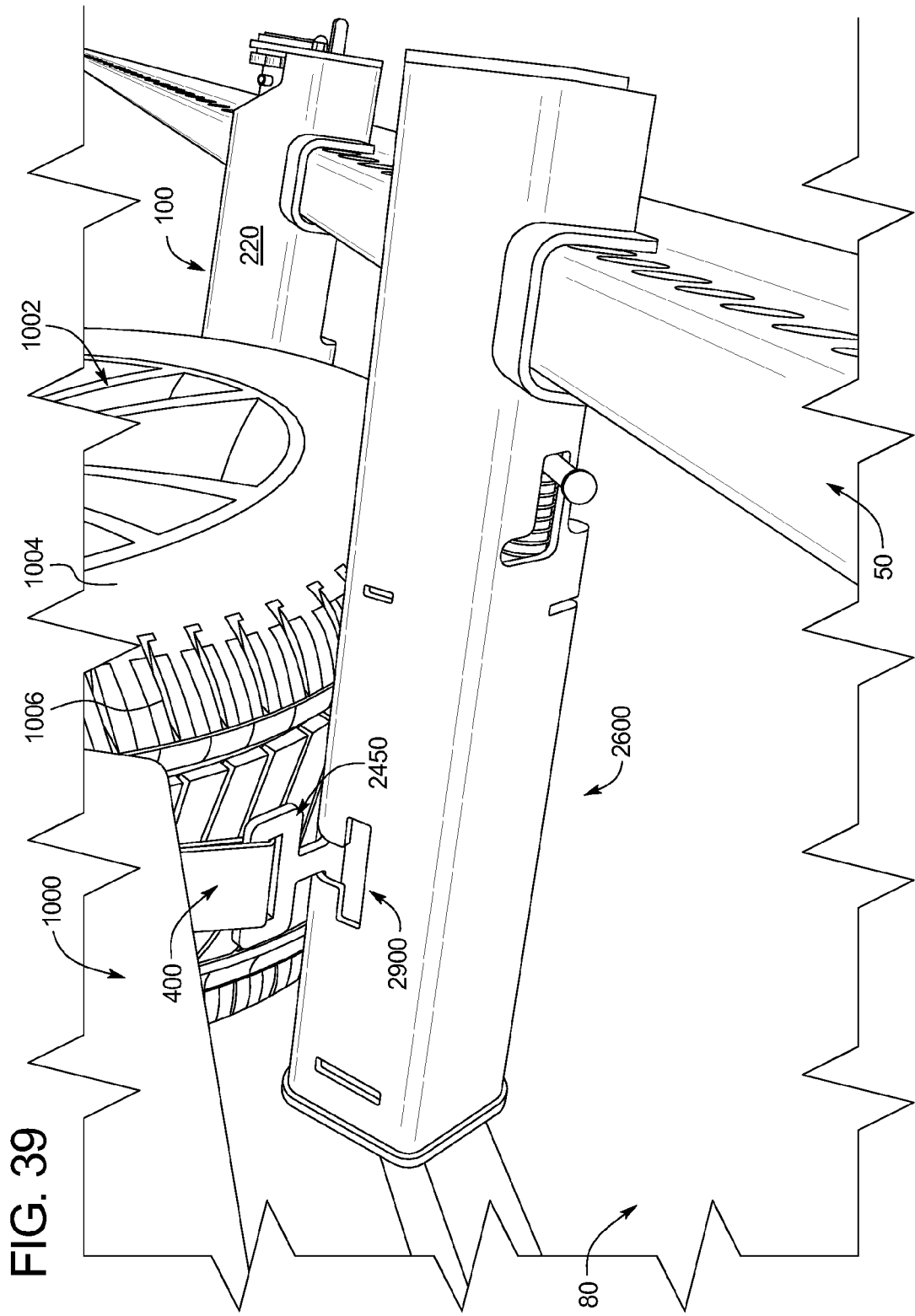
FIG. 39 is a perspective view of the active wheel chock of FIG. 2 and the anchor chock of FIG. 28 each shown locked onto a rail on a floor of one of the levels in a tri-level auto-rack car and in engagement with a wheel of a vehicle in an auto-rack car, wherein said view is taken from the front side of the vehicle.
Figure 40:
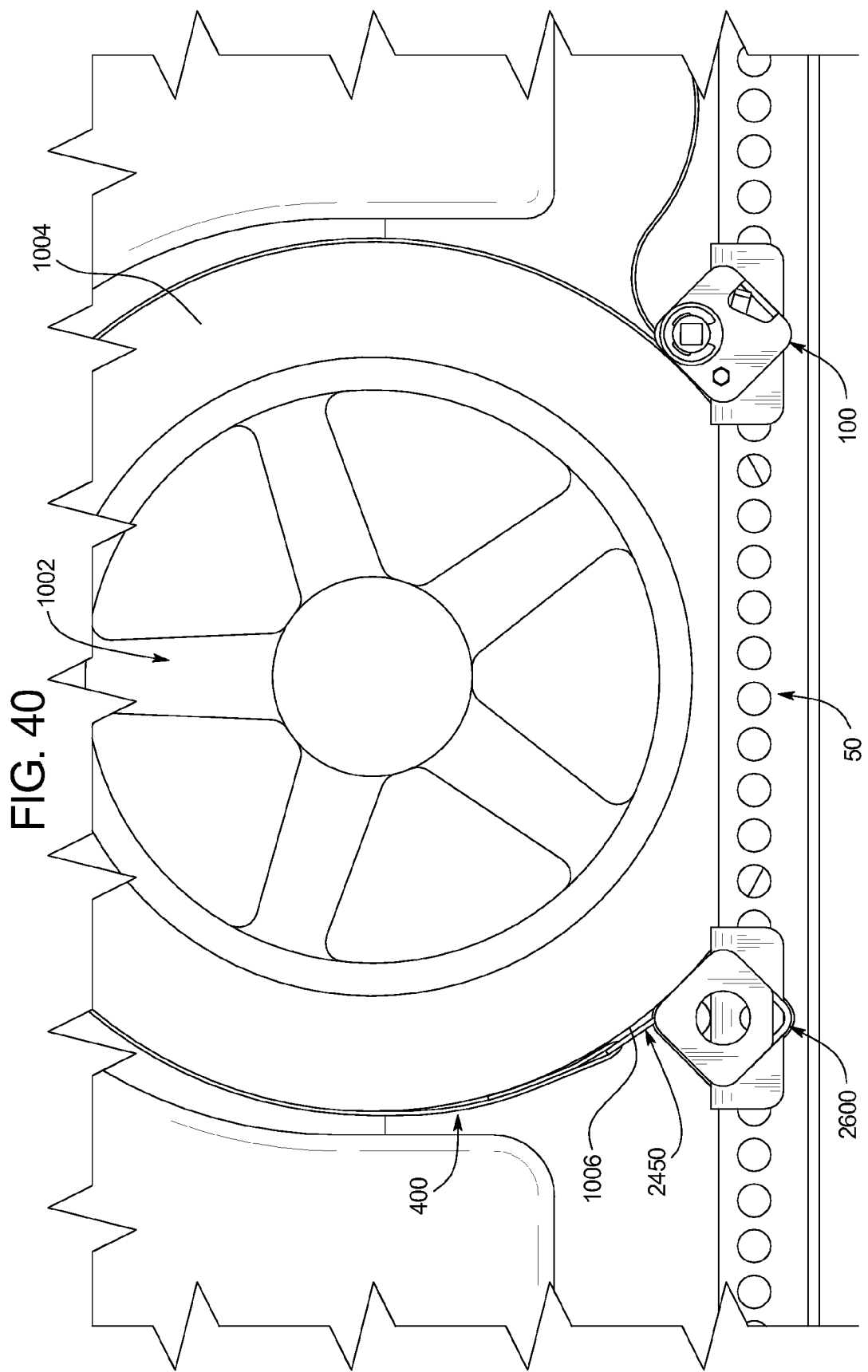
FIG. 40 is a side view of the active wheel chock of FIG. 2 and the anchor chock of FIG. 28 each shown locked onto a rail on a floor of one of the levels in a tri-level auto-rack car and in engagement with a wheel of a vehicle in an auto-rack car.

The upside down U-shaped rail saddle 2760 is positioned in the rail saddle receiving opening 2727 and is integrally connected (such as by welding) to the edges of the elongated walls 2710, 2720, 2730, and 2740 that define the rail saddle receiving opening 2727. The upside down U-shaped rail saddle 2760 includes an upper wall 2762, a first side wall 2764, and a second side wall 2766, which each extend transversely to the tubular body and specifically transversely to the elongated walls 2710, 2720, 2730, and 2740 of the tubular body. The upside down U-shaped rail saddle 2760 is configured to fit over and rest on the rail 50. Specifically, the upper wall 2762 is configured to engage the top of the rail 50, the first side wall 2764 is configured to extend adjacent to one side of the rail 50, and the second side wall 2766 is configured to extend to the other side of the rail 50 as illustrated in FIGS. 38, 39, and 40. It should be appreciated that having the upper wall 2762 rest on the rail 50 enables the chock body 2700 to be at the lowest point in the safe zone adjacent to the wheel.

Figure 37:
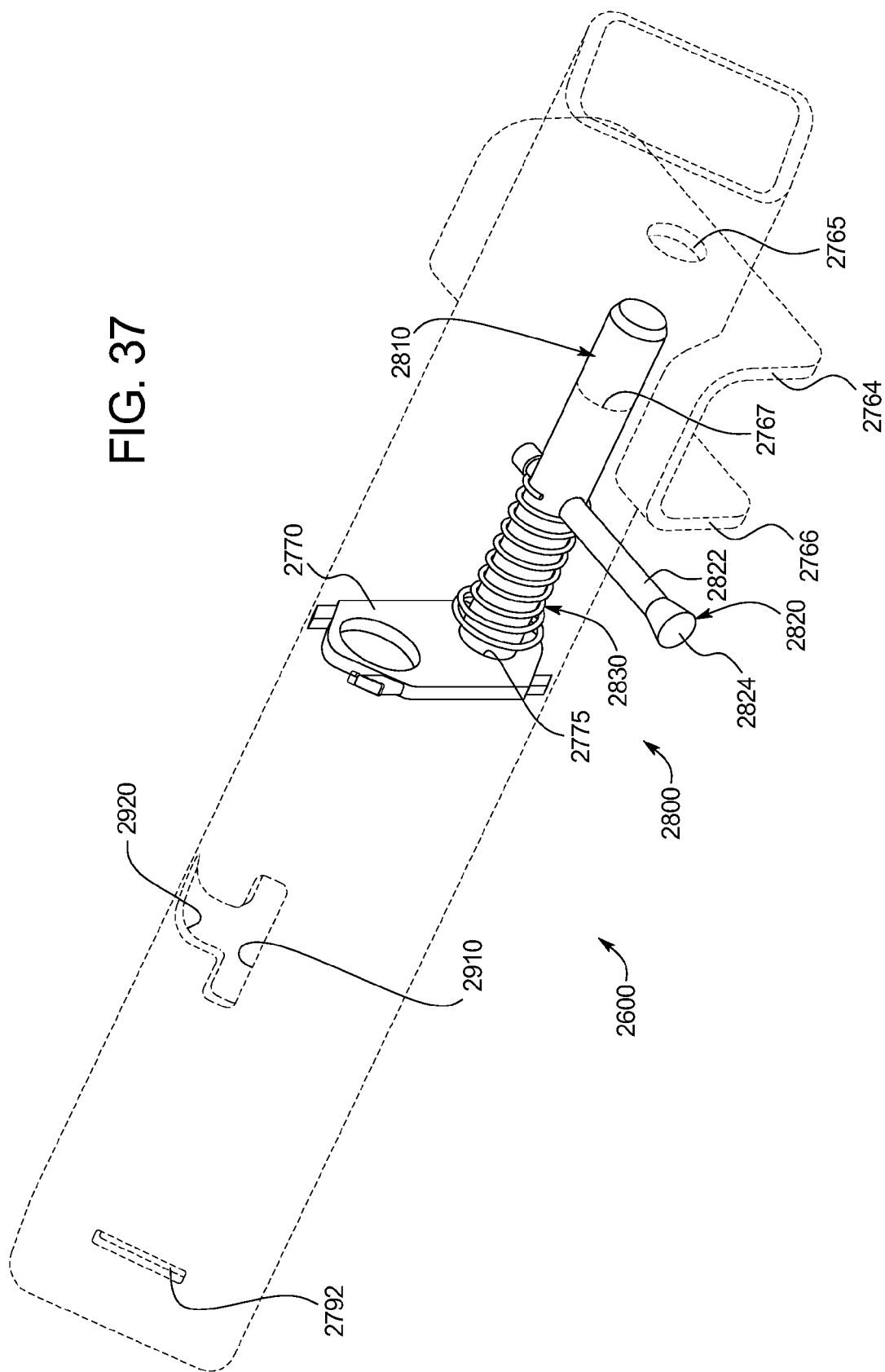
FIG. 37 is a front perspective view of the anchor wheel chock of FIG. 28, shown with most of the chock body in phantom to better illustrate the rail engager components of the anchor chock.

The first side wall 2764 defines a locking pin receiving opening 2765, and the second side wall 2766 defines a locking pin receiving opening 2767 aligned with the locking pin receiving opening 2765 (as best shown by FIG. 37). It should be appreciated that in this example embodiment, the locking pin 2810 (described below) does not extend into the locking pin receiving opening 2765, but that in other embodiments, the locking pin can extend into the locking pin receiving opening 2765. It should further be appreciated that the locking pin receiving opening 2765 is formed in the first side wall 2764 of the rail saddle 2760 for ease of manufacturing, and specifically to enable the rail saddle 2760 to be mounted in the elongated tube in either direction.

The first intermediate wall 2770 is positioned approximately midway in the substantially diamond shaped tube (as best shown in FIG. 37). The first intermediate wall 2770 defines a locking pin receiving opening 2775 which is aligned with the locking pin receiving opening 2767 and aligned with the locking pin receiving opening 2765.

In this illustrated embodiment, the aligned openings 2765, 2767, and 2775 are positioned in and adjacent to the trough or bottom of the substantially diamond shaped tube of the chock body 2700.

The wheel harness strap anchor 2900 is formed by the chock body 2700. In this illustrated embodiment, the wheel harness strap anchor 2900 is formed by or part of the elongated walls 2710 and 2720, and defines an engagement arm receiving slot 2910 and a neck receiving slot 2920 transversely extending from the engagement arm receiving slot 2910. These slots extend in walls 2710 and 2720, however, it should be appreciated that the placement, size and shape of these slots may vary in accordance with the present disclosure.

In operation, the engagement arms 2458 and 2460 and part of the neck 2456 of the attachment plate 2450 are inserted through the engagement arm receiving slot 2910, and the neck 2456 is moved upwardly in the neck receiving slot 2920 toward the apex of the anchor chock body 2700 such that the engagement arms 2458 and 2460, and specifically the top edges of the engagement arms 2458 and 2460 are positioned to engage the inner surface of wall 2710, or wall 2720, or walls 2710 and 2720, or the inner surface of the upper edge or apex defined by walls 2710 and 2720 (all depending on the exact positioning, sizes and shapes of the slots 2910 and 2920). This secures the attachment plate 2450 to the anchor chock body 2700 and thus to the anchor chock 2600 as generally illustrated in FIGS. 38, 39, and 40. It should thus be appreciated that the anchor 2900 can be formed by one or more of the elongated walls of the chock body. It should also be appreciated that instead of the anchor being formed by the elongated walls as illustrated, an anchor (not shown) can be attached to one or more of the walls of the chock body.

It should be appreciated that the body of the anchor chock of this illustrated embodiment of the present disclosure: (a) takes up a smaller area of the safe zone adjacent to the wheel than any known commercially available vehicle restraint; and (b) provides a greater strength to size ratio than the body of any known commercially available vehicle restraint. It should also be appreciated that the tubular configuration of the body of the anchor chock provides substantial rigidity utilizing relatively thin walls. It should further be appreciated that this configuration of the substantially diamond shaped tube of the chock body of the anchor chock has the greatest height at the point in which it is closest to the tire and then slopes away from the tire.

It should also be appreciated from the above that in this illustrated embodiment, the attachment plate 2450 and the strap 400 are releasably connectable to the anchor chock body 2700 at the apex of the chock body or substantially adjacent to the apex of the chock body. This positions the end of the strap extremely close or adjacent to the tire as possible as generally shown in FIGS. 38, 39, and 40. This alternative configuration thus further prevents the strap from engaging any parts of the vehicle.

Figure 28:
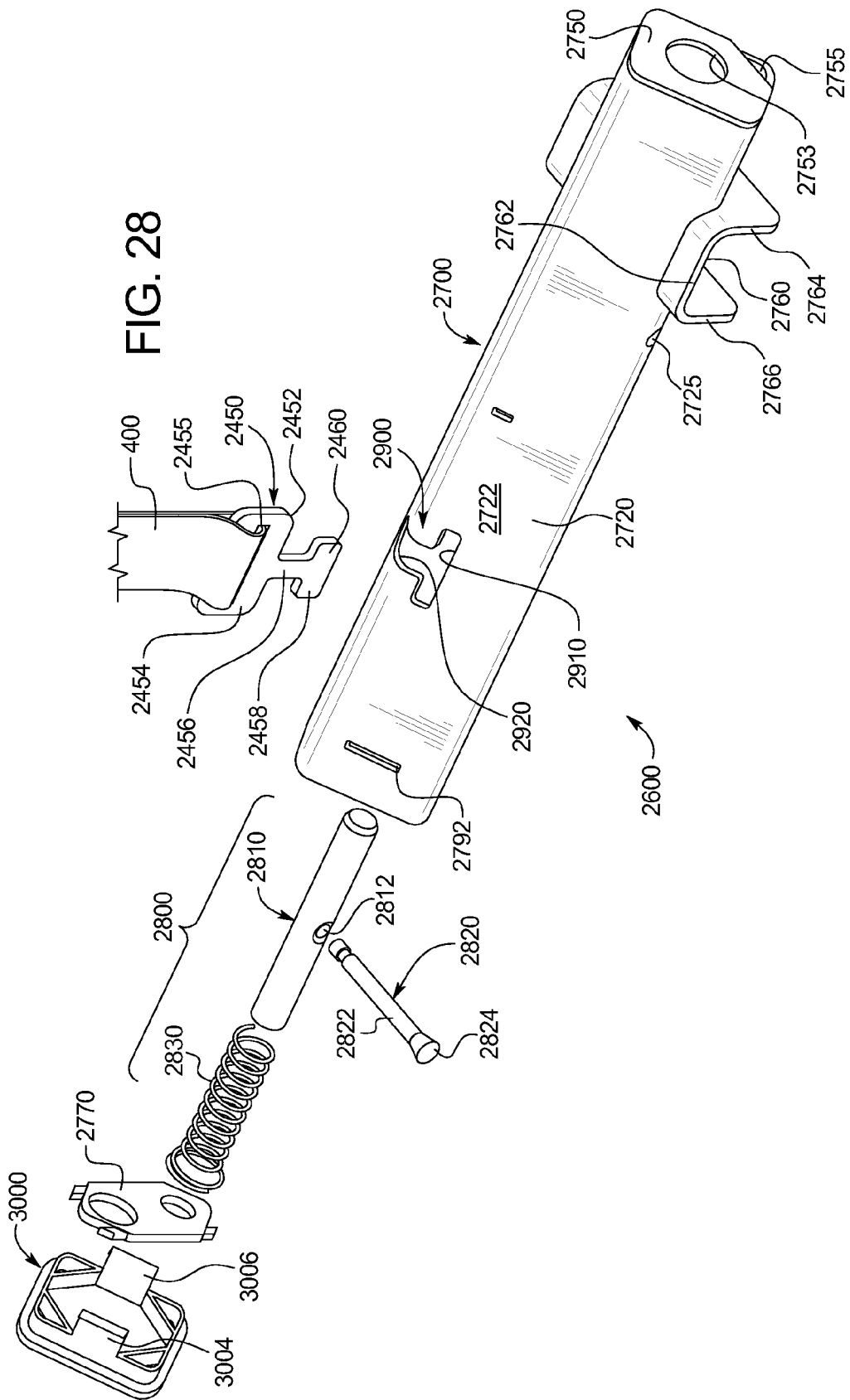
FIG. 28 is an exploded front perspective view of the anchor wheel chock of an alternative embodiment of the present disclosure, and a fragmentary perspective view of the strap and attachment plate of an alternative embodiment of the active chock.
Figure 29:
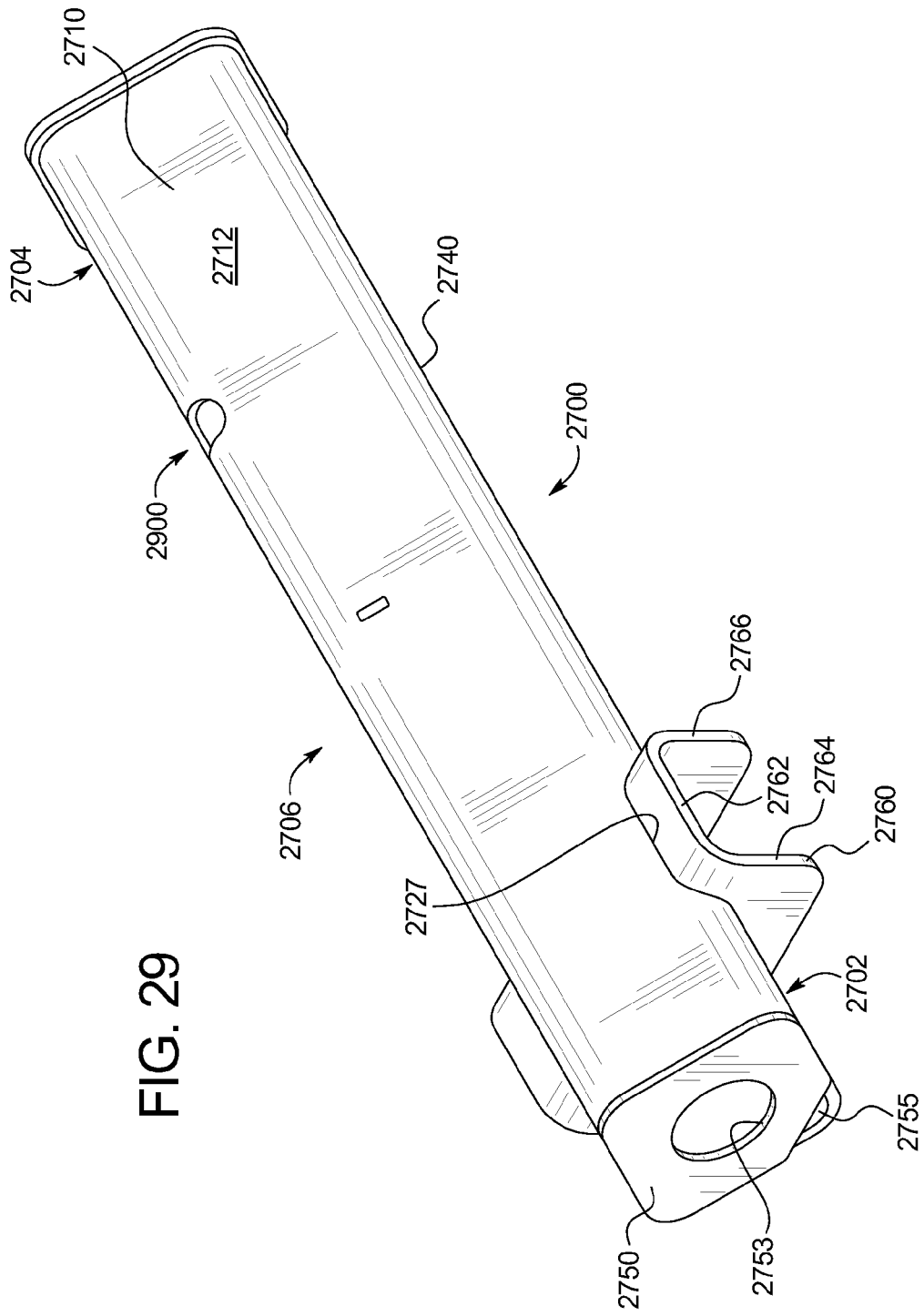
FIG. 29 is a front perspective view of the chock body of the anchor wheel chock of FIG. 28, shown without the rail engager components of the anchor chock.
Figure 32:
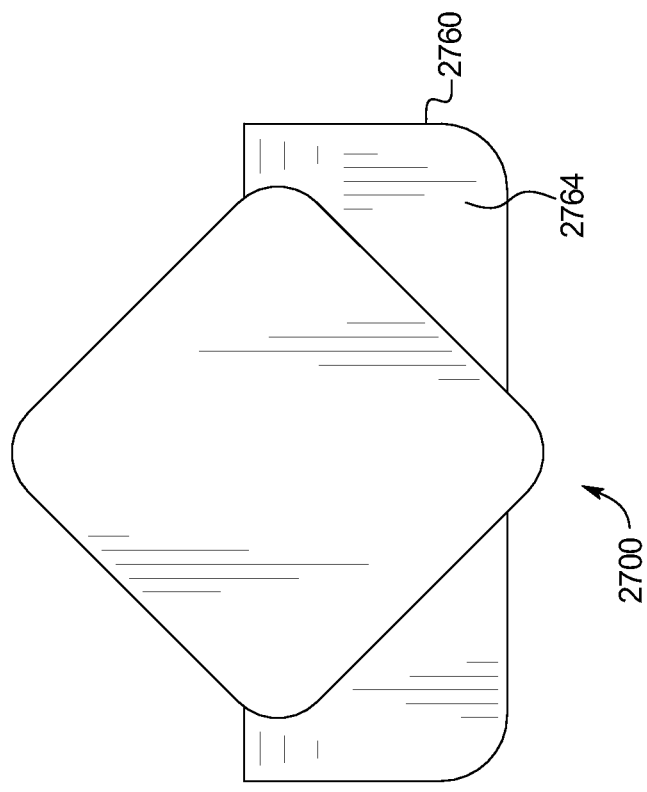
FIG. 32 is a rear (or toe) end view of the chock body of the anchor wheel chock of FIG. 28, shown without the rail engager components of the anchor chock.
Figure 31:
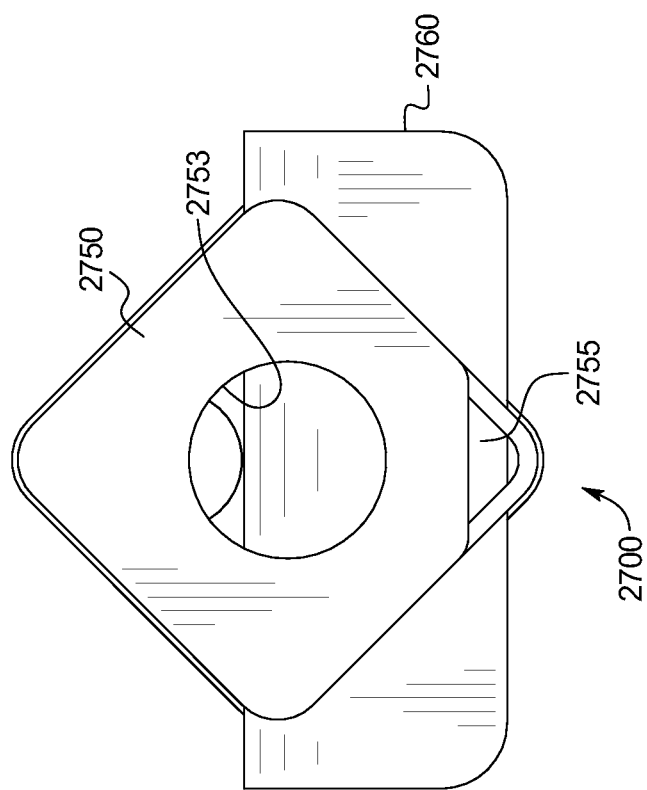
FIG. 31 is a front (or heel) end view of the chock body of the anchor wheel chock of FIG. 28, shown without the rail engager components of the anchor chock.
Figure 33:
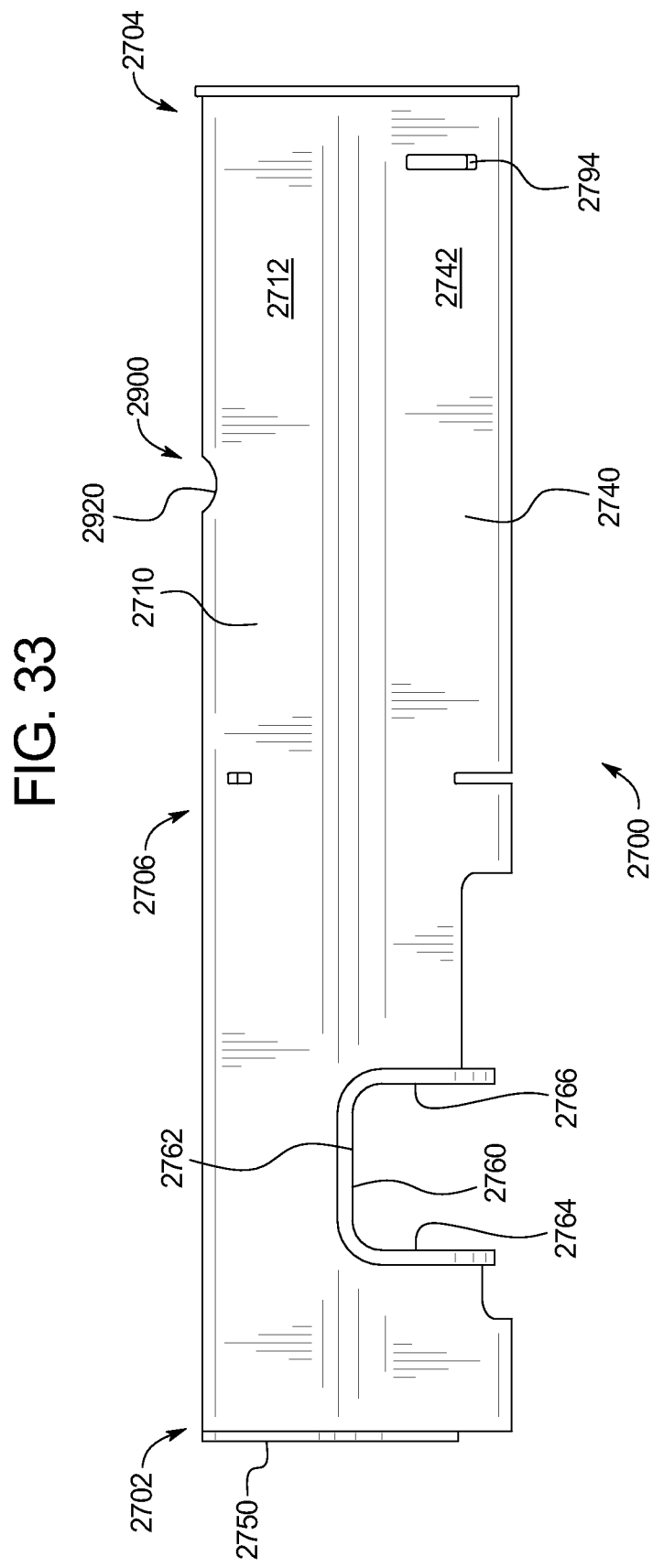
FIG. 33 is a right side view of the chock body of the anchor wheel chock of FIG. 28, shown without the rail engager components of the anchor chock.
Figure 34:
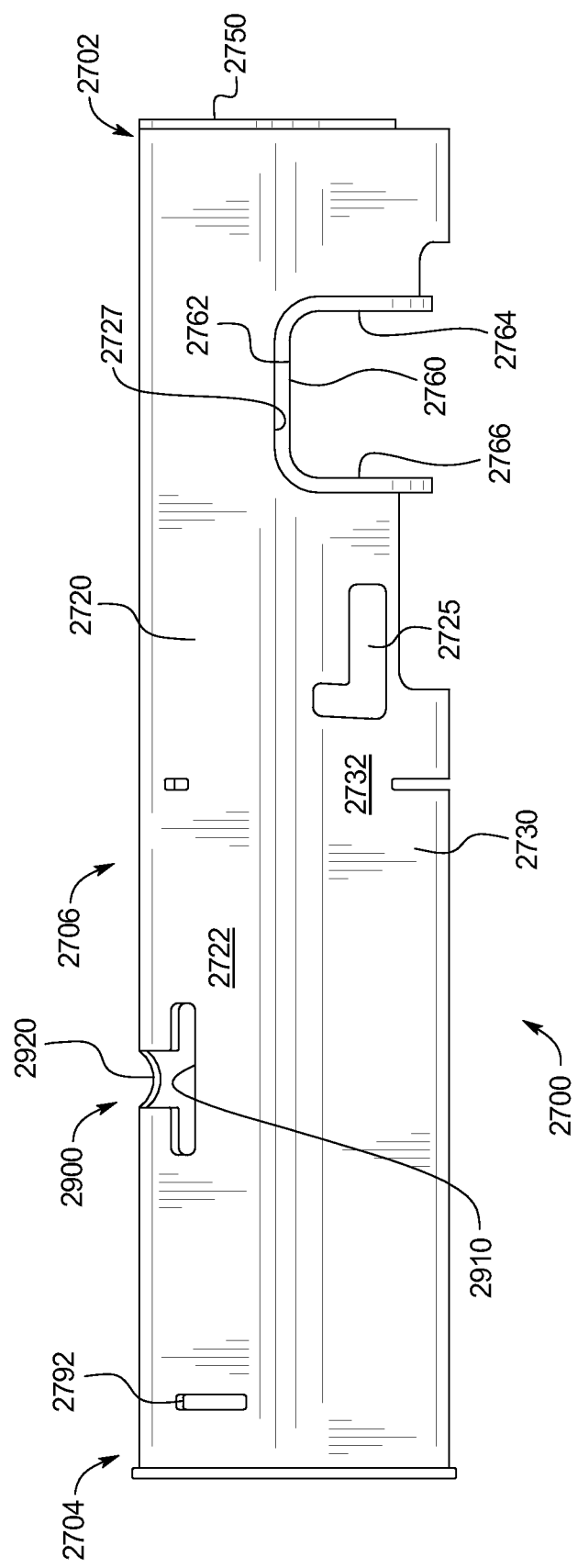
FIG. 34 is a left side view of the chock body of the anchor wheel chock of FIG. 28, shown without the rail engager components of the anchor chock.
Figure 35:
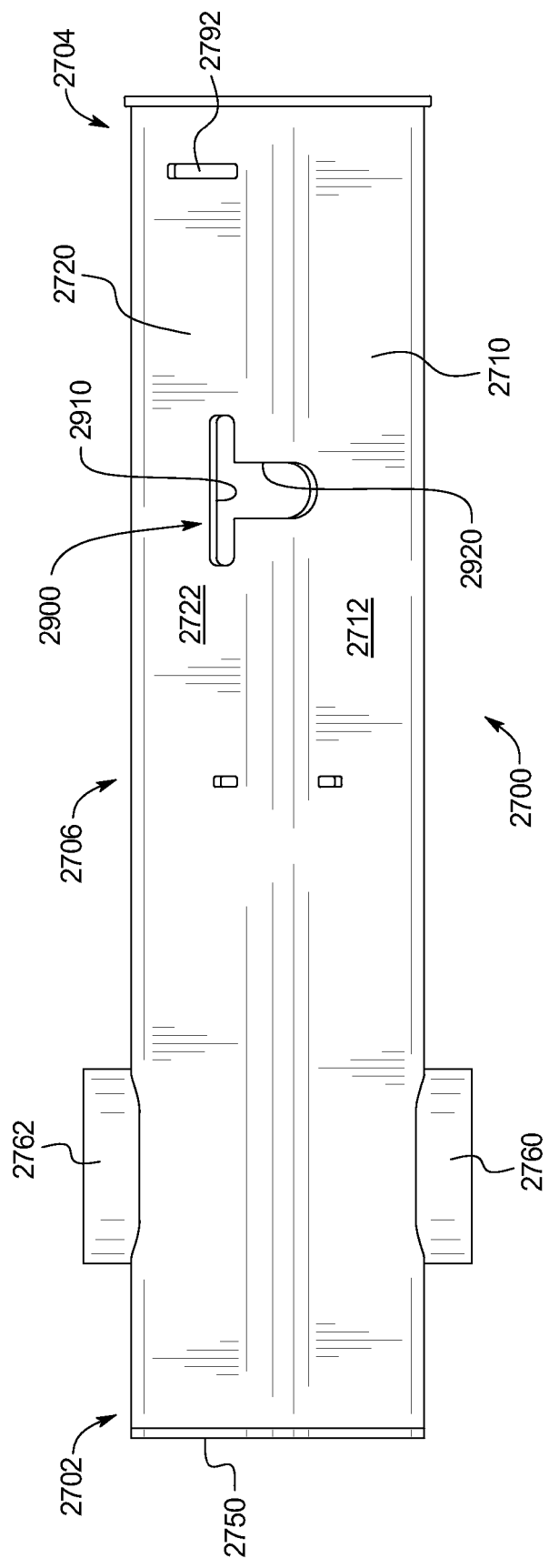
FIG. 35 is a top plan view of the chock body of the anchor wheel chock of FIG. 28, shown without the rail engager components of the anchor chock.
Figure 36:
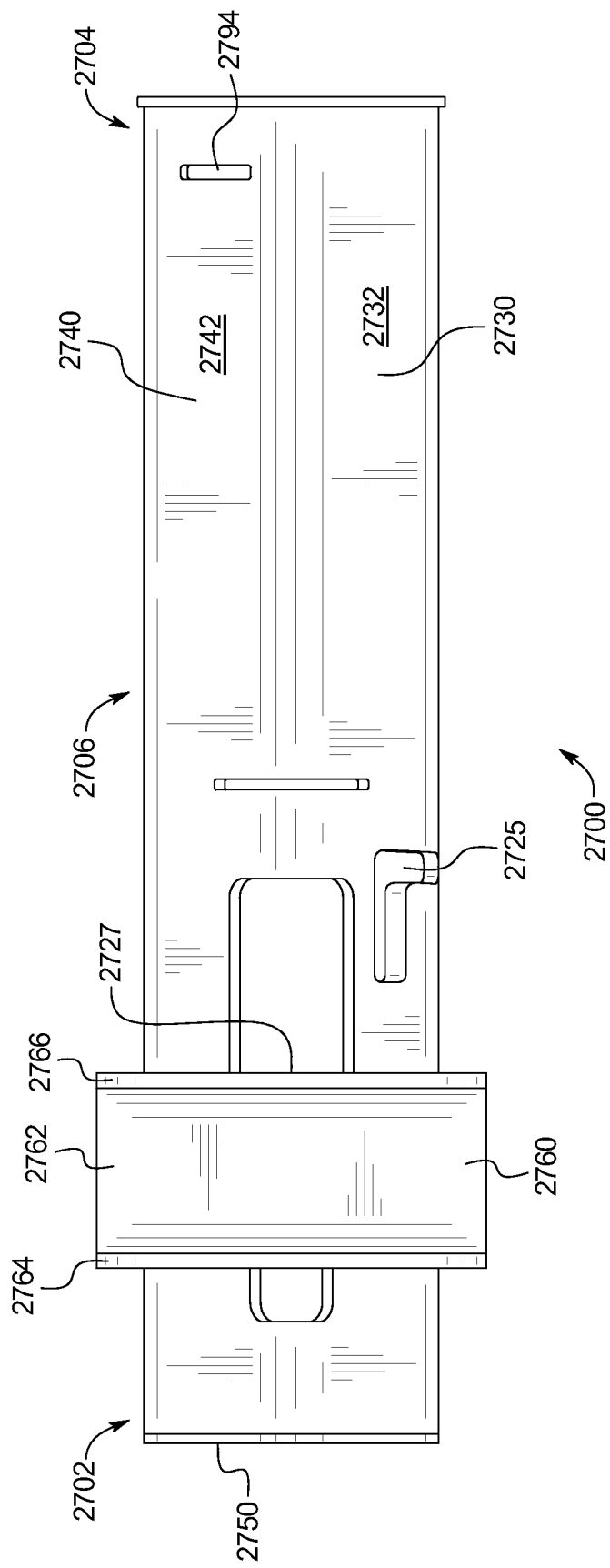
FIG. 36 is a bottom view of the chock body of the anchor wheel chock of FIG. 28, shown without the rail engager components of the anchor chock.

Turning now to the movable components of the anchor chock 2600, as illustrated in FIGS. 28 and 37, the rail engager 2800 is supported by the chock body 2700 and configured to releasably lock the anchor chock 2600 to the rail 50 similar to the above described anchor chock 600. The rail engager 2800 generally includes a locking pin 2810, an activation lever 2820 connected to and extending transversely from the locking pin 2810, and a biasing member such as coil spring 2830 positioned about the locking pin 2810.

More specifically, the locking pin 2810 is positioned in the substantially diamond shaped tube of the chock body 2700 in an area adjacent to the trough and in the same or substantially the same vertical plane as the apex and trough of the substantially diamond shaped tube of the chock body 2700. The locking pin 2810 extends through: (a) the locking pin receiving opening 2767 of the side wall 2766 of the rail saddle 2760; and (b) the locking pin receiving opening 2775 of the first intermediate wall 2770. The locking pin 2810 is supported by the side wall 2766 of the rail saddle 2760 and the first intermediate wall 2770.

The activation lever 2820 which is connected to and which extends transversely from the locking pin 2810 includes a stem 2822 and a head 2824. One end of the stem 2822 extends through the locking pin 2810 and the other end of the stem 2822 is connected to the head 2824. In one embodiment, the end of the stem 2822 extending through the locking pin 2810 has or defines a spring engagement notch and the locking pin 2810 includes a through hole 2812 configured to receive the end of the stem 2822 to facilitate assembly of the rail engager 2800. The activation lever 2820 and specifically the stem 2822 extend through the rail engager activation lever opening 2725.

The coil spring 2830 is positioned or journaled about the locking pin 2810 between the stem 2822 and the first intermediate wall 2770. The ends of the coil spring 2830 respectively engage the stem 2822 and the wall 2770 as shown in FIG. 37. It should be appreciated that in this configuration, the coil spring 2830 biases the locking pin 2810 away from one of two retracted positions (discussed below) and toward an extended position (as shown in FIG. 37). In this illustrated embodiment, as mentioned above, the locking pin 2810 does not extend through locking pin receiving opening 2765 when in the locked position. It should be appreciated that in other embodiments, the locking pin 2810 can extend through the locking pin receiving opening 2765 in the locked position. In either of the retracted positions, the rail engaging end of the locking pin 2810 is configured to engage the rail 50 to enable the chock body 2700 and the entire active chock 2600 to be placed on the rail 50 or removed from the rail 50. The two retracted positions include a locked retracted position and an unlocked retracted position. The rail engager 2800 activation lever opening 2725 has a generally sideways L shape and includes an upper slot section configured to receive the activation lever 2820, and specifically the stem 2822 of the activation lever 2820, to prevent the activation lever 2820 from moving toward the heel of the chock body 2700. This upper slot section of the opening 2725 thus provides for the locked retracted position. When the activation lever 2820 is moved downwardly out of this upper slot section, the activation lever 2820 is in the unlocked retracted position and will be biased by the coil spring 2830 toward the extended position and thus toward the heel 2702 and the rail locking position. In the extended or rail locking position, the heel side rail engaging end of the locking pin 2810 is configured to extend through one of the holes in the rail 50 and lock the chock body 2700 and the entire anchor chock 2600 to the rail 50 as generally shown in FIGS. 38, 39, and 40. This configuration provides a simple and effective mechanism for locking the anchor chock 2600 onto the rail 50.

The anchor chock of this alternative example embodiment additionally includes a protective end plate 3000 (best shown in FIG. 28) attached to the toe 2704 of the chock body 2700. This protective end plate 3000 is inserted into the opening or open end of the toe 2704 of the chock body and is configured to prevent the end of the anchor chock 2600 from damaging a vehicle. The protective end plate 3000 is made (such as by injection molding) from a linear low density polyethylene in this embodiment, but it should be appreciated that the protective end plate 3000 may be made from any other suitable material. The protective end plate 3000 in this illustrated embodiment includes one or more attachment legs such as attachment legs 3004 and 3006 that are configured to be positioned (such as by snap fit) into respective receiving slots 2792 and 2794 defined in the elongated walls of the chock body as generally shown in FIGS. 28, 33, 34, 35, 36, and 37.

Other Alternative Embodiments

In various alternative embodiments, the end plate 250 extends downwardly or includes a downwardly extending footer (not shown) which is configured to rest on the floor of the auto-rack railroad car adjacent to the rail to provide extra support for the chock body of the active chock. In other embodiments, the footer (not shown) extends downwardly from the heel end of the tube of the chock body of the active chock.

In various alternative embodiments, the end plate 750 extends downwardly or includes a downwardly extending footer (not shown) which is configured to rest on the floor of the auto-rack railroad car adjacent to the rail to provide extra support for the chock body of the anchor chock. In other embodiments, the footer (not shown) extends downwardly from the heel end of the tube of the chock body of the anchor chock.

In various embodiments, a protective end plate (such as the protective end plate 3000 shown in FIG. 28) is mounted to the toe end of the chock body of the active chock. In other various alternative embodiments, an end cap (not shown) is mounted to the edges of the toe end of the chock body of the active chock. In various embodiments, the end cap is made from a suitable rubber material or a suitable plastic material.

In various embodiments, a protective end plate (such as the protective end plate 3000 shown in FIG. 28) is mounted to the toe end of the chock body of the anchor chock. In other various alternative embodiments, an end cap (not shown) is mounted to the edges of the toe end of the chock body of the anchor chock. In various embodiments, the end cap is made from a suitable rubber material or a suitable plastic material.

In certain such embodiments, the chock body of the active chock also includes a downwardly extending footer (not shown) which is configured to rest on the floor of the auto-rack railroad car and which is spaced from the rail to provide extra support for the chock body of the active chock.

In certain such embodiments, the chock body of the anchor chock also includes a downwardly extending footer (not shown) which is configured to rest on the floor of the auto-rack railroad car and which is spaced from the rail to provide extra support for the chock body of the anchor chock.

In various alternative embodiments, the anchor chock is made without the end plate 750. In other various alternative embodiments, the end plate 750 has a different configuration or different openings.

In various alternative embodiments, the active chock includes one or more handles (not shown) attached to the chock body which enables the active chock to be more easily carried and moved. In various alternative embodiments, the active chock includes one or more openings in the chock body which enables the active chock to be more easily carried and moved.

In various alternative embodiments, the anchor chock includes one or more handles (not shown) attached to the chock body which enables the anchor chock to be more easily carried and moved. In various alternative embodiments, the anchor chock includes one or more openings in the chock body which enables the anchor chock to be more easily carried and moved.

It should be understood that modifications and variations may be effected without departing from the scope of the novel concepts of the present invention, and it should be understood that this application is to be limited only by the scope of the claims.

The invention is claimed as follows:

1. An anchor wheel chock of a vehicle restraint apparatus, said anchor wheel chock comprising:
    (a) a chock body including a substantially diamond shaped elongated tube which includes four integrally connected elongated walls;
    (b) a rail engager mounted to the chock body, the rail engager including a locking pin extending substantially along a first longitudinal axis extending through the substantially diamond shaped elongated tube of the chock body in an area adjacent to a trough of the substantially diamond shaped elongated tube; and
    (c) an anchor formed by the chock body and configured to be engaged by an anchor plate of a wheel harness strap.

2. The anchor wheel chock of claim 1, wherein the anchor plate includes an I-shaped engagement member, and the anchor is configured to receive the I-shaped engagement member.

3. The anchor wheel chock of claim 1, wherein the anchor is formed by at least one of the elongated walls.

4. The anchor wheel chock of claim 1, wherein the anchor defines an engagement arm receiving slot and a neck receiving slot transversely extending from the engagement arm receiving slot.

5. The anchor wheel chock of claim 1, wherein the four integrally connected elongated walls each have a substantially same width.

6. The anchor wheel chock of claim 1, wherein the chock body includes a transversely extending end wall integrally connected to a plurality of the elongated walls.

7. The anchor wheel chock of claim 1, wherein the chock body includes a transversely extending intermediate wall integrally connected to a plurality of the elongated walls.

8. The anchor wheel chock of claim 1, wherein the elongated walls have curved or radius intersecting corners.

9. The anchor wheel chock of claim 1, wherein the elongated walls define a rail saddle receiving opening.

10. The anchor wheel chock of claim 9, which includes an upside down U-shaped rail saddle positioned in the rail saddle receiving opening and integrally connected to the elongated walls.

11. The anchor wheel chock of claim 10, wherein the rail engager locking pin is at least partially supported by the rail saddle.

12. The anchor wheel chock of claim 1, which includes a protective end plate attached to a toe portion of the chock body.

13. The anchor wheel chock of claim 12, wherein the protective end plate is made from a linear low density polyethylene.

14. The anchor wheel chock of claim 12, wherein the protective end plate is configured to be snap fit into receiving slots defined by a plurality of the elongated walls.

15. The anchor wheel chock of claim 1, wherein the chock body includes a transversely extending intermediate wall integrally connected to a plurality of the elongated walls, and wherein the rail engager locking pin is at least partially supported by the transversely extending intermediate wall.

16. An anchor wheel chock of a vehicle restraint apparatus, said anchor wheel chock comprising:
    (a) a chock body including a substantially diamond shaped elongated tube which includes four integrally connected elongated walls;
    (b) a rail engager mounted to the chock body; and
    (c) an anchor formed by the chock body and configured to be engaged by an anchor plate of a wheel harness strap, the anchor plate including an I-shaped engagement member, the anchor configured to receive the I-shaped engagement member.

17. The anchor wheel chock of claim 16, wherein the anchor is formed by at least one of the elongated walls.

18. The anchor wheel chock of claim 16, wherein the anchor defines an engagement arm receiving slot and a neck receiving slot transversely extending from the engagement arm receiving slot.

19. The anchor wheel chock of claim 16, wherein the chock body includes a transversely extending intermediate wall integrally connected to a plurality of the elongated walls, and wherein the rail engager includes a locking pin at least partially supported by the transversely extending intermediate wall.

20. The anchor wheel chock of claim 19, wherein the locking pin extends substantially along a first longitudinal axis extending through the substantially diamond shaped elongated tube in an area adjacent to a trough of the substantially diamond shaped elongated tube.

21. An anchor wheel chock of a vehicle restraint apparatus, said anchor wheel chock comprising:
    (a) a chock body including a substantially diamond shaped elongated tube which includes four integrally connected elongated walls;
    (b) a rail engager mounted to the chock body; and
    (c) an anchor formed by the chock body and configured to be engaged by an anchor plate of a wheel harness strap, the anchor defining an engagement arm receiving slot and a neck receiving slot transversely extending from the engagement arm receiving slot.

22. The anchor wheel chock of claim 21, wherein the anchor plate includes an I-shaped engagement member, and the anchor is configured to receive the I-shaped engagement member.

23. The anchor wheel chock of claim 21, wherein the anchor is formed by at least one of the elongated walls.

24. The anchor wheel chock of claim 21, wherein the chock body includes a transversely extending intermediate wall integrally connected to a plurality of the elongated walls, and wherein the rail engager includes a locking pin at least partially supported by the transversely extending intermediate wall.

25. The anchor wheel chock of claim 24, wherein the locking pin extends substantially along a first longitudinal axis extending through the substantially diamond shaped elongated tube in an area adjacent to a trough of the substantially diamond shaped elongated tube.

26. An anchor wheel chock of a vehicle restraint apparatus, said anchor wheel chock comprising:
   (a) a chock body including a substantially diamond shaped elongated tube which includes four integrally connected elongated walls, the elongated walls defining a rail saddle receiving opening;
   (b) an upside down U-shaped rail saddle positioned in the rail saddle receiving opening and integrally connected to the elongated walls;
   (c) a rail engager mounted to the chock body; and
   (d) an anchor formed by the chock body and configured to be engaged by an anchor plate of a wheel harness strap.

27. The anchor wheel chock of claim 26, wherein the anchor is formed by at least one of the elongated walls.

28. The anchor wheel chock of claim 26, wherein the anchor defines an engagement arm receiving slot and a neck receiving slot transversely extending from the engagement arm receiving slot.

29. The anchor wheel chock of claim 26, wherein the chock body includes a transversely extending end wall integrally connected to a plurality of the elongated walls.

30. The anchor wheel chock of claim 26, wherein the rail engager includes a locking pin at least partially supported by the rail saddle.

31. The anchor wheel chock of claim 26, wherein the chock body includes a transversely extending intermediate wall integrally connected to a plurality of the elongated walls, and wherein the rail engager includes a locking pin at least partially supported by the transversely extending intermediate wall.

32. The anchor wheel chock of claim 31, wherein the locking pin extends substantially along a first longitudinal axis extending through the substantially diamond shaped elongated tube in an area adjacent to a trough of the substantially diamond shaped elongated tube.

33. An anchor wheel chock of a vehicle restraint apparatus, said anchor wheel chock comprising:
   (a) a chock body including a substantially diamond shaped elongated tube which includes four integrally connected elongated walls;
   (b) a protective end plate attached to a toe portion of the chock body, the protective end plate made from a linear low density polyethylene;
   (c) a rail engager mounted to the chock body; and
   (d) an anchor formed by the chock body and configured to be engaged by an anchor plate of a wheel harness strap.

34. The anchor wheel chock of claim 33, wherein the anchor plate includes an I-shaped engagement member, and the anchor is configured to receive the I-shaped engagement member.

35. The anchor wheel chock of claim 33, wherein the anchor is formed by at least one of the elongated walls.

36. The anchor wheel chock of claim 33, wherein the anchor defines an engagement arm receiving slot and a neck receiving slot transversely extending from the engagement arm receiving slot.

37. The anchor wheel chock of claim 33, wherein the chock body includes a transversely extending end wall integrally connected to a plurality of the elongated walls.

38. The anchor wheel chock of claim 33, wherein the protective end plate is configured to be snap fit into receiving slots defined by a plurality of the elongated walls.

39. The anchor wheel chock of claim 33, wherein the chock body includes a transversely extending intermediate wall integrally connected to a plurality of the elongated walls, and wherein the rail engager includes a locking pin at least partially supported by the transversely extending intermediate wall.

40. The anchor wheel chock of claim 39, wherein the locking pin extends substantially along a first longitudinal axis extending through the substantially diamond shaped elongated tube in an area adjacent to a trough of the substantially diamond shaped elongated tube.

41. An anchor wheel chock of a vehicle restraint apparatus, said anchor wheel chock comprising:
   (a) a chock body including a substantially diamond shaped elongated tube which includes four integrally connected elongated walls;
   (b) a protective end plate attached to a toe portion of the chock body, the protective end plate configured to be snap fit into receiving slots defined by a plurality of the elongated walls;
   (c) a rail engager mounted to the chock body; and
   (d) an anchor formed by the chock body and configured to be engaged by an anchor plate of a wheel harness strap.

42. The anchor wheel chock of claim 41, wherein the anchor plate includes an I-shaped engagement member, and the anchor is configured to receive the I-shaped engagement member.

43. The anchor wheel chock of claim 41, wherein the anchor is formed by at least one of the elongated walls.

44. The anchor wheel chock of claim 41, wherein the anchor defines an engagement arm receiving slot and a neck receiving slot transversely extending from the engagement arm receiving slot.

45. The anchor wheel chock of claim 41, wherein the chock body includes a transversely extending intermediate wall integrally connected to a plurality of the elongated walls, and wherein the rail engager includes a locking pin at least partially supported by the transversely extending intermediate wall.

46. The anchor wheel chock of claim 45, wherein the locking pin extends substantially along a first longitudinal axis extending through the substantially diamond shaped elongated tube in an area adjacent to a trough of the substantially diamond shaped elongated tube.

47. An anchor wheel chock of a vehicle restraint apparatus, said anchor wheel chock comprising:
   (a) a chock body including a substantially diamond shaped elongated tube which includes four integrally connected elongated walls, the chock body including a transversely extending intermediate wall integrally connected to a plurality of the elongated walls;
   (b) a rail engager mounted to the chock body, the rail engager including a locking pin at least partially supported by the transversely extending intermediate wall, the locking pin extending substantially along a first longitudinal axis extending through the substantially diamond shaped elongated tube in an area adjacent to a trough of the substantially diamond shaped elongated tube; and
   (c) an anchor formed by the chock body and configured to be engaged by an anchor plate of a wheel harness strap.

48. The anchor wheel chock of claim 47, wherein the anchor plate includes an I-shaped engagement member, and the anchor is configured to receive the I-shaped engagement member.

49. The anchor wheel chock of claim 47, wherein the anchor is formed by at least one of the elongated walls.

50. The anchor wheel chock of claim 47, wherein the anchor defines an engagement arm receiving slot and a neck receiving slot transversely extending from the engagement arm receiving slot.

51. The anchor wheel chock of claim 47, wherein the elongated walls define a rail saddle receiving opening.

52. The anchor wheel chock of claim 51, which includes an upside down U-shaped rail saddle positioned in the rail saddle receiving opening and integrally connected to the elongated walls.

53. The anchor wheel chock of claim 52, wherein the rail engager locking pin is at least partially supported by the rail saddle.

* * * * *